(12) United States Patent
Guan et al.

(10) Patent No.: US 11,731,096 B2
(45) Date of Patent: Aug. 22, 2023

(54) UPFLOW REACTOR

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Minghua Guan, Liaoning (CN); Xiuna Yang, Liaoning (CN); Zonglin Ruan, Liaoning (CN); Haochen Wang, Liaoning (CN); Yang Jiang, Liaoning (CN); Guoying Cui, Liaoning (CN); Jiawen Zhou, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 45 days.

(21) Appl. No.: 17/419,707

(22) PCT Filed: Dec. 30, 2019

(86) PCT No.: PCT/CN2019/129940
§ 371 (c)(1),
(2) Date: Jun. 29, 2021

(87) PCT Pub. No.: WO2020/140872
PCT Pub. Date: Jul. 9, 2020

(65) Prior Publication Data
US 2022/0080375 A1     Mar. 17, 2022

(30) Foreign Application Priority Data

Dec. 30, 2018 (CN) .......................... 201811644437.3

(51) Int. Cl.
*B01J 8/04* (2006.01)
*B01J 8/00* (2006.01)
*C10G 49/00* (2006.01)

(52) U.S. Cl.
CPC ............. *B01J 8/0453* (2013.01); *B01J 8/006* (2013.01); *C10G 49/002* (2013.01); *B01J 2208/00884* (2013.01); *C10G 2300/4075* (2013.01)

(58) Field of Classification Search
CPC ..... B01J 8/00; B01J 8/005; B01J 8/006; B01J 8/02; B01J 8/0242; B01J 8/04;
(Continued)

(56) References Cited

U.S. PATENT DOCUMENTS 3,628,314 A    12/1971    McCarthy et al.
3,838,977 A    10/1974    Warren et al.
(Continued)

FOREIGN PATENT DOCUMENTS

CN    1356929 A    7/2002
CN    1512912 A    7/2004
(Continued)

*Primary Examiner* — Natasha E Young
(74) *Attorney, Agent, or Firm* — NKL Law; Allen Xue

(57) ABSTRACT

An upflow reactor (1), includes a housing (20), a catalyst bed layer (30) and a pressing device (10). The housing (20) is internally provided with a reaction chamber (210), a reaction material inlet (220) and a reaction material outlet (230) which are in communication with the reaction chamber (210) are provided on the housing (20). The catalyst bed layer (30) is provided within the reaction chamber (210), the pressing device (10) is provided within the reaction chamber (210) and located above the catalyst bed layer (30). At least a part of the pressing device (10) is movable up and down so that the at least a part of the pressing device (10) can be pressed against the catalyst bed layer (30).

16 Claims, 27 Drawing Sheets

(58) Field of Classification Search
CPC ...... B01J 8/0403; B01J 8/0423; B01J 8/0442; B01J 8/0446; B01J 8/0449; B01J 8/0453; B01J 8/0492; B01J 2208/00; B01J 2208/00008; B01J 2208/00654; B01J 2208/0069; B01J 2208/00796; B01J 2208/00823; B01J 2208/00858; B01J 2208/00876; B01J 2208/00884; C10G 49/00; C10G 49/002; C10G 2300/00; C10G 2300/40; C10G 2300/4006; C10G 2300/4012; C10G 2300/4075
See application file for complete search history.

(56) References Cited

U.S. PATENT DOCUMENTS

| | | |
|---|---|---|
| 4,624,789 A | 11/1986 | Fan et al. |
| 6,554,994 B1 | 4/2003 | Reynolds et al. |
| 7,445,935 B2 * | 11/2008 | Bence ............... C01B 3/384 |
| | | 210/198.2 |
| 2002/0123578 A1 | 9/2002 | Barraco et al. |
| 2004/0146457 A1 | 7/2004 | Bence et al. |
| 2015/0010467 A1 | 1/2015 | Ito et al. |

FOREIGN PATENT DOCUMENTS

| | | |
|---|---|---|
| CN | 2683241 Y | 3/2005 |
| CN | 104080527 A | 10/2014 |
| JP | S63310703 A | 12/1988 |
| WO | 02070120 A1 | 9/2002 |

\* cited by examiner

UPFLOW REACTOR

CROSS REFERENCES TO RELATED APPLICATIONS

The present application is a U.S. national stage entry of International Application No. PCT/CN2019/129940, now WO 2020/140872, filed Dec. 30, 2019, which claims the priority to the Chinese Patent application CN 201811644437.3 submitted to China National Intellectual Property Administration on Dec. 30, 2018, which is entitled "UPFLOW REACTOR". The entire contents of the prior application are incorporated herein by reference.

TECHNICAL FIELD

The present invention relates to the field of chemical engineering, in particular to an upflow reactor.

BACKGROUND

Fixed bed-type reactors may be categorized into upflow reactors (i.e., bottom feeding) and downflow reactors (i.e., top feeding), according to the feeding mode of fixed bed-type reactor. Among them, upflow reactors can treat various types of oil products, and exhibit unique advantages in the hydrogenation process of oil products. For example, the high impurity contents in inferior oil products (residual oil, coal liquefied oil, etc.) may cause poisoning of the hydrogenation catalyst or clogging of the catalyst pores, consequently result in rapid deactivation of the catalyst. Moreover, the impurities in inferior oil products may cause clogging of the bed layer, resulting in rapid increased pressure drop, which in turn leads to poor operating conditions of the fixed bed-type reactor or even operation failure. If an upflow reactor is used, the gas-liquid parallel flow move upward in the reaction process so as to cause expansion of the catalyst bed layer, thus the void fraction of the catalyst bed layer can be increased and the clogging of the catalyst bed layer can be avoided.

However, existing upflow reactors produce a large amount of catalyst dust in the operating process, which moves upward along with the reaction materials. As a result, the catalyst dust may cause clogging of the flow channel of the reaction materials, consequently result in rapid increased pressure drop in the catalyst bed layer and shortened operation period of the upflow reactor.

SUMMARY

To solve the problems existing in the prior art, the present invention provides an upflow reactor.

To attain the above object, the present invention provides an upflow reactor, which comprises: a housing provided with a reaction chamber therein, and provided with a reaction material inlet and a reaction material outlet thereon, which are in communication with the reaction chamber; a catalyst bed layer arranged in the reaction chamber; and a pressing device arranged in the reaction chamber and located above the catalyst bed layer, wherein at least a part of the pressing device is arranged to be movable up and down, so that the at least a part of the pressing device can be pressed against the catalyst bed layer.

The upflow reactor according to the embodiments of the present invention has advantages such as low abrasion of catalyst particles, small amount of generated catalyst dust, and long operation period.

Optionally, the upflow reactor comprises a plurality of catalyst bed layers and a plurality of pressing devices, the plurality of catalyst bed layers and the plurality of pressing devices are disposed alternately in the vertical direction, and each of the pressing devices can be pressed against one of the catalyst bed layers; optionally, the plurality of catalyst bed layers are in height incremented in the material feeding direction.

Optionally, the catalyst bed layer comprises an upper catalyst section and a lower catalyst section, wherein the upper catalyst section is positioned above the lower catalyst section, and the pressing device can be pressed against the upper catalyst section, the upflow reactor further comprises: a sliding support arranged in the reaction chamber to be movable up and down, the lower catalyst section can be supported on the sliding support, and the sliding support is provided with a material channel; an upper linkage and a lower linkage that are arranged in the reaction chamber to be movable up and down, each of the upper linkage and the lower linkage is provided with a material channel, the upper linkage is located above the lower linkage, wherein the upper linkage and the lower linkage are located between the upper catalyst section and the lower catalyst section in the vertical direction, the upper catalyst section can be supported on the upper linkage, and the lower linkage can be pressed against the lower catalyst section; and an upper elastic member and a lower elastic member, wherein the top end of the upper elastic member is connected with the pressing device, the bottom end of the upper elastic member is connected with the upper linkage, the bottom end of the lower elastic member is connected with the sliding support, and the top end of the lower elastic member is connected with the lower linkage; optionally, the sliding support comprises a first slideway and a first grating plate, wherein the first slideway is arranged on the circumferential wall face of the reaction chamber, the first grating plate is arranged on the first slideway to be movable up and down, and the lower catalyst section can be supported on the first grating plate;

Optionally, the first slideway is provided with a lower limiting boss and an upper limiting boss, wherein the first grating plate is located between the lower limiting boss and the upper limiting boss in the vertical direction, the lower limiting boss can work with the first grating plate to limit the downward movement distance of the first grating plate, and the upper limiting boss can work with the first grating plate to limit the upward movement distance of the first grating plate;

Optionally, each of the upper linkage and the lower linkage comprises a first linking plate, a second linking plate, and a plurality of first guiding member, each of the first linking plate and the second linking plate is arranged to be movable up and down and has a material channel, each first guiding member passes through each of the first linking plate and the second linking plate in the vertical direction, each of the first linking plate and the second linking plate is arranged to be movable up and down with respect to each first guiding member, wherein the upper catalyst section can be supported on the first linking plate of the upper linkage, and the second linking plate of the lower linkage can be pressed against the lower catalyst section; optionally, a seal ring is provided between at least one of the first linking plate and the second linking plate and the circumferential wall face of the reaction chamber; optionally, the top end of the upper elastic member is connected with the pressing plate, the bottom end of the upper elastic member is connected with the first linking plate, the bottom end of the lower elastic member is connected with the first grating plate, and the top end of the lower elastic member is connected with the second linking plate.

Optionally, the upflow reactor further comprises: a filtering device arranged in the reaction chamber and located between the upper linkage and the lower linkage in the vertical direction;

Optionally, the filtering device comprises: a plurality of first dust removing members, each of which comprises a deformable shell that is provided with a first accommodating cavity filled with an inert filling material; optionally, the bottom end of each first guiding member of the upper linkage extends into the inert filling material in the first accommodating cavity, and the top end of each first guiding member of the lower linkage extends into the inert filling material in the first accommodating cavity; and a plurality of isolating members, each of which is located between adjacent two shells in the horizontal direction or vertical direction and is made of an elastic material; optionally, each isolating member is made of an elastic plastic material;

Optionally, the filtering device comprises: a plurality of first dust removing members, each of which has a first accommodating cavity filled with an inert filling material; and a plurality of first membrane assemblies, each of which is located between two adjacent first dust removing members in the horizontal direction and has a first gas inlet; optionally, each first membrane assembly is arranged vertically, the bottom end of the first membrane assembly is open so as to form the first gas inlet, and the top end of the first membrane assembly is closed;

Optionally, each of the upper linkage and the lower linkage comprises: a second slideway arranged on the circumferential wall face of the reaction chamber; and a linking plate that is arranged on the second slideway to be movable up and down and has a material channel, an elastic material is filled between the linking plate and the filtering device, the upper catalyst section can be supported on the linking plate of the upper linkage, and the linking plate of the lower linkage can be pressed against the lower catalyst section;

Optionally, a seal ring is provided between the linking plate and the second slideway; optionally, a granular elastic material is filled between the linking plate and the filtering device; optionally, an elastic plastic material is filled between the linking plate and the filtering device.

Optionally, the pressing device comprises a pressing plate arranged on the circumferential wall face of the reaction chamber to be movable up and down so that the pressing plate can be pressed against the catalyst bed layer, and the pressing plate has a material channel;

Optionally, the pressing device comprises a third slideway and a pressing plate, wherein the third slideway is arranged on the circumferential wall face of the reaction chamber, the pressing plate is arranged on the third slideway to be movable up and down so that the pressing plate can be pressed against the catalyst bed layer, and the pressing plate has a material channel; optionally, a seal ring is provided between the third slideway and the pressing plate;

Optionally, the third slideway is provided with a lower limiting boss and a upper limiting boss, the pressing plate is located between the lower limiting boss and the upper limiting boss in the vertical direction, the lower limiting boss can work with the pressing plate to limit the downward movement distance of the pressing plate, and the upper limiting boss can work with the pressing plate to limit the upward movement distance of the pressing plate;

Optionally, the pressing device comprises an upper pressing plate and a lower pressing plate, wherein the upper pressing plate is located above the lower pressing plate, each of the upper pressing plate and the lower pressing plate is arranged on the circumferential wall face of the reaction chamber to be movable up and down, so that the lower pressing plate can be pressed against the catalyst bed layer, the upper pressing plate is provided with an upper material channel, and the lower pressing plate is provided with a lower material channel, wherein an inert filling material is provided between the upper pressing plate and the lower pressing plate; optionally, the filling ratio of the inert filling material is smaller than or equal to a first preset value;

Optionally, the pressing device further comprises a third slideway arranged on the circumferential wall face of the reaction chamber, and each of the upper pressing plate and the lower pressing plate is arranged on the third slideway to be movable up and down;

Optionally, the third slideway is provided with a lower limiting boss and an upper limiting boss, the upper pressing plate and the lower pressing plate are located between the lower limiting boss and the upper limiting boss in the vertical direction, the lower limiting boss can work with the lower pressing plate to limit the downward movement distance of the lower pressing plate, and the upper limiting boss can work with the upper pressing plate to limit the upward movement distance of the upper pressing plate;

Optionally, an upper seal ring is provided between the third slideway and the upper pressing plate, a lower seal ring is provided between the third slideway and the lower pressing plate; optionally, the pressing device further comprises a plurality of second guiding members, each of which passes through each of the upper pressing plate and the lower pressing plate in the vertical direction, each of the upper pressing plate and the lower pressing plate is arranged to be movable up and down with respect to each second guiding member; optionally, the pressing device further comprises a connecting member, the top end of the connecting member is connected with the upper pressing plate, and the bottom end of the connecting member is connected with the lower pressing plate; optionally, the distances between the upper pressing plates and the lower pressing plates of the plurality of pressing devices in the vertical direction are decremented in the material feeding direction.

Optionally, the pressing device comprises a plurality of second dust removing members, each of which is arranged between the upper pressing plate and the lower pressing plate and has a second accommodating cavity filled with the inert filling material, wherein the upper pressing plate has a plurality of upper material channels, the lower pressing plate has a plurality of lower material channels, the plurality of second dust removing members are opposite to the plurality of lower material channels in one-to-one correspondence in the vertical direction, a first material circulation cavity is defined between adjacent two second dust removing members, and the first material circulation cavity is opposite to the upper material channel in the vertical direction;

Optionally, the bottom end of the second dust removing member contacts with the lower pressing plate, and the top end of the second dust removing member contacts with the upper pressing plate;

Optionally, a first separating member is provided at a first side of each first material circulation cavity, a second separating member is provided at a second side of each first material circulation cavity, the first side is opposite to the second side in the horizontal direction, the first separating member comprises a first oblique plate and a first supporting member arranged on the upper pressing plate, and the second separating member comprises a second oblique plate and a second supporting member arranged on the upper pressing plate, wherein the bottom end of the first oblique plate is connected with the first supporting member, the first oblique plate extends from the first supporting member to the second side, the top end of the second oblique plate is connected with the second supporting member, the second oblique plate extends from the second supporting member to the first side, at least a part of the first oblique plate and at least a part of the second oblique plate are located right above the first material circulation cavity, the at least a part of the first oblique plate is located below the at least a part of the second oblique plate, and a material channel is defined between the at least a part of the first oblique plate and the at least a part of the second oblique plate;

Optionally, the first supporting member comprises a first rod portion and a first plate portion, the first rod portion is arranged on the upper pressing plate, the first plate portion is arranged on the first rod portion horizontally, and the bottom end of the first oblique plate is connected with the first plate portion.

Optionally, the upflow reactor further comprises a dust removing device that is arranged in the reaction chamber and located above the pressing device, and comprises: a lower plate, a middle plate, and an upper plate, the middle plate is located between the lower plate and the upper plate in the vertical direction, wherein the lower plate is provided with a plurality of first material channels, the middle plate is provided with a plurality of second material channels, and the upper plate is provided with a plurality of third material channels; a plurality of third dust removing members arranged between the lower plate and the middle plate in the vertical direction, each third dust removing member is opposite to a portion of the lower plate without the first material channel in the vertical direction, and the plurality of third dust removing members are opposite to the plurality of second material channels in one-to-one correspondence in the vertical direction; and a plurality of fourth dust removing members arranged between the middle plate and the upper plate in the vertical direction, each fourth dust removing member is opposite to a portion of the middle plate without the second material channel in the vertical direction, and the plurality of fourth dust removing members are opposite to the plurality of third material channels in one-to-one correspondence in the vertical direction;

Optionally, the bottom end of the third dust removing member contacts with the lower plate, and the top end of the third dust removing member contacts with the middle plate;

Optionally, the bottom end of the fourth dust removing member contacts with the middle plate, and the top end of the fourth dust removing member contacts with the upper plate;

Optionally, a second material circulation cavity is defined by adjacent two third dust removing members, and the second material circulation cavity is opposite to the first material channel in the vertical direction;

Optionally, a third material circulation cavity is defined between adjacent two fourth dust removing members, and the third material circulation cavity is opposite to the second material channel in the vertical direction;

Optionally, each third dust removing member has a third accommodating cavity filled with an inert filling material;

Optionally, each fourth dust removing member has a fourth accommodating cavity filled with an inert filling material.

Optionally, the upflow reactor further comprises a dust removing device that is arranged in the reaction chamber and located above the pressing device, and comprises: a dust deposition plate provided with a plurality of fourth material channels; a plurality of separating cylinders arranged on the dust deposition plate, the bottom end of the separating cylinder is open to form a material inlet, the top end of the separating cylinder is open to form a material outlet, and the material inlets of the plurality of separating cylinders are connected with the plurality of fourth material channels in one-to-one correspondence; and a plurality of separating caps arranged above the plurality of separating cylinders in one-to-one correspondence and spaced apart from the corresponding separating cylinders; optionally, each separating cap is arranged to be movable up and down; optionally, the rim of the projection of the separating cap on a horizontal plane is at the outer side of the rim of the projection of corresponding separating cylinder on the horizontal plane; optionally, the separating cap is horn-shaped;

Optionally, the dust removing device further comprises: a top plate, wherein optionally the dust deposition plate is arranged on the circumferential wall face of the reaction chamber, and the top plate is arranged on the circumferential wall face of the reaction chamber; and a plurality of outer cylinders, wherein the bottom end of each outer cylinder is connected with the dust deposition plate, the top end of each outer cylinder is connected with the top plate, the plurality of separating cylinders are arranged in the plurality of outer cylinders in one-to-one correspondence, the plurality of separating caps are arranged in the plurality of outer cylinders in one-to-one correspondence, wherein the inner circumferential face of the outer cylinder forms a slideway face, the separating cap is overlapped on the inner circumferential face of the corresponding outer cylinder to be movable up and down; optionally each separating cylinder is provided with a connecting plate that is movable up and down, and the separating cap is connected with the corresponding connecting plate.

Optionally, the upflow reactor further comprises a dust removing device that is arranged in the reaction chamber and located above the pressing device, and comprises: a lower plate, a middle plate, and an upper plate, the middle plate is located between the lower plate and the upper plate in the vertical direction, wherein the lower plate is provided with a plurality of first material channels, the upper plate is provided with a plurality of third material channels, and an inert filling material is provided between the upper plate and the middle plate;

optionally, the filling ratio of the inert filling material between the upper plate and the middle plate is smaller than or equal to a second preset value; a plurality of separating cylinders arranged on the lower plate, wherein the bottom end of each separating cylinder is open to form a material inlet, the top end of each separating cylinder is open to form a material outlet, and the material inlets of the plurality of separating cylinders are connected with the plurality of first material channels in one-to-one correspondence; a plurality of separating caps arranged above the plurality of separating cylinders in one-to-one correspondence and spaced apart from the corresponding separating cylinders; optionally, each separating cap is arranged to be movable up and down; optionally, the rim of the projection of the separating cap on a horizontal plane is at the outer side of the rim of the projection of corresponding separating cylinder on the horizontal plane; optionally, the separating cap is horn-shaped; and a plurality of filtering cylinders arranged on the lower plate, wherein a first portion of each filtering cylinder is located between the lower plate and the middle plate in the vertical direction, a second portion of each filtering cylinder is located between the middle plate and the upper plate in the vertical direction, wherein the first portion of each filtering cylinder is provided with a material inlet, and the second portion of each filtering cylinder is provided with a material outlet, and the filtering cylinder is filled with an inert filling material;

Optionally, the middle plate is provided with a plurality of second material channels;

Optionally, the lower plate is fixedly arranged on the circumferential wall face of the reaction chamber, and each of the middle plate and the upper plate are arranged on the circumferential wall face of the reaction chamber to be movable up and down; optionally, the dust removing device further comprises a fourth slideway arranged on the circumferential wall face of the reaction chamber, the lower plate is fixedly arranged on the fourth slideway, and each of the middle plate and the upper plate is arranged on the fourth slideway to be movable up and down; optionally, a seal ring is provided between the fourth slideway and the upper plate, and a seal ring is provided between the fourth slideway and the middle plate;

Optionally, the fourth slideway is provided with a supporting boss and an upper limiting boss, the lower plate is supported on the supporting boss, the upper plate is located below the upper limiting boss, and the upper limiting boss can work with the upper plate to limit the upward movement distance of the upper plate;

Optionally, each separating cylinder is surrounded by a plurality of filtering cylinders, and each filtering cylinder is surrounded by a plurality of separating cylinders.

Optionally, the upflow reactor further comprises a dust removing device that is arranged in the reaction chamber and located above the pressing device, and comprises: a lower plate, a middle plate, and an upper plate, the middle plate is located between the lower plate and the upper plate in the vertical direction, wherein the lower plate is provided with a plurality of first material channels, the middle plate is provided with a plurality of second material channels, the upper plate is provided with a plurality of third material channels, and an inert porous material is provided between the upper plate and the middle plate; and a plurality of membrane filtering assemblies, wherein a material inlet of each membrane filtering assembly is connected with the first material channel, and material outlets of the plurality of membrane filtering assemblies extend into the inert porous material provided between the upper plate and the middle plate;

Optionally, an inert filling material is provided between the lower plate and the middle plate, and a part of the plurality of the first material channels are connected with the material inlets of the membrane filtering assemblies;

Optionally, the dust removing device comprises a plurality of third dust removing members, each of which is arranged between the upper plate and the middle plate and has a third accommodating cavity filled with the inert porous material, wherein the material outlets of the plurality of membrane filtering assemblies extend into the inert porous material in the plurality of third accommodating cavities in one-to-one correspondence; optionally, a second material circulation cavity is defined between adjacent two third dust removing members, the second material circulation cavity is opposite to the second material channel in the vertical direction, and the second material circulation cavity is opposite to the third material channel in the vertical direction.

Optionally, the pressing device comprises: an upper pressing plate and a lower pressing plate, wherein the upper pressing plate is located above the lower pressing plate, each of the upper pressing plate and the lower pressing plate is arranged on the circumferential wall face of the reaction chamber to be movable up and down, so that the lower pressing plate can be pressed against the catalyst bed layer, the upper pressing plate is provided with an upper material channel, the lower pressing plate is provided with a lower material channel, and an inert filling material may be provided between the upper pressing plate and the lower pressing plate; and a second membrane assembly that is arranged between the upper pressing plate and the lower pressing plate and has a second gas inlet; optionally, the second gas inlet of the second membrane assembly can be in communication with a hydrogen supply pipeline; optionally, the second membrane assembly comprises a plurality of second membrane assemblies spaced apart from each other; optionally, each second membrane assembly is arranged vertically; optionally, the bottom end of each second membrane assembly is open to form the second gas inlet; optionally, the pressing device further comprises a second gas intake pipe having a plurality of gas outlets, and the second gas inlets of the plurality of second membrane assemblies are connected with the plurality of gas outlets of the second gas intake pipe in one-to-one correspondence; optionally, the top end of each second membrane assembly is closed; optionally, the pressing device further comprises a closing pipe having a plurality of communication holes, and the top ends of the plurality of second membrane assemblies are connected with the plurality of communication holes in one-to-one correspondence;

Optionally, the pressing device further comprises a connecting pipe, wherein a first end of the connecting pipe is connected with the second gas intake pipe, a second end of the connecting pipe can be in communication with the hydrogen supply pipeline; optionally, the connecting pipe is a hose; optionally, the connecting pipe is a metal hose.

Optionally, the pressing device comprises an upper elastomer bed layer that can be pressed on the catalyst bed layer; optionally, the upper elastomer bed layer is in a compressed state so as to normally press the catalyst bed layer; optionally, the upper elastomer bed layer is filled with elastic particles; optionally, the filling ratio of the elastic particles in the upper elastomer bed layer is smaller than or equal to a third preset value.

Optionally, the upflow reactor further comprises a lower elastomer bed layer arranged in the reaction chamber and located below the catalyst bed layer, wherein the lower elastomer bed layer can abut against the catalyst bed layer so as to press the catalyst bed layer; optionally, the lower elastomer bed layer is in a compressed state so as to normally press the catalyst bed layer; optionally, the lower elastomer bed layer is filled with elastic particles; optionally, the filling ratio of the elastic particles in the lower elastomer bed layer is smaller than or equal to a fourth preset value;

Optionally, the upflow reactor further comprises: an upper bearing layer that is arranged in the reaction chamber and located above the upper elastomer bed layer, and contacts with the upper elastomer bed layer so as to support the upper elastomer bed layer; and a lower bearing layer that is arranged in the reaction chamber and located below the lower elastomer bed layer, and contacts with the lower elastomer bed layer so as to support the lower elastomer bed layer;

Optionally, each of the upper bearing layer and the lower bearing layer comprises a screen cover and inert ceramic blocks filled in the screen cover.

Optionally, the upflow reactor further comprises: a feeding distributor that is arranged in the reaction chamber and has a material inlet and a plurality of material outlets that are open downward; and a feeding pipe connected with the material inlet of the feeding distributor;

Optionally, the feeding distributor comprises a lower feeding distributor that is arranged below the catalyst bed layer and has a lower material inlet and a plurality of lower material outlets that are open downward, and the lower mass inlet is connected with the feeding pipe;

Optionally, the feeding distributor further comprises an upper feeding distributor that is arranged above the catalyst bed layer and has an upper material inlet and a plurality of upper material outlets that are open downward, and the upper mass inlet is connected with the feeding pipe;

Optionally, the upflow reactor comprises a plurality of feeding distributors and a plurality of catalyst bed layers arranged in the vertical direction, wherein, each catalyst bed layer is provided with the upper feeding distributor above it and the lower feeding distributor below it, except the topmost catalyst bed layer;

Optionally, the upflow reactor further comprises: an upper circulated material distributor that is arranged in the reaction chamber and located above the topmost catalyst bed layer, and has an upper circulated material inlet and a plurality of upper circulated material outlets that are open downward; a lower circulated material distributor that is arranged in the reaction chamber and located below the topmost catalyst bed layer but above the rest catalyst bed layers, and has a lower circulated material inlet and a plurality of lower circulated material outlets that are open downward; and a circulated material pipe, with a first end in communication with the reaction material outlet and a second end in communication with each of the upper circulated material inlet and the lower circulated material inlet.

Optionally, the upflow reactor further comprises a sliding support arranged in the reaction chamber to be movable up and down, wherein the catalyst bed layer can be supported on the sliding support, and the sliding support has a material channel so that the reaction materials can pass through the sliding support;

Optionally, the sliding support comprises a first slideway and a first grating plate, wherein the first slideway is arranged on the circumferential wall face of the reaction chamber, the first grating plate is arranged on the first slideway to be movable up and down, and the catalyst bed layer can be supported on the first grating plate;

Optionally, the first slideway is provided with a lower limiting boss and an upper limiting boss, wherein the first grating plate is located between the lower limiting boss and the upper limiting boss in the vertical direction, the lower limiting boss can work with the first grating plate to limit the downward movement distance of the first grating plate, and the upper limiting boss can work with the first grating plate to limit the upward movement distance of the first grating plate. Optionally, the upflow reactor further comprises a protectant layer arranged in the reaction chamber and located below the catalyst bed layer.

Figure 1:
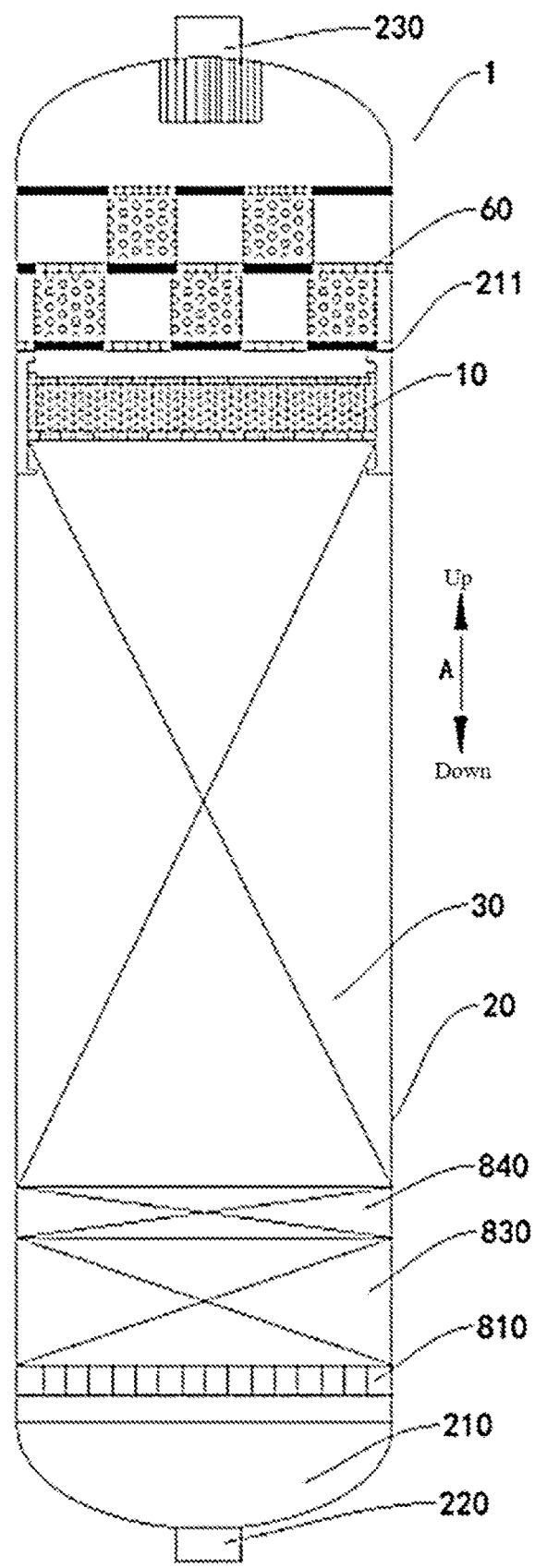
FIG. 1 is a schematic structural diagram of the upflow reactor according to a first embodiment of the present invention.
Figure 2:
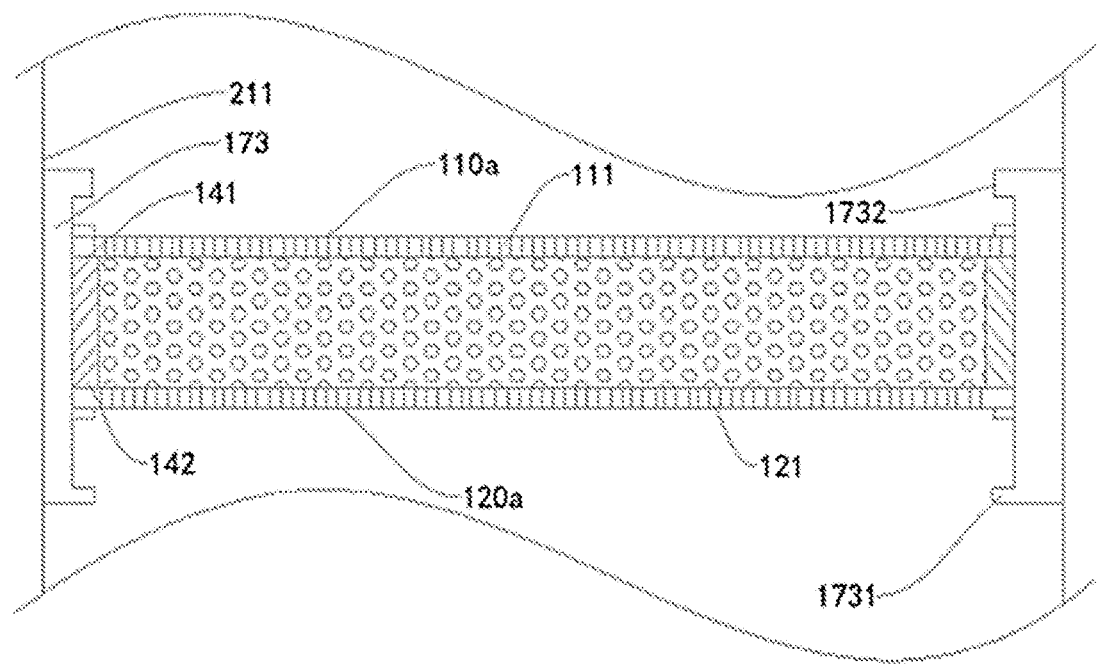
FIG. 2 is a partial schematic structural diagram of the upflow reactor according to the first embodiment of the present invention.

1—upflow reactor; 10—pressing device; 130a—pressing plate; 110a—upper pressing plate; 111—upper material channel; 120a—lower pressing plate; 121—lower material channel; 141—upper seal ring; 142—lower seal ring; 150—second dust removing member; 151—second accommodating cavity; 152—first material circulation cavity; 160—second membrane assembly; 161—bottom end; 162—top end; 171—closing pipe; 172—connecting pipe; 173—third slideway; 174—second gas intake pipe; 180—first separating member; 181—first oblique plate; 182—first supporting member; 1821—first rod portion; 1822—first plate portion; 183—material channel; 190—second separating member; 191—second oblique plate; 192—second supporting member; 1921—second rod portion; 1922—second plate portion; 110b—upper elastomer bed layer; 120b—lower elastomer bed layer; 130b—upper bearing layer; 140b—lower bearing layer; 20—housing; 210—reaction chamber; 211—circumferential wall face; 220—reaction material inlet; 230—reaction material outlet; 30—catalyst bed layer; 310—upper catalyst section; 320—lower catalyst section; 410—sliding support; 411—first slideway; 412—first grating plate; 420—upper linkage; 430—lower linkage; 421a—first linking plate; 422a—second linking plate; 423a—first guiding member; 421b—second slideway; 422b—linking plate; 441—upper elastic member; 442—lower elastic member; 50—filtering device; 510—first dust removing member; 511—shell; 512—first accommodating cavity; 520—isolating member; 530—first membrane assembly; 540—first gas intake pipe; 60—dust removing device; 610a—lower plate; 611a—first material channel; 620a—middle plate; 621a—second material channel; 630a—upper plate; 631a—third material channel; 640a—third dust removing member; 641a—third accommodating cavity; 650a—fourth dust removing member; 651a—fourth accommodating cavity; 661a—second material circulation cavity; 662a—third material circulation cavity; 610b—dust deposition plate; 611b—fourth material channel; 620b—separating cylinder; 621b—material inlet; 622b—material outlet; 630b—separating cap; 640b—top plate; 650b—outer cylinder; 651b—inner circumferential face; 660b—connecting plate; 610c—lower plate; 611c—first material channel; 620c—middle plate; 621c—second material channel; 630c—upper plate; 631c—third material channel; 640c—separating cylinder; 641c—material inlet; 642c—material outlet; 650c—separating cap; 660c—filtering cylinder; 661c—first portion; 662c—second portion; 663c—material inlet; 664c—material outlet; 670c—fourth slideway; 610d—lower plate; 611d—first material channel; 620d—middle plate; 621d—second material channel; 630d—upper plate; 640d—membrane filtering assembly; 641d—material inlet; 642d—material outlet; 650d—third dust removing member; 651d—third accommodating cavity; 660d—second material circulation cavity; 70—feeding distributor; 710—lower feeding distributor; 720—upper feeding distributor; 730—feeding pipe; 740—upper circulated material distributor; 750—lower circulated material distributor; 760—circulated material pipe; 770—press cover grating; 780—sliding support grating; 810—supporting plate; 830—protectant layer; 840—ceramic ball layer; 850—hydrogen-oil mixer.

DETAILED DESCRIPTION

Hereunder some embodiments of the present disclosure will be detailed, and examples of the embodiments are shown in the accompanying drawings. It should be noted that the embodiments described later with reference to the accompanying drawings are only exemplary and are provided only to explain the present invention rather than constitute any limitation to the present invention.

Hereunder the upflow reactor 1 according to the embodiments of the present invention will be described later with reference to the accompanying drawings. As shown in FIGS. 1-36, the upflow reactor 1 according to the embodiments of the present invention comprises a housing 20, a catalyst bed layer 30, and a pressing device 10.

The housing 20 is provided with a reaction chamber 210 therein, and a reaction material inlet 220 and a reaction material outlet 230 thereon, which are in communication with the reaction chamber 210. The catalyst bed layer 30 is arranged in the reaction chamber 210, the pressing device 10 is arranged in the reaction chamber 210, and the pressing device 10 is located above the catalyst bed layer 30; wherein, at least a part of the pressing device 10 is arranged to be movable up and down, so that the at least a part of the pressing device 10 can be pressed against the catalyst bed layer 30. The up-down (vertical) direction is indicated by the arrow A in FIG. 1.

When the flow rate and/or pressure of the reaction materials entering into the reaction chamber suddenly increases (the positive fluctuation amplitude of the flow rate and/or pressure suddenly increases), the catalyst bed layer expands and causes increased distances among the catalyst particles to increase, i.e., increased floating space of the catalyst particles. After the floating space of the catalyst particles is increased, the gouging abrasion of the catalyst particles will be increased, and thereby catalyst dust will be generated.

When the flow rate and/or pressure of the reaction materials entering into the reaction chamber suddenly decreases (the negative fluctuation amplitude of the flow rate and/or pressure suddenly increases), the catalyst bed layer contracts, and thereby the space above the catalyst bed layer is increased. The increased space above the catalyst bed layer results in free floating and falling of the catalyst particles along with the reaction materials or even roll-over of the catalyst particles, thereby the gouging abrasion of the catalyst particles is increased, resulting in the generation of catalyst dust.

The pressing device 10 is configured to be movable up and down in the upflow reactor 1 according to the embodiments of the present invention, so that the pressing device 10 is always pressed against the catalyst bed layer 30.

Since the pressing device 10 has a pressing effect on the catalyst bed layer 30, the impact force of the reaction material on the catalyst bed layer 30 is smaller than or equal to the pressing force of the pressing device 10 on the catalyst bed layer 30 when the amplitude of sudden increase of the flow rate and/or pressure of the reaction materials entering into the reaction chamber 210 reduces (the positive sudden change reduces), thus the expansion of the catalyst bed layer 30 can be avoided, and thereby the gouging abrasion of the catalyst particles can be greatly reduced, so that the amount of generated catalyst dust can be greatly reduced.

When the amplitude of sudden increase of the flow rate and/or pressure of the reaction materials entering into the reaction chamber 210 is great (the positive sudden change is great), the degree of expansion of the catalyst bed layer 30 can be decreased owing to the pressing effect of the pressing device 10 on the catalyst bed layer 30, thus the floating space of the catalyst particles is decreased, thereby the gouging abrasion of the catalyst particles can be greatly reduced, and the amount of generated catalyst dust can be greatly reduced.

Moreover, when the positive sudden change of the flow rate and/or pressure of the reaction materials entering into the reaction chamber 210 ends, the catalyst bed layer 30 will fall back. Since the pressing device 10 can move up and down, the pressing device 10 will fall back together with the catalyst bed layer 30 when the impact force on the pressing device 10 is decreased, thereby the pressing device 10 can press and hold the catalyst bed layer 30. Thus, the gouging abrasion of the catalyst particles can be greatly reduced, and thereby the amount of generated catalyst dust can be greatly reduced.

When the flow rate and/or pressure of the reaction materials entering into the reaction chamber 210 suddenly decreases, the catalyst bed layer 30 contracts (falls back). Moreover, when the reaction materials are supplied into the reaction chamber 210, the catalyst bed layer 30 will also contract (fall back). Since the pressing device 10 can move up and down, the pressing device 10 will fall back together with the catalyst bed layer 30, so that the pressing device 10 can press and hold the catalyst bed layer 30. Thus, the space above the catalyst bed layer 30 can be eliminated, thereby the gouging abrasion of the catalyst particles can be greatly reduced, and the amount of generated catalyst dust can be greatly reduced.

Therefore, by providing the pressing device 10 in the upflow reactor 1 according to the embodiments of the present invention, the gouging abrasion of the catalyst particles can be greatly decreased, thereby the amount of the generated catalyst dust can be greatly reduced. Thus, the increase of pressure drop and the blocking of the materials owing to clogging of the catalyst bed layer 30 by the catalyst dust can be prevented, and the operation cycle of the upflow reactor 1 can be greatly prolonged.

Moreover, since the pressing device 10 can move up and down, the pressing device 10 can move up as the pressure drop in the catalyst bed layer 30 increases, so that the catalyst bed layer 30 can expand. Thus, the pressure drop in the catalyst bed layer 30 can be decreased, and the operation cycle of the upflow reactor 1 can be prolonged.

Therefore, the upflow reactor 1 according to the embodiments of the present invention has advantages such as low abrasion of catalyst particles, small amount of generated catalyst dust, and long operation period, etc.

As shown in FIGS. 1-36, the upflow reactor 1 comprises a housing 20, a catalyst bed layer 30, and a pressing device 10. The housing 20 is provided with a reaction chamber 210 therein, and a reaction material inlet 220 and a reaction material outlet 230 thereon, which are in communication with the reaction chamber 210. The bottom of the housing 20 may be provided with a reaction material inlet 220, and the top of the housing 20 may be provided with a reaction material outlet 230.

The catalyst bed layer 30 is arranged in the reaction chamber 210, the pressing device 10 is arranged in the reaction chamber 210, and the pressing device 10 is located above the catalyst bed layer 30 and can be pressed against the catalyst bed layer 30. At least a part of the pressing device 10 is arranged to be movable up and down, so that the at least a part of the pressing device 10 can be pressed against the catalyst bed layer 30.

The reaction materials may comprise oil product and hydrogen, i.e., a hydrogenation reaction may be carried out with the upflow reactor 1. The oil product may be hydrocarbon oil, which may be any distillate with a distillation range of 130° C.-550° C. The hydrocarbon oil may be selected from but not limited to one or more of naphtha, reformate, aviation kerosene, diesel oil, wax oil, lube oil, residual oil, deasphalted oil, biodiesel, animal oil, and vegetable oil, etc.

The catalyst bed layer 30 may be filled with same type or different types of catalysts, i.e., the same type or different types of catalysts may be filled in the reaction chamber 210 so as to form the catalyst bed layer 30. The catalyst in the catalyst bed layer 30 may be any catalyst with hydrogenation functions known to those skilled in the art, such as one or more of hydro-desulfurization, hydro-denitrogenation, hydro-demetalization, hydrosaturation, hydro-isomerization, and hydro-defreezing, etc.

As shown in FIGS. 16, 18, 19 and 22, the upflow reactor 1 may comprise a plurality of catalyst bed layers 30 and a plurality of pressing devices 10, and the plurality of catalyst bed layers 30 and the plurality of pressing devices 10 are arranged alternately in the vertical direction, so that each pressing device 10 can be pressed against one catalyst bed layer 30. In other words, a pressing device 10 is arranged between two adjacent catalyst bed layers 30, and a catalyst bed layer 30 is arranged between two adjacent pressing devices 10.

Optionally, the plurality of catalyst bed layers 30 are in height incremented in the material feeding direction. Since the impact force of the reaction material on the catalyst bed layer 30 and the buoyance of the catalyst bed layer 30 decrease (decrement) in the material feeding direction, the gouging abrasion of the catalyst particles (the abrasion of the catalyst bed layer) decreases (decrements) in the material feeding direction. Thus, even if the height of the catalyst bed layer 30 is increased in the material feeding direction, the degree of gouging abrasion of the catalyst particles will not be increased.

As shown in FIGS. 8-11, the pressing device 10 comprises an upper elastomer bed layer 110b, which can be pressed against the catalyst bed layer 30. Optionally, the upper elastomer bed layer 110b is filled with elastic particles. The shapes of the elastic particles may be one or more of spherical shape, strip shape, polygonal shape, toothed spherical shape, and block shape, etc. The elastic particles may be made of a high temperature-resistant rubber material, which may be one or more of silicone rubber, boron silicone rubber and fluorosilicone rubber. Optionally, the filling ratio of the elastic particles of the upper elastomer bed layer 110b is smaller than or equal to a third preset value, so as to facilitate the reaction materials to pass through the upper elastomer bed layer 110b; wherein, the filling ratio of the elastic particles of the upper elastomer bed layer 110b is equal to the total volume of the elastic particles divided by the volume of the upper elastomer bed layer 110b.

When the positive sudden change of the flow rate and/or pressure of the reaction materials entering into the reaction chamber 210 is small, the impact force of the reaction material on the catalyst bed layer 30 is smaller than or equal to the elastic force applied by the upper elastomer bed layer 110b on the catalyst bed layer 30, thus the expansion of the catalyst bed layer 30 can be avoided, and thereby the gouging abrasion of the catalyst particles can be greatly reduced, so that the amount of generated catalyst dust can be greatly reduced.

When the positive sudden change of the flow rate and/or pressure of the reaction material entering into the reaction chamber 210 is great, the catalyst bed layer 30 expands so that the upper elastomer bed layer 110b is compressed, the compressed upper elastomer bed layer 110b applies elastic force on the catalyst bed layer 30 so as to press the catalyst bed layer 30, thus the degree of expansion of the catalyst bed layer 30 can be decreased so as to decrease the floating space of the catalyst particles, thereby the gouging abrasion of the catalyst particles can be greatly reduced, and thus the amount of the generated catalyst dust can be greatly reduced.

When the positive sudden change of the flow rate and/or pressure of the reaction materials entering into the reaction chamber 210 ends, the catalyst bed layer 30 will fall back. At that point, the upper elastomer bed layer 110b expands to persistently press and hold the catalyst bed layer 30. Thus, the gouging abrasion of the catalyst particles can be greatly reduced, and thereby the amount of generated catalyst dust can be greatly reduced.

Moreover, as the pressure drop in the catalyst bed layer 30 increases, the upper elastomer bed layer 110b is compressed by the catalyst bed layer 30, so that the catalyst bed layer 30 can expand. Thus, the pressure drop in the catalyst bed layer 30 can be decreased, and the operation cycle of the upflow reactor 1 can be prolonged. Optionally, the upper elastomer bed layer 110b is in a compressed state so as to normally press the catalyst bed layer 30. Thus, the upper elastomer bed layer 110b can apply greater elastic force on the catalyst bed layer 30, so as to offset greater positive sudden change of the flow rate and/or pressure of the reaction materials. Moreover, when the flow rate and/or pressure of the reactant entering into the reaction chamber 210 suddenly decreases, the upper elastomer bed layer 110b can expand to persistently press the catalyst bed layer 30. Thus, the space above the catalyst bed layer 30 can be eliminated, thereby the gouging abrasion of the catalyst particles can be greatly reduced, and the amount of generated catalyst dust can be greatly reduced.

As shown in FIGS. 8-11, the upflow reactor 1 further comprises a lower elastomer bed layer 120b, which is arranged in the reaction chamber 210. The lower elastomer bed layer 120b is located below the catalyst bed layer 30, and can abut against the catalyst bed layer 30 so as to press the catalyst bed layer 30.

When the positive sudden change of the flow rate and/or pressure of the reaction material entering into the reaction chamber 210 is great, the catalyst bed layer 30 expands so that the lower elastomer bed layer 120b is compressed, the compressed lower elastomer bed layer 120b applies elastic force on the catalyst bed layer 30 so as to press the catalyst bed layer 30, thus the degree of expansion of the catalyst bed layer 30 can be decreased so as to decrease the floating space of the catalyst particles, thereby the gouging abrasion of the catalyst particles can be greatly reduced, and thus the amount of the generated catalyst dust can be greatly reduced.

Optionally, the lower elastomer bed layer 120b is in a compressed state so as to normally press the catalyst bed layer 30. Thus, when the flow rate and/or pressure of the reactant entering into the reaction chamber 210 suddenly decreases, the lower elastomer bed layer 120b can expand to persistently press the catalyst bed layer 30. Thus, the gouging abrasion of the catalyst particles can be greatly reduced, and thereby the amount of generated catalyst dust can be greatly reduced.

Optionally, the lower elastomer bed layer 120b is filled with elastic particles. The shapes of the elastic particles may be one or more of spherical shape, strip shape, polygonal shape, toothed spherical shape, and block shape, etc. The elastic particles may be made of a high temperature-resistant rubber material, which may be one or more of silicone rubber, boron silicone rubber and fluorosilicone rubber. Optionally, the filling ratio of the elastic particles of the lower elastomer bed layer 120b is smaller than or equal to a fourth preset value, so as to facilitate the reaction materials to pass through the upper elastomer bed layer 110b; wherein, the filling ratio of the elastic particles of the lower elastomer bed layer 120b is equal to the total volume of the elastic particles divided by the volume of the lower elastomer bed layer 120b.

As shown in FIGS. 8-11, the upflow reactor 1 further comprises an upper bearing layer 130b and a lower bearing layer 140b, wherein the upper bearing layer 130b is arranged in the reaction chamber 210, and the lower bearing layer 140b is arranged in the reaction chamber 210. The upper bearing layer 130b is located above the upper elastomer bed layer 110b, and contacts with (abuts against) the upper elastomer bed layer 110b so as to support the upper elastomer bed layer 110b. The lower bearing layer 140b is located below the lower elastomer bed layer 120b, and contacts with (abut against) the lower elastomer bed layer 120b so as to support the lower elastomer bed layer 120b.

By providing the upper bearing layer 130b and the lower bearing layer 140b, the upper bearing layer 130b can be utilized to support and offset the deformation displacement of the upper elastomer bed layer 110b, the lower bearing layer 140b can be utilized to support and offset the deformation displacement of the lower elastomer bed layer 120b, thereby the upper elastomer bed layer 110b and the lower elastomer bed layer 120b can be deformed in a limited space. Optionally, each of the upper elastomer bed layer 110*b*, the lower elastomer bed layer 120*b*, the upper bearing layer 130*b* and the lower bearing layer 140*b* is arranged horizontally.

Those skilled in the art can understand that both the upper bearing layer 130*b* and the lower bearing layer 140*b* have a material channel, so that the reaction materials can pass through the upper bearing layer 130*b* and the lower bearing layer 140*b*.

Optionally, each of the upper bearing layer 130*b* and the lower bearing layer 140*b* comprises a screen cover and inert ceramic blocks filled in the screen cover. Optionally, the inert ceramic blocks may be spherical. Optionally, a pressing plate or dust removing device 60 may be arranged above the upper bearing layer 130*b*, and the upper bearing layer 130*b* may abut against the pressing plate or dust removing device 60. A supporting plate 810 may be arranged below the lower bearing layer 140*b*, and the lower bearing layer 140*b* may abut against the supporting plate 810.

As shown in FIGS. 23, 25, 26 and 29, the pressing device 10 may comprise a pressing plate 130*a* arranged on the circumferential wall face 211 of the reaction chamber 210 to be movable up and down, so that the pressing plate 130*a* can be pressed against the catalyst bed layer 30. The pressing plate 130*a* may have a material channel, so that the reaction materials can pass through the pressing plate 130*a*. Optionally, the pressing plate 130*a* may be a grating plate or Johnson screen, and the size of the gap of the pressing plate 130*a* may be smaller than the size of the catalyst particles of the catalyst bed layer 30, so as to prevent the loss of the catalyst particles. Optionally, the pressing plate 130*a* is arranged horizontally.

Optionally, the pressing device 10 comprises a third slideway 173 arranged on the circumferential wall face 211 of the reaction chamber 210, and a pressing plate 130*a* arranged on the third slideway 173 to be movable up and down so that the pressing plate 130*a* can be pressed against the catalyst bed layer 30. The pressing plate 130*a* has a material channel, so that the reaction materials can pass through the pressing plate 130*a*. Thus, the pressing plate 130*a* can be installed more conveniently and easily, thereby the manufacturing difficulty of the upflow reactor 1 can be reduced. A seal ring is provided between the third slideway 173 and the pressing plate 130*a*, so as to prevent the catalyst particles from loss between the third slideway 173 and the pressing plate 130*a*.

As shown in FIGS. 23, 25, 26 and 29, the third slideway 173 is provided with a lower limiting boss 1731 and an upper limiting boss 1732, and the pressing plate 130*a* is located between the lower limiting boss 1731 and the upper limiting boss 1732 in the vertical direction. The lower limiting boss 1731 can work with the pressing plate 130*a* to limit the downward movement distance (displacement) of the pressing plate 130*a*, and the upper limiting boss 1732 can work with the pressing plate 130*a* to limit the upward movement distance (displacement) of the pressing plate 130*a*.

As shown in FIGS. 23, 25, 26 and 29, the catalyst bed layer 30 comprises an upper catalyst section 310 and a lower catalyst section 320, wherein the upper catalyst section 310 is located above the lower catalyst section 320, and the pressing device 10 can be pressed against the upper catalyst section 310.

The upflow reactor 1 may further comprise a sliding support 410, an upper linkage 420, a lower linkage 430, an upper elastic member 441 and a lower elastic member 442. The sliding support 410 is arranged in the reaction chamber 210 to be movable up and down, the lower catalyst section 320 can be supported on the sliding support 410, and the sliding support 410 has a material channel so that the reaction materials can pass through the sliding support 410.

The upper linkage 420 and the lower linkage 430 are arranged in the reaction chamber 210 to be movable up and down, and the upper linkage 420 is located above the lower linkage 430. Each of the upper linkage 420 and the lower linkage 430 has a material channel so that the reaction materials can pass through the upper linkage 420 and the lower linkage 430. The upper linkage 420 and the lower linkage 430 are located between the upper catalyst section 310 and the lower catalyst section 320 in the vertical direction, the upper catalyst section 310 can be supported on the upper linkage 420, and the lower linkage 430 can be pressed against the lower catalyst section 320.

The top end of the upper elastic member 441 is connected with the pressing device 10, and the bottom end of the upper elastic member 441 is connected with the upper linkage 420. The bottom end of the lower elastic member 442 is connected with the sliding support 410, and the top end of the lower elastic member 442 is connected with the lower linkage 430.

Owing to buoyancy, the upper catalyst section 310 and the lower catalyst section 320 are in an expanded state after feeding, and expand or contract with the sudden changes (i.e., not slow changes) of the flow rate and/or pressure of the reactant materials entering into the reaction chamber 210.

When the lower catalyst section 320 expands, the sliding support 410 and the lower linkage 430 act simultaneously, and the sliding support 410 moves downward, while the lower linkage 430 moves upward; when the lower catalyst section 320 contracts, the sliding support 410 and the lower linkage 430 act simultaneously, and the sliding support 410 moves upward, while the lower linkage 430 moves downward. Thus, the catalyst particles of the lower catalyst section 320 can float uniformly in the vertical direction, the local resistance can be reduced, the pressure drop in the lower catalyst section 320 can be homogenized; moreover, the lower catalyst section 320 can be quickly recovered to its original state, thus the gouging abrasion of the catalyst particles can be greatly reduced so as to reduce catalyst dust and alleviate the increase of pressure drop in the lower catalyst section 320.

When the upper catalyst section 310 expands, the pressing device 10 and the upper linkage 420 act simultaneously, and the pressing device 10 moves upward, while the upper linkage 420 moves downward; when the upper catalyst section 310 contracts, the pressing device 10 and the upper linkage 420 act simultaneously, and the pressing device 10 moves downward, while the upper linkage 420 moves upward. Thus, the catalyst particles of the upper catalyst section 310 can float uniformly in the vertical direction, the local resistance can be reduced, the pressure drop in the upper catalyst section 310 can be homogenized; moreover, the upper catalyst section 310 can be quickly recovered to its original state, thus the gouging abrasion of the catalyst particles can be greatly reduced so as to reduce catalyst dust and alleviate the increase of pressure drop in the upper catalyst section 310.

As shown in FIGS. 23, 25, 26 and 29, the sliding support 410 comprises a first slideway 411 arranged on the circumferential wall face 211 of the reaction chamber 210, and a first grating plate 412 arranged on the first slideway 411 to be movable up and down, and the lower catalyst section 320 can be supported on the first grating plate 412.

Optionally, the first slideway 411 is provided with a lower limiting boss 4111 and an upper limiting boss 4112, wherein the first grating plate 412 is located between the lower limiting boss 4111 and the upper limiting boss 4112 in the vertical direction, the lower limiting boss 4111 can work with the first grating plate 412 to limit the downward movement distance of the first grating plate 412, and the upper limiting boss 4112 can work with the first grating plate 412 to limit the upward movement distance of the first grating plate 412.

Optionally, each of the upper linkage 420 and the lower linkage 430 comprises a first linking plate 421a, a second linking plate 422a and a plurality of first guiding members 423a, and each of the first linking plate 421a and the second linking plate 422a can move up and down and has a material channel Each first guiding member 423a passes through each of the first linking plate 421a and the second linking plate 422a in the vertical direction, and each of the first linking plate 421a and the second linking plate 422a is arranged to be movable up and down with respect to each first guiding member 423a. The upper catalyst section 310 can be supported on the first linking plate 421a of the upper linkage 420, and the second linking plate 422a of the lower linkage 430 can be pressed against the lower catalyst section 320.

At least one of the first linking plate 421a and the second linking plate 422a is provided with a seal ring between the circumferential wall face 211 of the reaction chamber 210. The first linking plate 421a and the second linking plate 422a may be grating plates or Johnson screens.

Figure 23:
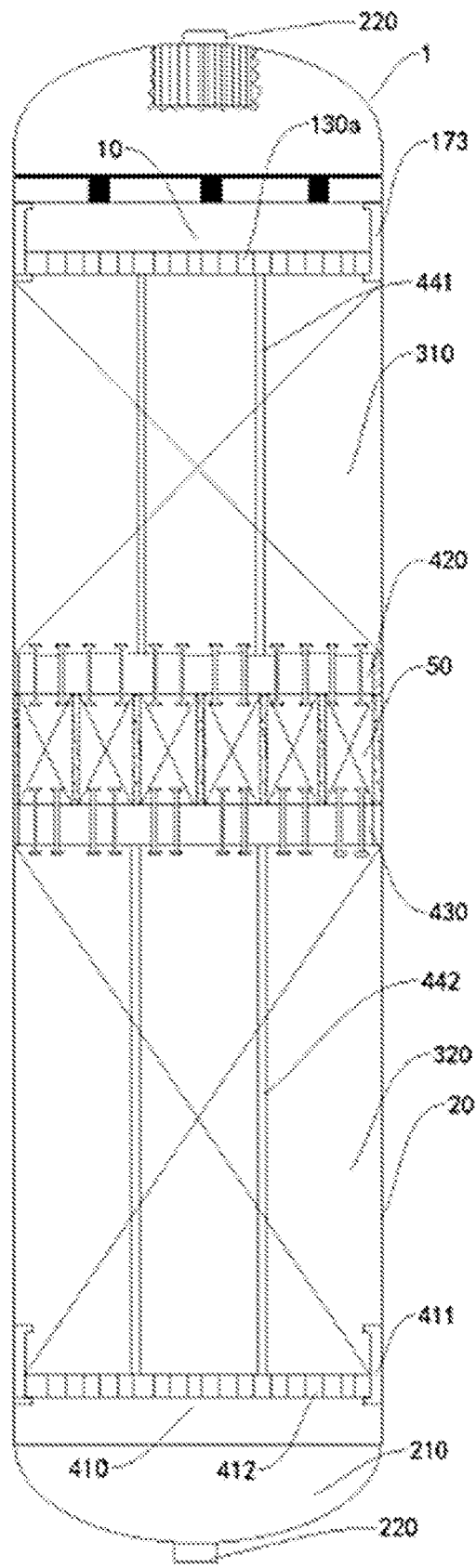
FIG. 23 is a schematic structural diagram of the upflow reactor according to a sixth embodiment of the present invention.
Figure 25:
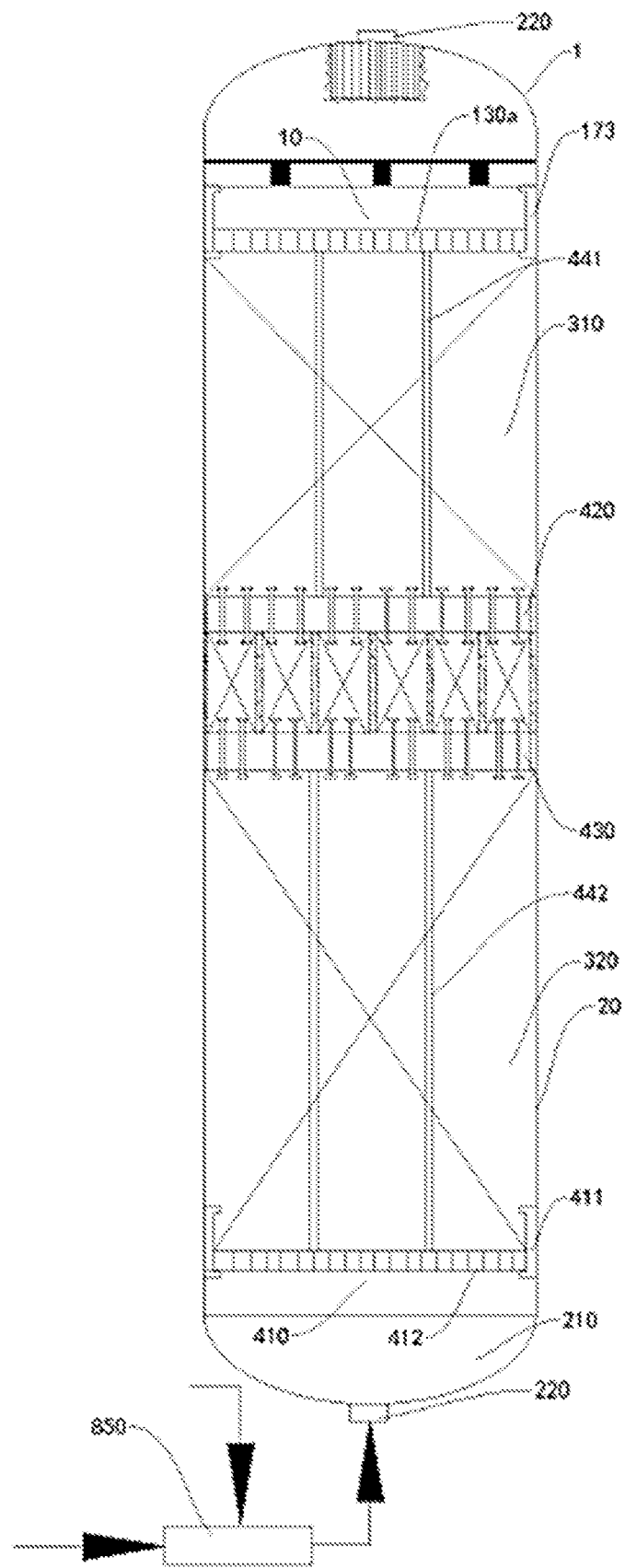
FIG. 25 is a schematic structural diagram of the upflow reactor according to the sixth embodiment of the present invention.

As shown in FIGS. 23 and 25, the top end of the upper elastic member 441 is connected with the pressing plate 130a, and the bottom end of the upper elastic member 441 is connected with the first linking plate 421a of the upper linkage 420. The bottom end of the lower elastic member 442 is connected with the first grating plate 412, and the top end of the lower elastic member 442 is connected with the second linking plate 422a of the lower linkage 430.

As shown in FIGS. 23, 25, 26 and 29, the upflow reactor 1 further comprises a filtering device 50, which is arranged in the reaction chamber 210 and located between the upper linkage 420 and the lower linkage 430 in the vertical direction.

By arranging a filtering device 50 between the upper linkage 420 and the lower linkage 430, the impact force of the reaction materials can be buffered so as to reduce the impact force of the reaction materials on the upper catalyst section 310, thus the gouging abrasion of the catalyst particles of the upper catalyst section 310 can be reduced so as to reduce catalyst dust, and the pressure drop in the upper catalyst section 310 can be controlled at a low level; moreover, the small amount of catalyst dust generated by the lower catalyst section 320 can be filtered and deposit, thus the pressure drop in the lower catalyst section 320 can be controlled effectively.

As shown in FIGS. 23 and 25, the filtering device 50 comprises a plurality of first dust removing members 510 and a plurality of isolating members 520. Each first dust removing member 510 comprises a deformable shell 511 having a first accommodating cavity 512 filled with an inert filling material. Optionally, the shell 511 may be a Johnson screen and may be cylindrical, and the inert filling material may be one or more of inert alumina, porous ceramic material and porous metal material. For example, the first accommodating cavity 512 is filled with inert alumina ceramic balls and/or porous ceramic particles.

Each isolating member 520 is located between two adjacent shells 511 in the horizontal direction or the vertical direction, and each isolating member 520 is made of an elastic material. As the upflow reactor 1 operates, the amount of deposited catalyst dust in the filtering device 50 becomes more and more, and the shell 511 of the first dust removing member 510 may be deformed (for example, in the horizontal direction or in the vertical direction), so as to press the adjacent isolating members 520. Thus, the volume of the first accommodating cavity 512 can be increased, thereby the material throughput and the amount of deposited catalyst dust in the filtering device 50 can be increased, so as to reduce the pressure drop in the filtering device 50.

Each isolating member 520 may comprise particles made of an elastic material in shapes that may be one or more of spherical shape, strip-shape, polygonal shape, toothed spherical shape, and block shape, and the elastic material may be a high temperature-resistant rubber material, which may be one or more of silicone rubber, boron silicone rubber and fluorosilicone rubber.

Optionally, each isolating member 520 is made of an elastic plastic material. As shown in FIGS. 23 and 25, the bottom end of each first guiding member 423a of the upper linkage 420 extends into the inert filling material in the first accommodating cavity 512, and the top end of each first guiding member 423a of the lower linkage 430 extends into the inert filling material in the first accommodating cavity 512.

Figure 26:
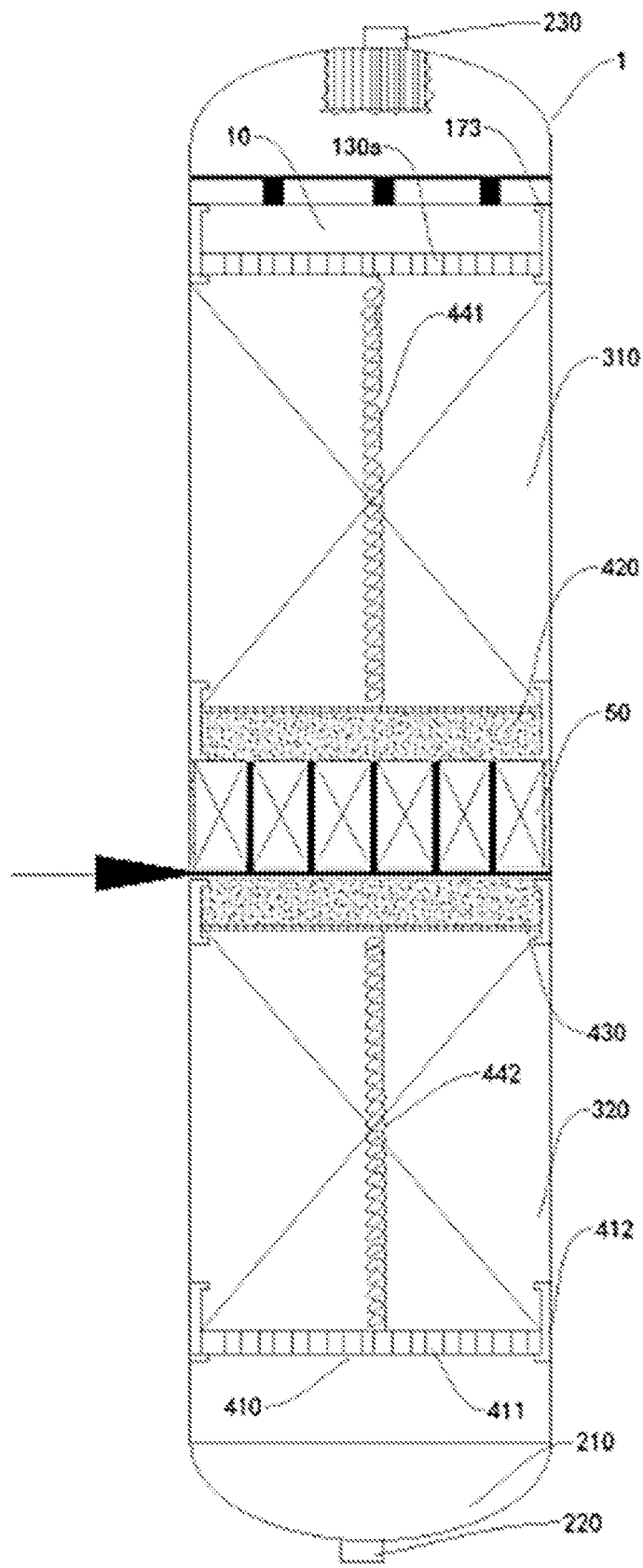
FIG. 26 is a schematic structural diagram of the upflow reactor according to a seventh embodiment of the present invention.
Figure 27:
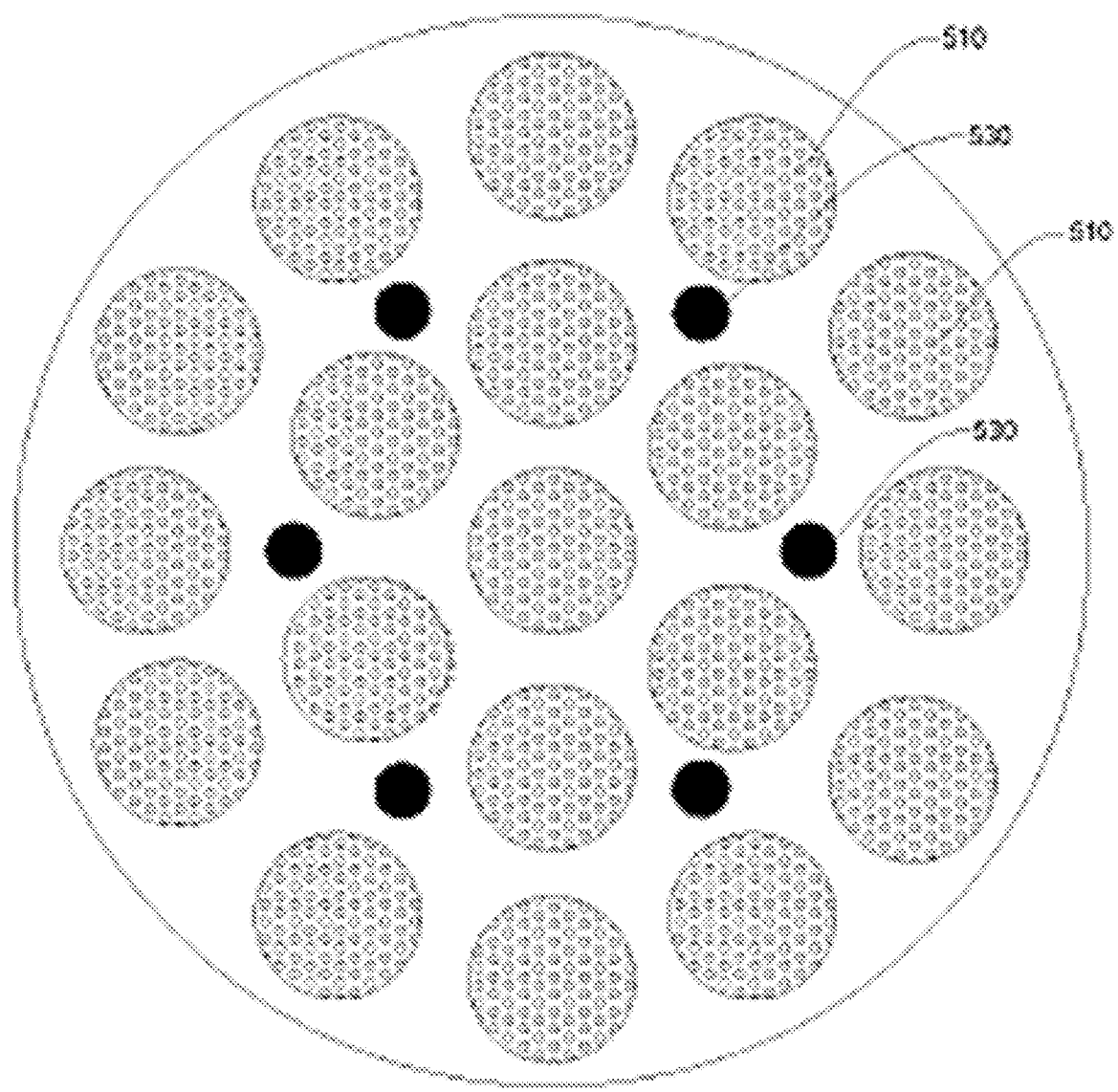
FIG. 27 is a partial schematic structural diagram of the upflow reactor according to the seventh embodiment of the present invention.
Figure 28:
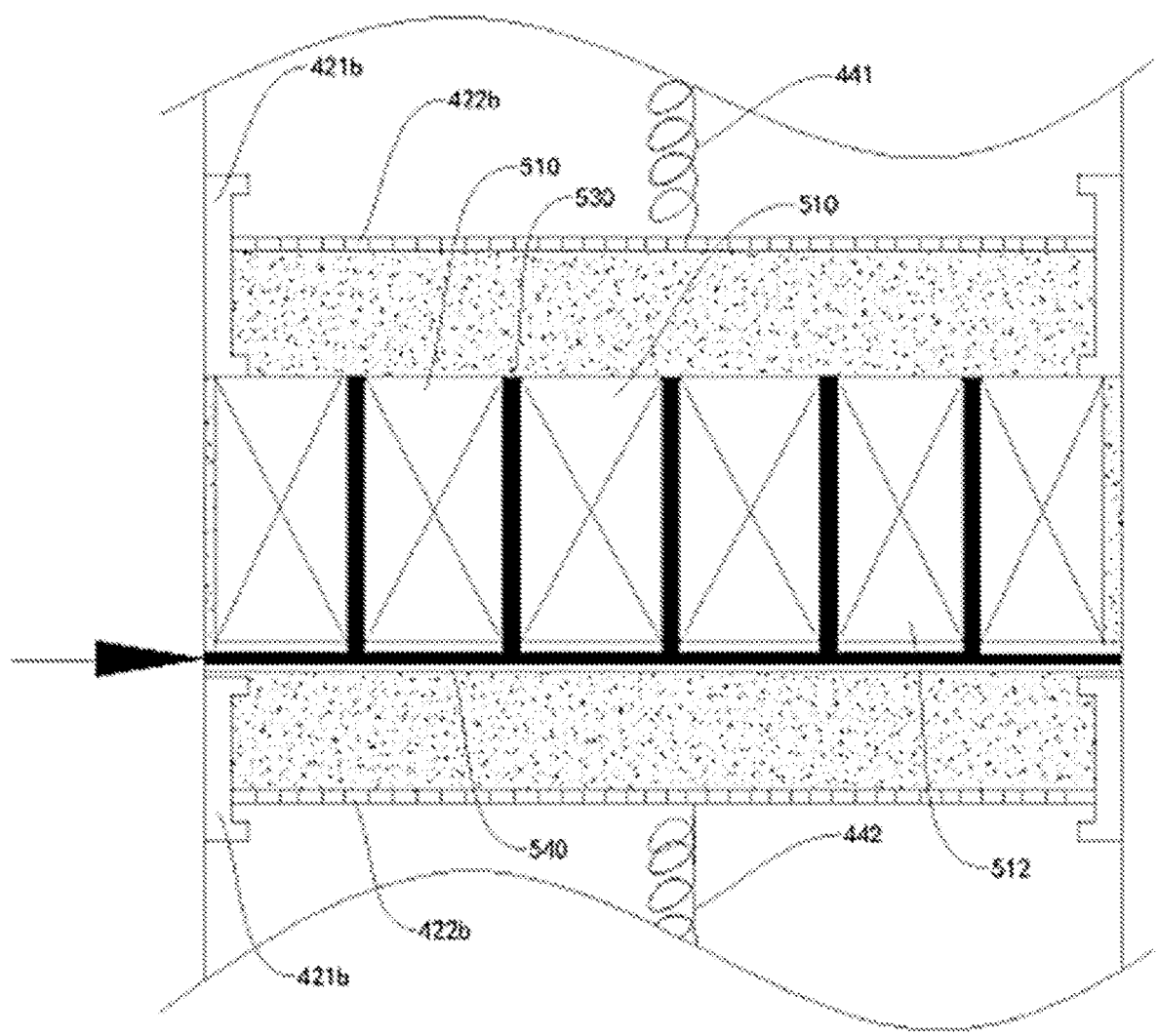
FIG. 28 is a partial schematic structural diagram of the upflow reactor according to the seventh embodiment of the present invention.
Figure 29:
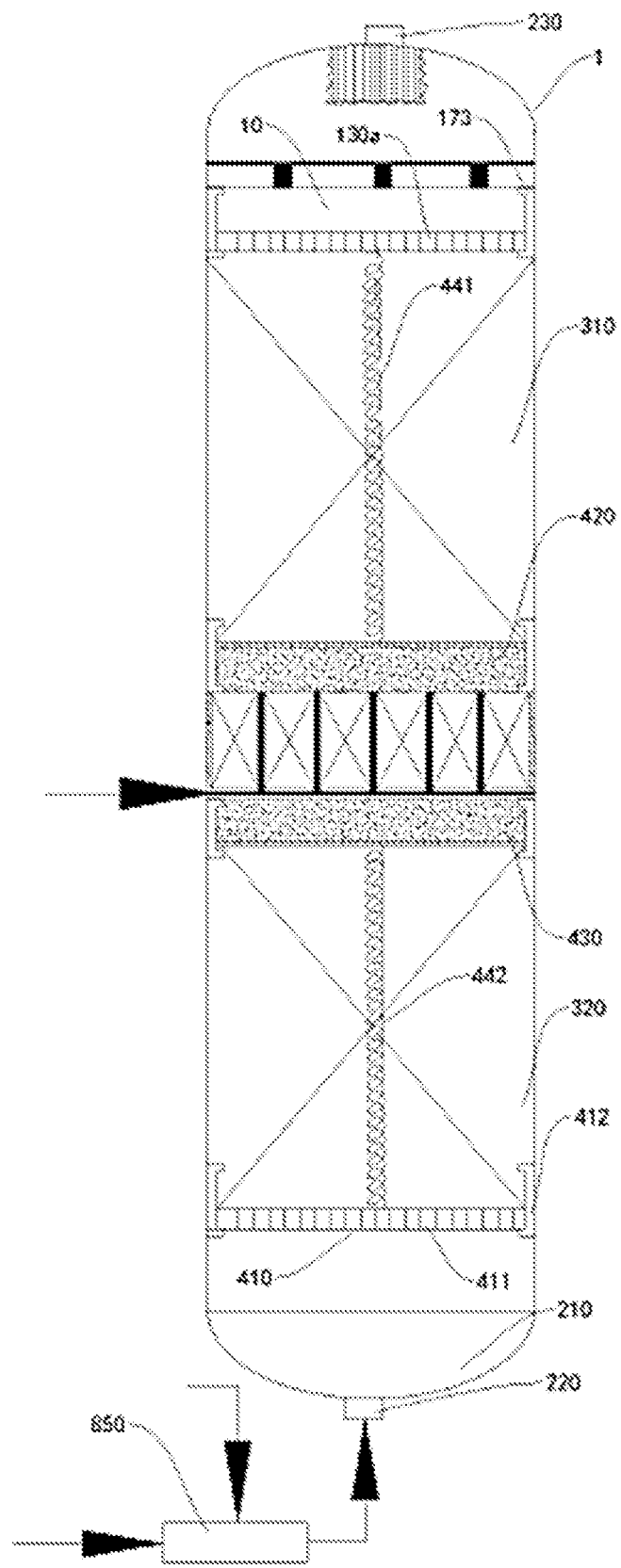
FIG. 29 is a schematic structural diagram of the upflow reactor according to the seventh embodiment of the present invention.

As shown in FIGS. 26, 27 and 29, the filtering device 50 comprises a plurality of first dust removing members 510 and a plurality of first membrane assemblies 530. Each first dust removing member 510 has a first accommodating cavity 512 filled with an inert filling material. Each first membrane assembly 530 is located between two adjacent first dust removing members 510 in the horizontal direction, and has a first gas inlet.

Gas can be supplied to the first membrane assembly 530, which is to say, the gas can enter into the first membrane assembly 530 through the first gas inlet. Driven by pressure difference, the gas in the first membrane assembly 530 can pass through the nano-pores and/or micro-pores in the tube wall of the first membrane assembly 530, so as to permeate and diffuse to form nano-bubbles and/or micro-bubbles.

The nano-bubbles and/or micro-bubbles can blow the inert filling material in the first accommodating cavity 512, so that the catalyst dust intercepted by the inert filling material can be distributed more uniformly in the entire first accommodating cavity 512. Thus, increase of local pressure drop in the filtering device 50 can be prevented, so that the increase rate of pressure drop in the filtering device 50 can be effectively controlled, thereby the pressure drop in the filtering device 50 can be maintained in a stable state for a long time.

Optionally, the first gas inlet of the first membrane assembly 530 can be in communication with a hydrogen supply pipeline. Thus, hydrogen can be supplied into the first membrane assembly 530, so that nano hydrogen bubbles and/or micro hydrogen bubbles can be obtained. Nano hydrogen bubbles and/or micron hydrogen bubbles can be mixed better with oil products by gas-liquid dissolution. Under buoyancy, oil products have certain shearing effect with nano hydrogen bubbles and/or micron hydrogen bubbles, which can greatly improve the dissolution and dispersion degree of gas phase and liquid phase materials (e.g., hydrogen and oil), thus the degree of hydrogenation reaction can be effectively controlled, the reaction efficiency and uniformity can be improved, and a better hydrogenation result can be obtained.

Optionally, each first membrane assembly 530 is disposed vertically. The bottom end of the first membrane assembly 530 is open to form the first gas inlet, and the top end of the first membrane assembly 530 is closed. As shown in FIG. 27, the filtering device 50 may further comprise a first gas intake pipe 540 having a plurality of gas outlets, and the first gas inlets of the plurality of first membrane assemblies 530 are connected with the plurality of gas outlets of the first gas intake pipe 540 in one-to-one correspondence. Thus, the gas can be supplied to the plurality of first membrane assemblies 530 at the same time.

As shown in FIGS. 26, 27 and 29, each of the upper linkage 420 and the lower linkage 430 comprises a second slideway 421b arranged on the circumferential wall face 211 of the reaction chamber 210, and a linking plate 422b that is arranged on the second slideway 421b to be movable up and down and has a material channel so that the reaction materials can pass through the linking plate 422b. An elastic material is filled between the linking plate 422b and the filtering device 50. The upper catalyst section 310 can be supported on the linking plate 422b of the upper linkage 420, and the linking plate 422b of the lower linkage 430 can be pressed against the lower catalyst section 320.

Specifically, the linking plate 422b of the upper linkage 420 is located above the filtering device 50, and the linking plate 422b of the lower linkage 430 is located below the filtering device 50. A seal ring may be provided between the linking plate 422b and the second slideway way 421b. A granular elastic material is filled between the linking plate 422b and the filtering device 50. Optionally, an elastic plastic material is filled between the linking plate 422b and the filtering device 50.

The top end of the upper elastic member 441 is connected with the pressing plate 130a, and the bottom end of the upper elastic member 441 is connected with the linking plate 422b of the upper linkage 420. The bottom end of the lower elastic member 442 is connected with the first grating plate 412, and the top end of the lower elastic member 442 is connected with the linking plate 422b of the lower linkage 430.

As shown in FIGS. 1, 2, 7, 12, 13, 15, 16-20 and 22, the pressing device 10 comprises an upper pressing plate 110a and a lower pressing plate 120a, wherein the upper pressing plate 110a is located above the lower pressing plate 120a, and an inert filling material may be arranged (filled) between the upper pressing plate 110a and the lower pressing plate 120a. Each of the upper pressing plate 110a and the lower pressing plate 120a is arranged on the circumferential wall face 211 of the reaction chamber 210 to be movable up and down, so that the lower pressing plate 120a can be pressed against the catalyst bed layer 30. The upper pressing plate 110a is provided with an upper material channel 111, and the lower pressing plate 120a is provided with a lower material channel 121, so that the reaction materials can pass through the upper pressing plate 110a and the lower pressing plate 120a.

Thus, the pressing device 10 can greatly reduce the degree of abrasion of the catalyst particles and the amount of catalyst dust, and the inert filling material of the pressing device 10 can intercept the catalyst dust, thereby further preventing the reaction material outlet 230 from being clogged and further prolonging the operation period of the upflow reactor 1.

Optionally, the upper pressing plate 110a may be a grating plate or Johnson screen, and the lower pressing plate 120a may be a grating plate or Johnson screen. The upper pressing plate 110a is disposed horizontally, and the lower pressing plate 120a is disposed horizontally. Both the size of the gaps of the upper pressing plate 110a and the size of the gaps of the lower pressing plate 120a may be smaller than the size of the catalyst particles of the catalyst bed layer 30, so as to prevent loss of the catalyst particles.

Optionally, the inert filling material may be one or more of inert alumina, porous ceramic material and porous metal material. For example, inert alumina ceramic balls and/or porous ceramic particles may be arranged (filled) between the upper pressing plate 110a and the lower pressing plate 120a.

As shown in FIGS. 1, 2, 7, 12, 13, 15, 16-20, and 22, the pressing device 10 further comprises a third slideway 173 arranged on the circumferential wall face 211 of the reaction chamber 210, and each of the upper pressing plate 110a and the lower pressing plate 120a is arranged on the third slideway 173 to be movable up and down. Thus, the upper pressing plate 110a and the lower pressing plate 120a can be installed more conveniently and easily, and the manufacturing difficulty of the upflow reactor 1 can be reduced. An upper seal ring 141 is provided between the third slideway 173 and the upper pressing plate 110a, and a lower seal ring 142 is provided between the third slideway 173 and the lower pressing plate 120a, thereby the catalyst particles and catalyst dust can be prevented from running off between the upper pressing plate 110a and the third slideway 173 and between the lower pressing plate 120a and the third slideway 173.

The pressing device 10 may further comprise a connecting member (not shown in the figures), the top end of which is connected with the upper pressing plate 110a, and the bottom end of which is connected with the lower pressing plate 120a. Thus, the upper pressing plate 110a, the lower pressing plate 120a, and the inert filling material filled between the upper pressing plate 110a and the lower pressing plate 120a can be move as a whole assembly.

As shown in FIGS. 1, 2, 7, 12, 13, 15, 19, 20 and FIG. 22, the third slideway 173 is provided with a lower limiting boss 1731 and an upper limiting boss 1732, and the upper pressing plate 110a and the lower pressing plate 120a are located between the lower limiting boss 1731 and the upper limiting boss 1732 in the vertical direction. That is to say, the upper and lower pressing plates 110a and 120a are located above the lower limiting boss 1731 and below the upper limiting boss 1732. The lower limiting boss 1731 can work with the lower pressing plate 120a to limit the downward movement distance (displacement) of the lower pressing plate 120a, and the upper limiting boss 1732 can work with the upper pressing plate 110a to limit the upward movement distance (displacement) of the upper pressing plate 110a.

The pressing device 10 may further comprise a plurality of second guiding members (not shown in the figures), each of which passes through each of the upper pressing plate 110a and the lower pressing plate 120a in the vertical direction, and each of the upper pressing plate 110a and the lower pressing plate 120a is arranged to be movable up and down with respect to each of the second guiding members. By providing a plurality of second guiding members, the impact force of the reaction materials on the upper pressing plate 110a and the lower pressing plate 120a can be more uniform, so that the upper pressing plate 110a and the lower pressing plate 120a can be maintained in a substantially horizontal state during the up-and-down movement.

Figure 12:
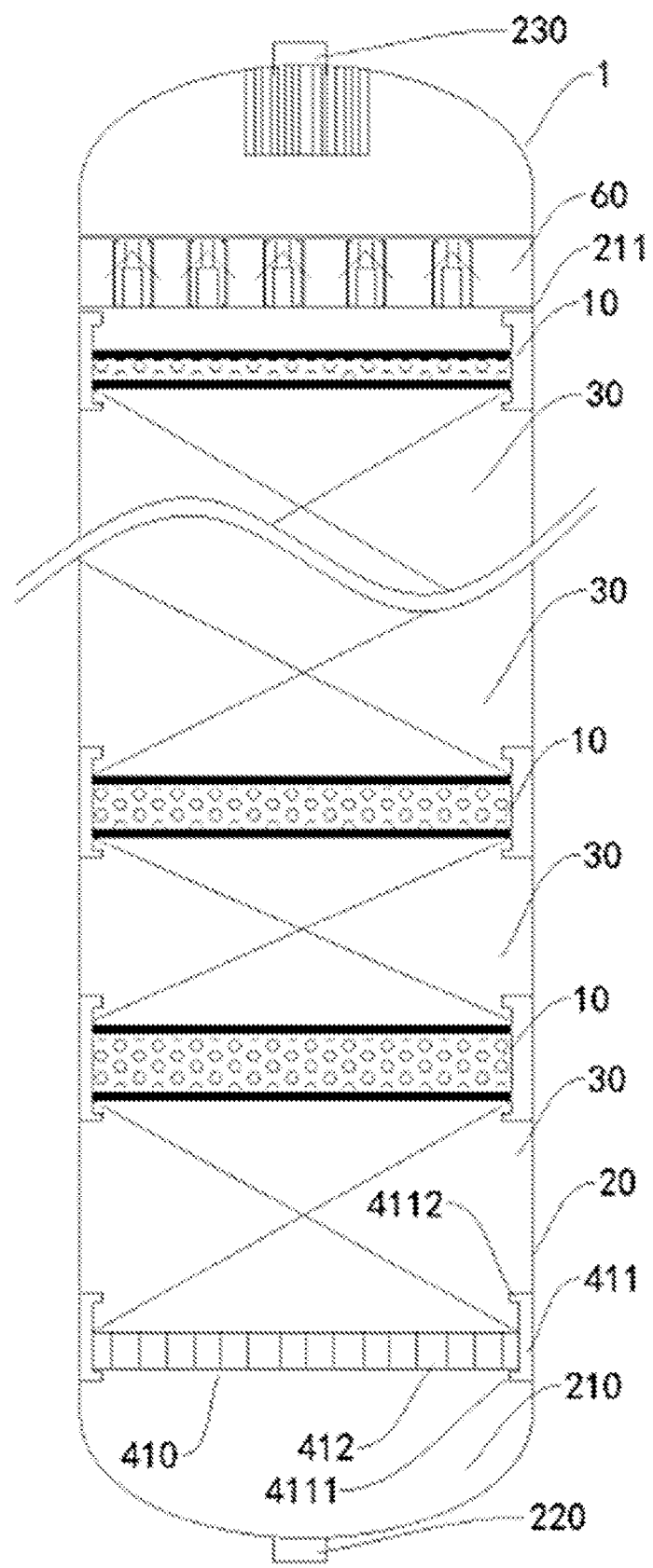
FIG. 12 is a schematic structural diagram of the upflow reactor according to a third embodiment of the present invention.
Figure 13:
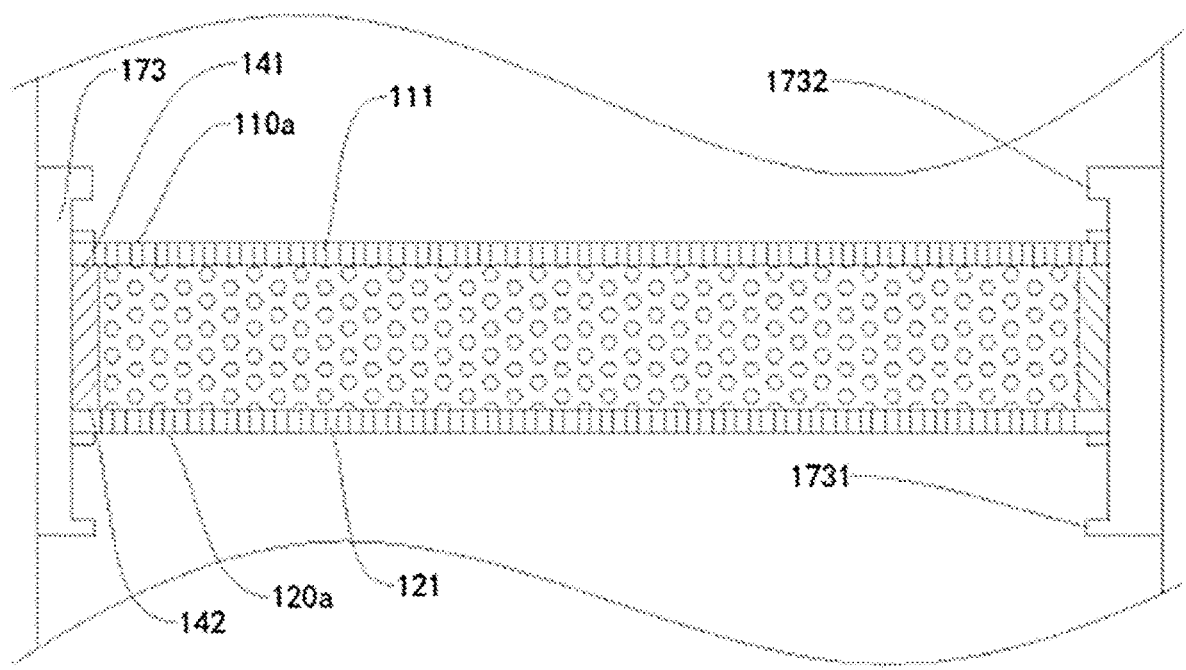
FIG. 13 is a partial schematic structural diagram of the upflow reactor according to the third embodiment of the present invention.
Figure 15:
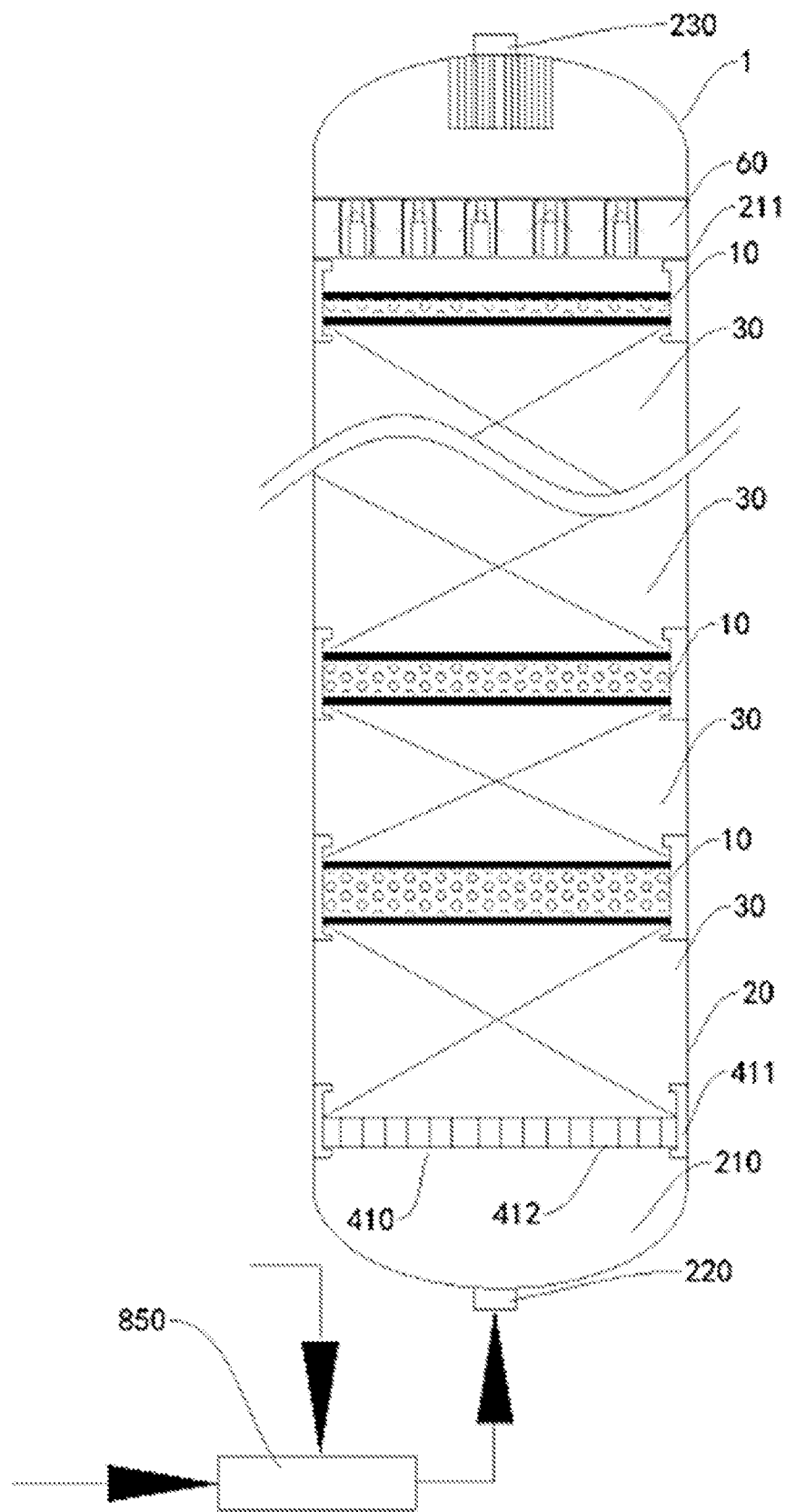
FIG. 15 is a schematic structural diagram of the upflow reactor according to the third embodiment of the present invention.

As shown in FIGS. 12 and 15, the upflow reactor 1 may comprise a plurality of catalyst bed layers 30 and a plurality of pressing devices 10. The plurality of catalyst bed layers 30 are in height incremented in the material feeding direction, and the distance between the upper pressing plate 110a and the lower pressing plate 120a in the plurality of pressing devices 10 in the vertical direction is decremented in the material feeding direction. That is to say, the plurality of catalyst bed layers 30 are in height incremented from bottom to top, and the distances between the upper pressing plates 110a and the lower pressing plates 120a in the plurality of pressing devices 10 are decremented from bottom to top in the vertical direction.

For example, for two catalyst bed layers 30 adjacent to each other in the vertical direction, the height of the upper catalyst bed layer 30 is greater than that of the lower catalyst bed layer 30. The vertical distance between the upper pressing plate 110a and the lower pressing plate 120a of the pressing device 10 may be the height of the filling space of the inert filling material. For two pressing devices 10 adjacent to each other in the vertical direction, the height of the filling space of the upper pressing device 10 is smaller than that of the lower pressing device 10.

Since the impact force of the reaction material on the catalyst bed layer 30 and the buoyance of the catalyst bed layer 30 decrease in the material feeding direction, the gouging abrasion of the catalyst particles decreases in the material feeding direction. Thus, by arranging a plurality of catalyst bed layers 30 in height incremented in the material feeding direction, the amount of catalyst dust generated by each catalyst bed layer 30 can be the same substantially, thereby the amount of catalyst dust intercepted by each pressing device 10 can be the same substantially. Thus, the catalyst dust can be distributed generally uniformly in the vertical direction (the axial direction of the upflow reactor 1), thus local clogging caused by excessive accumulation of catalyst dust at a spot can be prevented, the increase of pressure drop in the catalyst bed layer 30 can be alleviated, and the operation period of the upflow reactor 1 can be further prolonged.

Optionally, the filling ratio of the inert filling material between the upper pressing plate 110a and the lower pressing plate 120a is smaller than or equal to a first preset value. The filling ratio of the inert filling material between the upper pressing plate 110a and the lower pressing plate 120a is equal to the total volume of the inert filling material divided the volume between the upper pressing plate 110a and the lower pressing plate 120a. Thus, the inert filling material between the upper pressing plate 110a and the lower pressing plate 120a can have a proper movement space, so that the inert filling material can move relatively.

The space between the upper pressing plate 110a and the lower pressing plate 120a is a dust collection space, and the space between the upper pressing plate 110a and the lower pressing plate 120a is also a filling space of the inert filling material. The catalyst dust is intercepted in the space adjacent to the lower pressing plate 120a first. As the upflow reactor 1 operates, the catalyst dust accumulates continuously. Since the inert filling material has a proper movement space, the catalyst dust can be distributed throughout the dust collection space instead of being accumulated only in the space adjacent to the lower pressing plate 120a. Thus, adhesion and accumulation of the catalyst dust can be prevented, so as to ensure uniform and stable pressure drop in the plurality of catalyst bed layers 30 (i.e., the entire catalyst bed layer of the upflow reactor 1).

Figure 16:
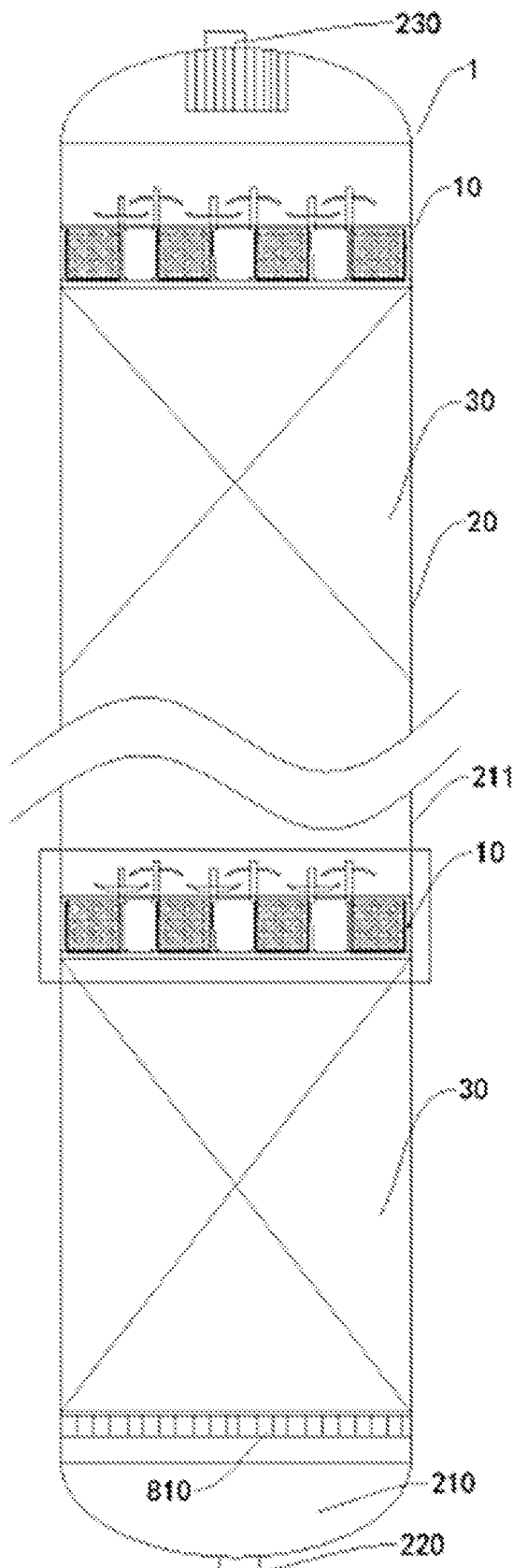
FIG. 16 is a schematic structural diagram of the upflow reactor according to a fourth embodiment of the present invention.
Figure 17:
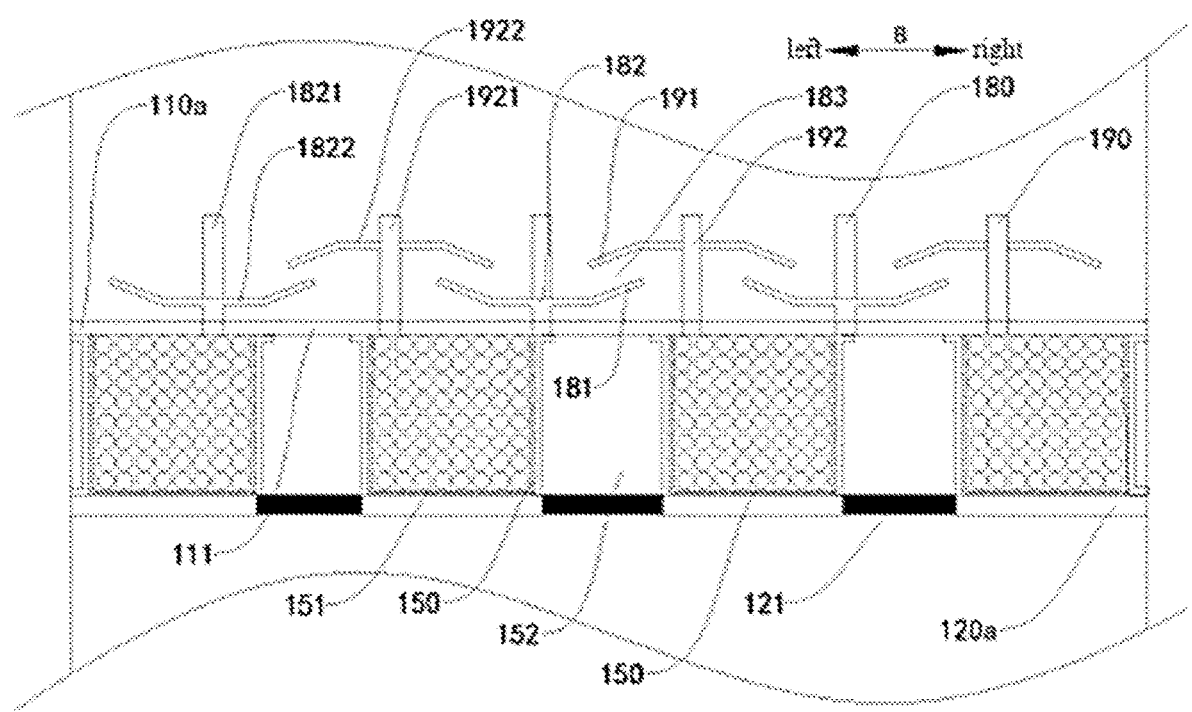
FIG. 17 is a partial schematic structural diagram of the upflow reactor according to the fourth embodiment of the present invention.
Figure 18:
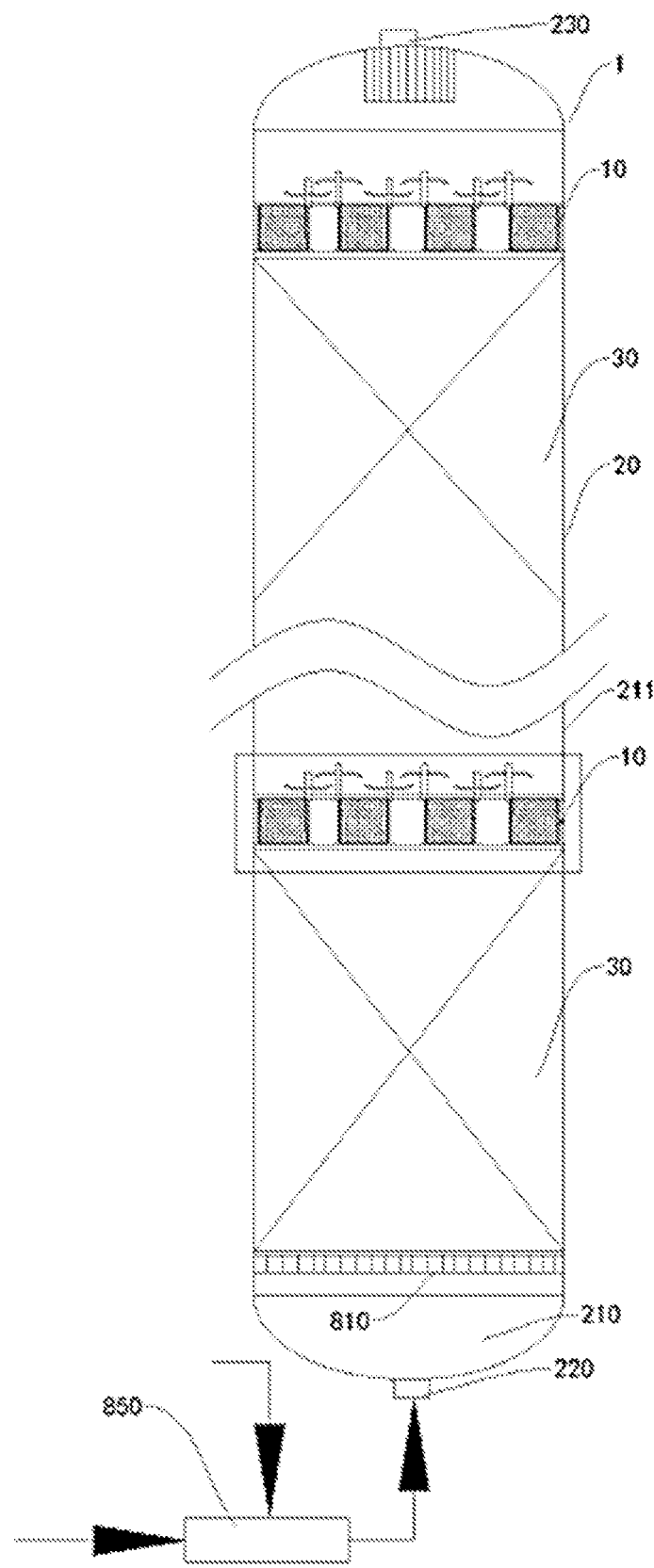
FIG. 18 is a schematic structural diagram of the upflow reactor according to the fourth embodiment of the present invention.

As shown in FIGS. 16-18, the pressing device 10 comprises a plurality of second dust removing members 150, each of which is disposed between the upper pressing plate 110a and the lower pressing plate 120a. Each second dust removing member 150 has a second accommodating cavity 151 filled with the inert filling material. The upper pressing plate 110a has a plurality of upper material channels 111, and the lower pressing plate 120a has a plurality of lower material channels 121, and the plurality of second dust removing members 150 are opposite to the plurality of lower material channels 121 in one-to-one correspondence in the vertical direction. A first material circulation cavity 152 is defined between two adjacent second dust removing members 150, and is opposite to the upper material channel 111 in the vertical direction.

That is to say, the quantity of the second dust removing members 150 may be equal to that of the lower material channels 121, each second dust removing member 150 is opposite to one lower material channel 121 in the vertical direction, and each lower material channel 121 is opposite to one second dust removing member 150 in the vertical direction. The reaction materials enter into the second accommodating cavity 151 of the second dust removing member 150 through the lower material channel 121, and the inert filling material in the second accommodating cavity 151 intercepts the catalyst dust carried by the reaction materials.

Since the upper material channel 111 is opposite to the first material circulation cavity 152 in the vertical direction, the reaction materials leaving the second accommodating cavity 151 is laterally deflected first to enter into the first material circulation cavity 152 and then flows upward to pass through the upper material channel 111.

Likewise, the filling ratio of the inert filling material in the second accommodating cavity 151 may be smaller than or equal to a preset value. The filling ratio of the inert filling material in the second accommodating cavity 151 is equal to the total volume of the inert filling materials divided by the volume of the second accommodating cavity 151. Thus, adhesion and accumulation of the catalyst dust can be prevented, so as to ensure uniform and stable pressure drop in the plurality of catalyst bed layers 30.

As shown in FIGS. 16-18, the upflow reactor 1 comprises a plurality of first material circulation cavities 152, which are opposite to the plurality of upper material channels 111 in one-to-one correspondence in the vertical direction. In other words, the quantity of the first material circulation cavities 152 may be equal to that of the upper material channels 111, each first material circulation cavity 152 is opposite to one upper material channel 111 in the vertical direction, and each upper material channel 111 is opposite to one first material circulation cavity 152 in the vertical direction.

The second dust removing member 150 may comprise a shell, which may be a Johnson screen, and the shell of the second dust removing member 150 may have a second accommodating cavity 151 therein. For example, the second dust removing member 150 may be made of the inert filling material wrapped by a Johnson screen. Optionally, the inert filling material may be one or more of inert alumina, porous ceramic material and porous metal material. For example, the second accommodating cavity 151 is filled with inert alumina ceramic balls and/or porous ceramic particles.

Optionally, the bottom end of the second dust removing member 150 is in contact with the lower pressing plate 120a, and the top end of the second dust removing member 150 is in contact with the upper pressing plate 110a. Thus, the reaction materials can almost completely enter into the second accommodating cavity 151 of the second dust removing member 150, so that more catalyst dust can be intercepted, and the operation time of the upflow reactor 1 can be further prolonged. Optionally, a plurality of second dust removing members 150 are arranged at an interval in the horizontal direction.

As shown in FIGS. 16-18, the first side of each first material circulation cavity 152 is provided with a first separating member 180, and the second side of each first material circulation cavity 152 is provided with a second separating member 190, wherein the first side and the second side are opposite to each other in the horizontal direction. In other words, the first separating member 180 and the second separating member 190 may be disposed oppositely in the horizontal direction.

The first separating member 180 comprises a first oblique plate 181 and a first supporting member 182 provided on the upper pressing plate 110a, and the second separating member 190 comprises a second oblique plate 191 and a second supporting member 192 provided on the upper pressing plate 110a. The bottom end of the first oblique plate 181 is connected with the first supporting member 182, and extends from the first supporting member 182 to the second side (e.g., the right side). The top end of the second oblique plate 191 is connected to the second supporting member 192, and extends from the second supporting member 192 to the first side (e.g., the left side). For example, the top end of the first oblique plate 181 is located at the right side of the bottom end of the first oblique plate 181, and the bottom end of the second oblique plate 191 is located at the left side of the top end of the second oblique plate 191. The left-right (horizontal) direction is indicated by the arrow B in FIG. 17.

At least a part of the first oblique plate 181 and at least a part of the second oblique plate 191 are located right above the first material circulation cavity 152, which is to say, the at least a part of the first oblique plate 181 and the at least a part of the second oblique plate 191 are opposite to the first material circulation cavity 152 in the vertical direction. The at least a part of the first oblique plate 181 is located below the at least a part of the second oblique plate 191, and a material channel 183 is defined between the at least a part of the first oblique plate 181 and the at least a part of the second oblique plate 191.

The reaction materials leaving the upper material channel 111 are stopped by at least a part of the first oblique plate 181, and flow obliquely from bottom to top in the extension direction of the first oblique plate 181. Since the first oblique plate 181 extends from the first supporting member 182 in a direction in which it get closer to the second separating member 190, the reaction materials also flow in that direction. Stopped by the second separating member 190, the reaction materials enter into the material channel and flow obliquely from top to bottom along the extension direction of the second oblique plate 191. At that point, the catalyst dust entrained in the reaction materials is separated and deposit on the top surface of the first separating member 180.

Optionally, the first oblique plate 181 and the second oblique plate 191 are arranged in parallel. Optionally, the first supporting member 182 comprises a first rod portion 1821 and a first plate portion 1822, wherein the first rod portion 1821 is arranged on the upper pressing plate 110a and the first plate portion 1822 is horizontally arranged on the first rod portion 1821, and the bottom end of the first oblique plate 181 is connected with the first plate portion 1822. The catalyst dust entrained in the reaction materials may deposit on the top surface of the first plate portion 1822. The second supporting member 192 comprises a second rod portion 1921 and a second plate portion 1922, wherein the second rod portion 1921 is arranged on the upper pressing plate 110a and the second plate portion 1922 is horizontally arranged on the second rod portion 1921, and the top end of the second oblique plate 191 is connected with the second plate portion 1922.

Figure 19:
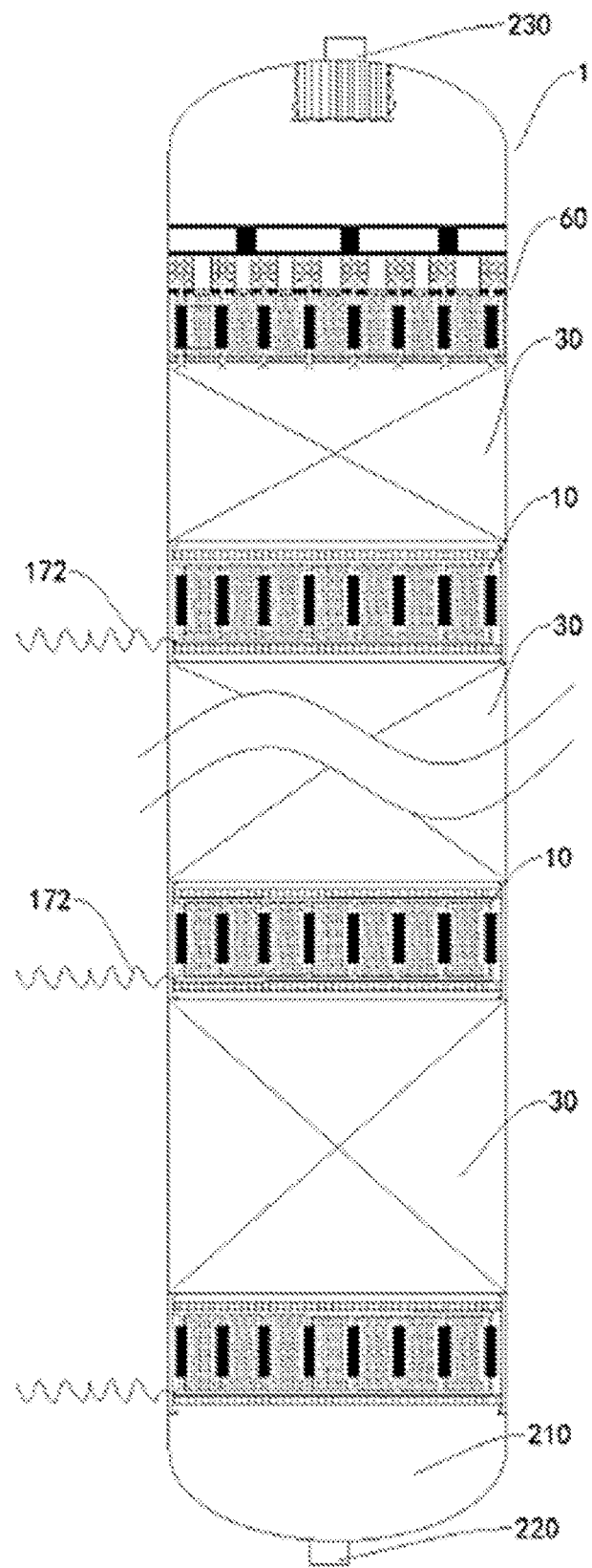
FIG. 19 is a schematic structural diagram of the upflow reactor according to a fifth embodiment of the present invention.
Figure 20:
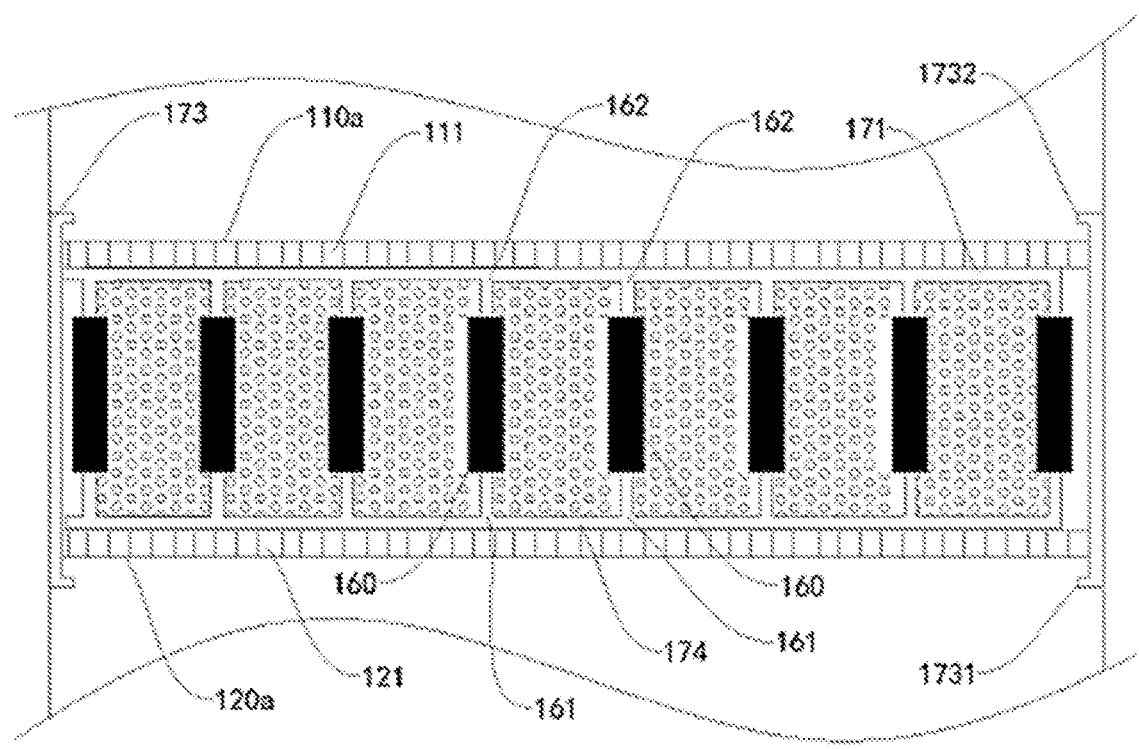
FIG. 20 is a partial schematic structural diagram of the upflow reactor according to the fifth embodiment of the present invention.
Figure 22:
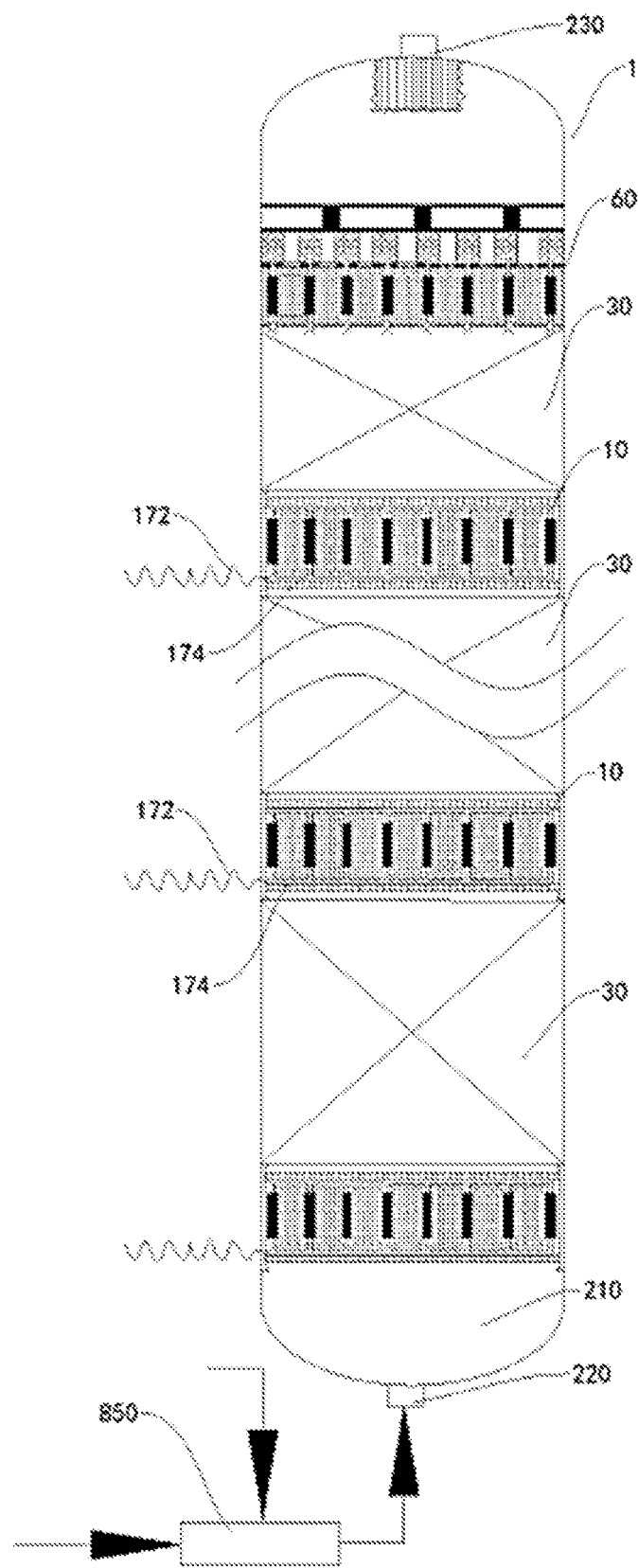
FIG. 22 is a schematic structural diagram of the upflow reactor according to the fifth embodiment of the present invention.

As shown in FIGS. 19, 20 and 22, the pressing device 10 comprises an upper pressing plate 110a, a lower pressing plate 120a and a second membrane assembly 160, wherein the upper pressing plate 110a is located above the lower pressing plate 120a, and an inert filling material may be arranged (filled) between the upper pressing plate 110a and the lower pressing plate 120a. Optionally, the inert filling material may be one or more of inert alumina, porous ceramic material and porous metal material. For example, inert alumina ceramic balls and/or porous ceramic particles may be arranged (filled) between the upper pressing plate 110a and the lower pressing plate 120a.

Each of the upper pressing plate 110a and the lower pressing plate 120a is arranged on the circumferential wall face 211 of the reaction chamber 210, so that the lower pressing plate 120a can be pressed against the catalyst bed layer 30. The upper pressing plate 110a is provided with an upper material channel 111, and the lower pressing plate 120a is provided with a lower material channel 121, so that the reaction materials can pass through the upper pressing plate 110a and the lower pressing plate 120a.

The second membrane assembly 160 is disposed between the upper pressing plate 110a and the lower pressing plate 120a, and has a second gas inlet. That is to say, the second membrane assembly 160 may be disposed in the filling space of the inert filling material. Gas can be supplied to the second membrane assembly 160, which is to say, the gas can enter into the second membrane assembly 160 through the second gas inlet. Driven by pressure difference, the gas in the second membrane assembly 160 can pass through the nano-pores and/or micro-pores in the tube wall of the second membrane assembly 160, so as to permeate and diffuse to form nano-bubbles and/or micro-bubbles.

The nano-bubbles and/or micro-bubbles can blow the inert filling material between the upper pressing plate 110a and the lower pressing plate 120a, so that the catalyst dust intercepted by the inert filling material can be distributed more uniformly in the entire dust collecting space, which is to say, the catalyst dust can be distributed more uniformly between the upper pressing plate 110a and the lower pressing plate 120a, so as to prevent the catalyst dust from accumulating and clogging. Moreover, a part of the catalyst dust intercepted by the inert filling material can flow upward along with the reaction materials, so that the catalyst dust can be distributed more uniformly in the vertical direction (the axial direction of the upflow reactor 1). Thus, local blockage caused by excessive accumulation of the catalyst dust at a spot can be prevented, the increase of pressure drop in the catalyst bed layer 30 can be alleviated, and the operation period of the upflow reactor 1 can be further prolonged. Optionally, the second gas inlet of the second membrane assembly 160 can be in communication with a hydrogen supply pipeline. Thus, hydrogen can be supplied into the second membrane assembly 160, so that nano hydrogen bubbles and/or micro hydrogen bubbles can be obtained. The nano hydrogen bubbles and/or micro hydrogen bubbles can be mixed better with the oil product by gas-liquid dissolution, and the space between the upper pressing plate 110a and the lower pressing plate 120a can be used as a place for storing the nano hydrogen bubbles and/or micro hydrogen bubbles for gas-liquid dissolution and mixing. Under buoyancy, oil products have certain shearing effect with nano hydrogen bubbles and/or micro hydrogen bubbles, so that the oil products can be uniformly dispersed and carry enough nano hydrogen bubbles and/or micro hydrogen bubbles, thereby the degree of hydrogenation reaction can be effectively controlled and ensured, the reaction efficiency and uniformity can be improved, and a better hydrogenation result can be obtained.

As shown in FIGS. 19, 20 and 22, the upflow reactor 1 may comprise a plurality of second membrane assemblies 160, which are arranged at an interval. For example, a plurality of second membrane assemblies 160 may be spaced apart in the horizontal direction. By arranging a plurality of second membrane assemblies 160, more nano bubbles and/or micro bubbles can be obtained. Thus, the catalyst dust intercepted by the inert filling material can be distributed more uniformly in the entire dust collection space and distributed more uniformly in the vertical direction, so as to further prevent the phenomenon of local clogging caused by excessive accumulation of the catalyst dust at a spot, and the operation period of the upflow reactor 1 can be further prolonged.

Optionally, each second membrane assembly 160 is disposed vertically. The bottom end 161 of each second membrane assembly 160 is open so as to form the second gas inlet. As shown in FIG. 20, the pressing device 10 may further comprise a second gas intake pipe 174 having a plurality of gas outlets, and the second gas inlets of the plurality of second membrane assemblies 160 are connected with the plurality of gas outlets of the second gas intake pipe 174 in one-to-one correspondence. Thus, the gas can be supplied to the plurality of second membrane assemblies 160 at the same time.

As shown in FIGS. 19 and 22, the pressing device 10 further comprises a connecting pipe 172, a first end of which is connected with the second gas intake pipe 174, and a second end of which can be in communication with a hydrogen supply pipeline. The connecting pipe 172 may be a hose. For example, the connecting pipe 172 may be a metal hose. Since a hose has certain stretchability (slack), the length of the hose is variable. Since the second membrane assembly 160 and the second gas intake pipe 174 can move up and down along with the upper pressing plate 110a and the lower pressing plate 120a, the length of the connecting pipe 172 can change with the up and down movement of the second gas intake pipe 174, thus avoiding leakage at the connection between the connecting pipe 172 and the second gas intake pipe 174 and the connection between the connecting pipe 172 and the hydrogen supply pipeline.

The top end 162 of each second membrane assembly 160 is closed. As shown in FIG. 20, the pressing device 10 further comprises a closing pipe 171 having a plurality of communication holes, and the top ends of the plurality of second membrane assemblies 160 are connected with the plurality of communication holes in one-to-one correspondence. By providing the closing pipe 171, the top end of each second membrane assembly 160 can be closed more easily, which is say, the top ends of the plurality of second membrane assemblies 160 can be closed by means of the closing pipe 171.

Figure 30:
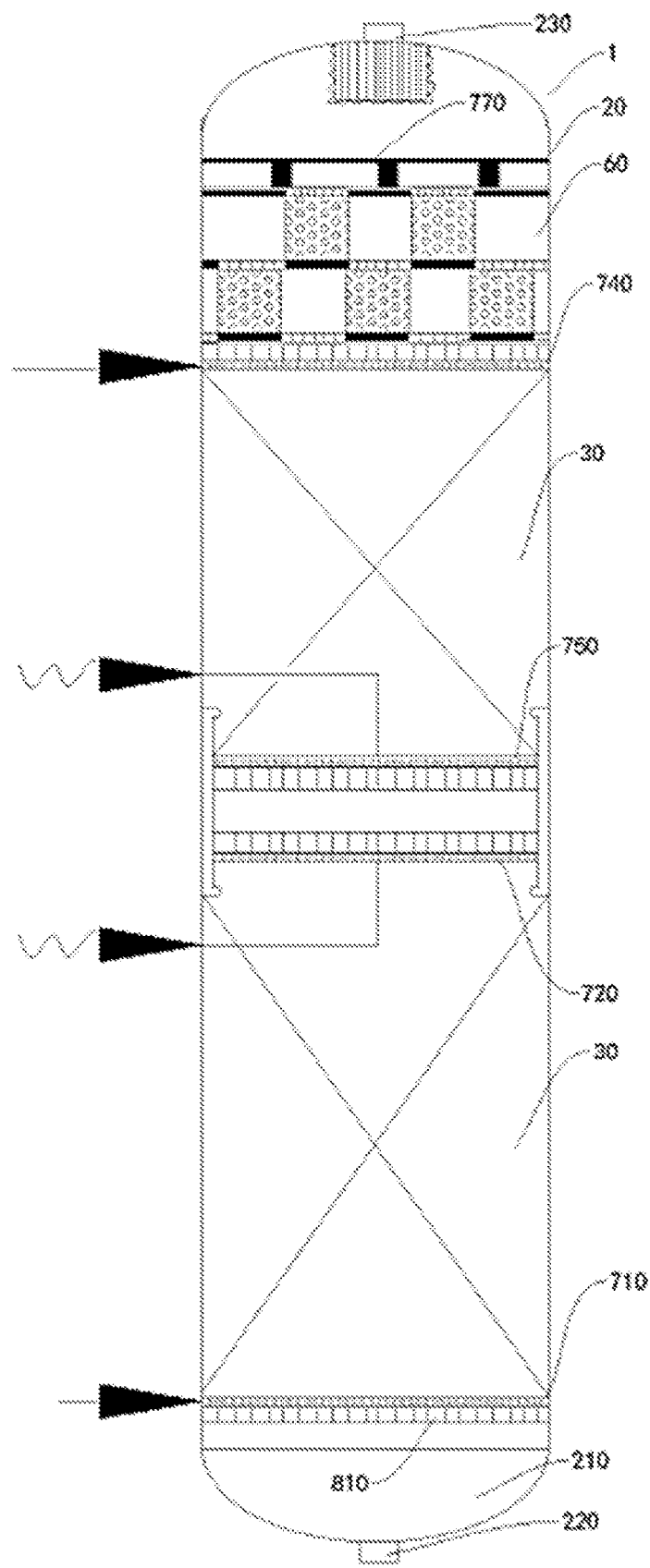
FIG. 30 is a schematic structural diagram of the upflow reactor according to an eighth embodiment of the present invention.
Figure 31:
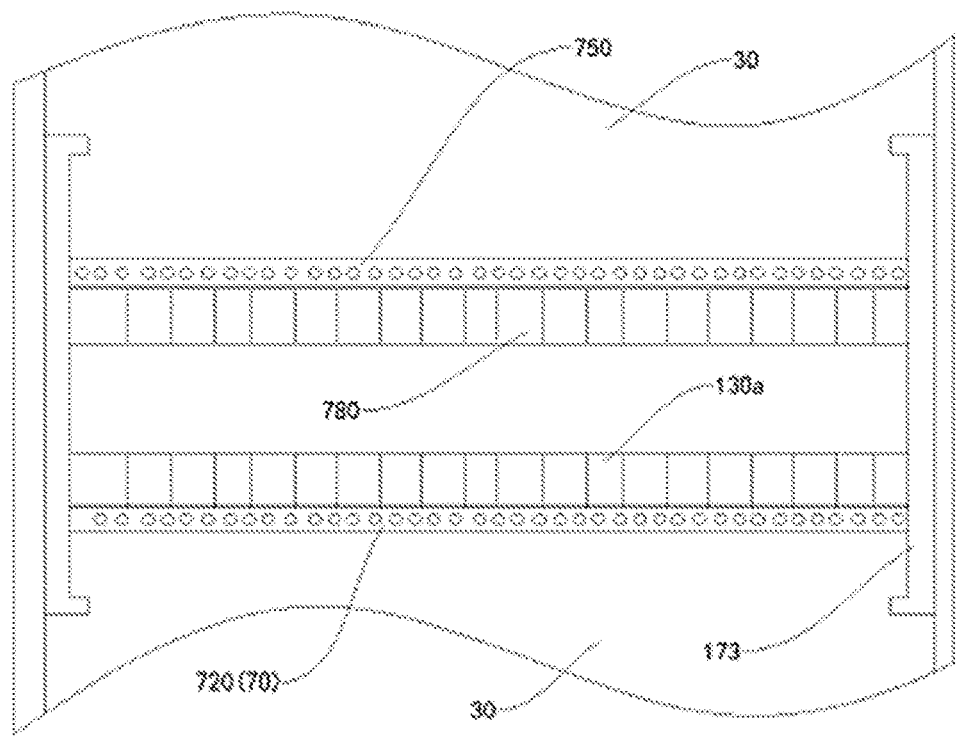
FIG. 31 is a partial schematic structural diagram of the upflow reactor according to the eighth embodiment of the present invention.
Figure 32:
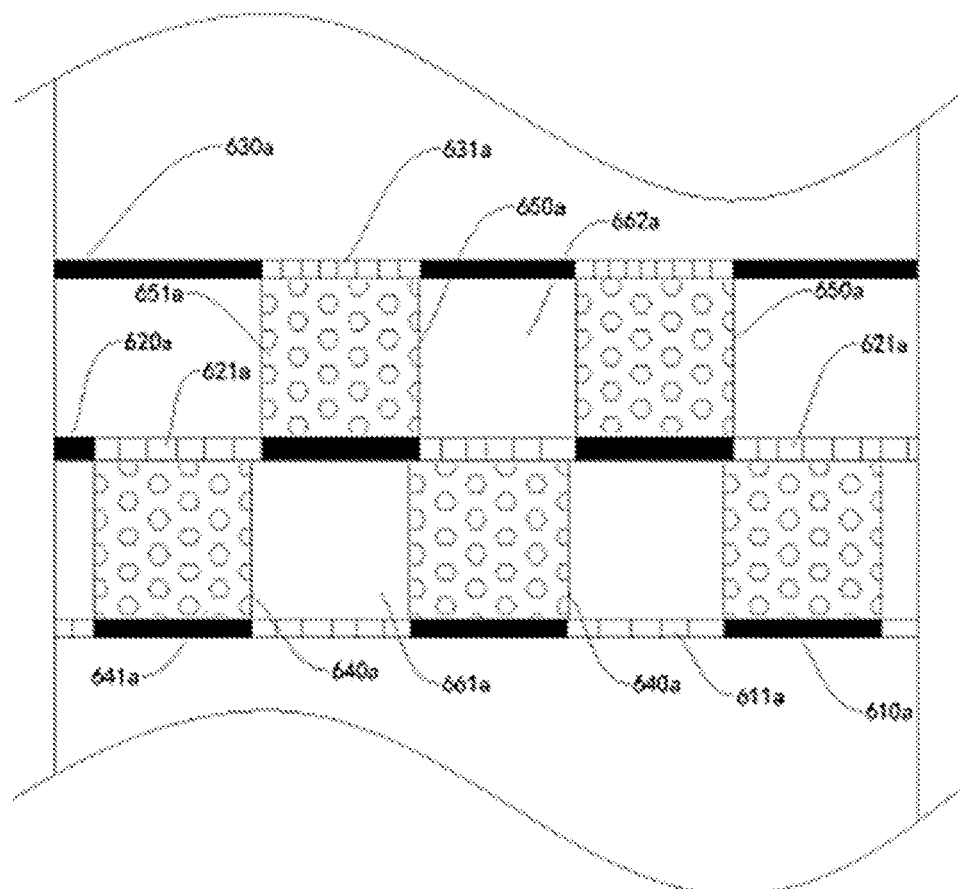
FIG. 32 is a partial schematic structural diagram of the upflow reactor according to the eighth embodiment of the present invention.
Figure 33:
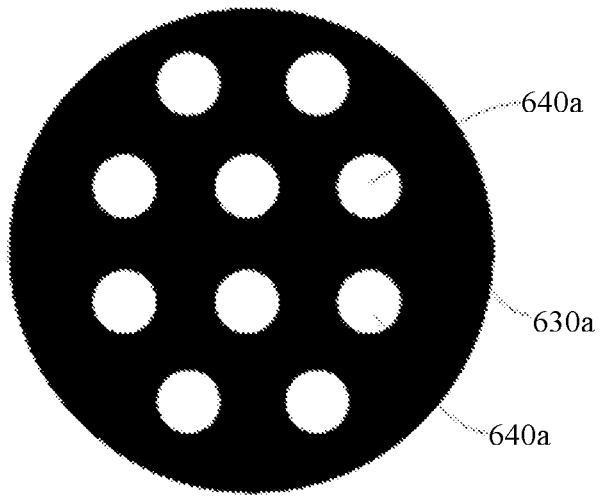
FIG. 33 is a schematic structural diagram of the upper plate of the dust removing device of the upflow reactor according to the eighth embodiment of the present invention.
Figure 34:
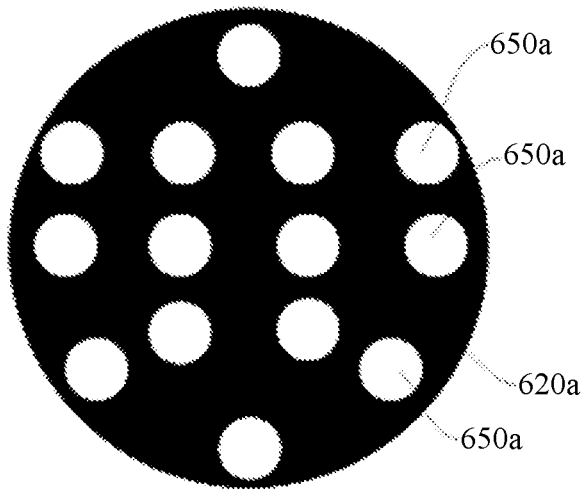
FIG. 34 is a schematic structural diagram of the middle plate of the dust removing device of the upflow reactor according to the eighth embodiment of the present invention.
Figure 35:
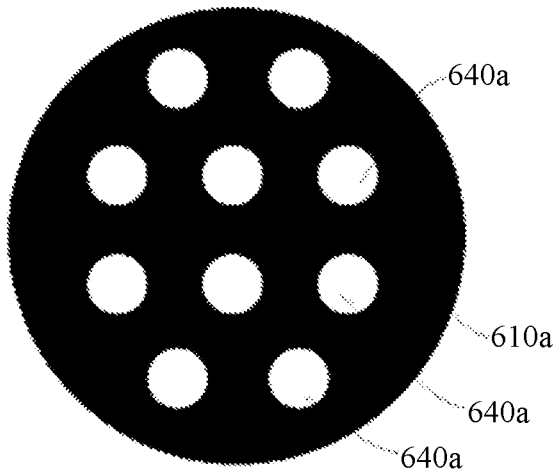
FIG. 35 is a schematic structural diagram of the lower plate of the dust removing device of the upflow reactor according to the eighth embodiment of the present invention.
Figure 36:
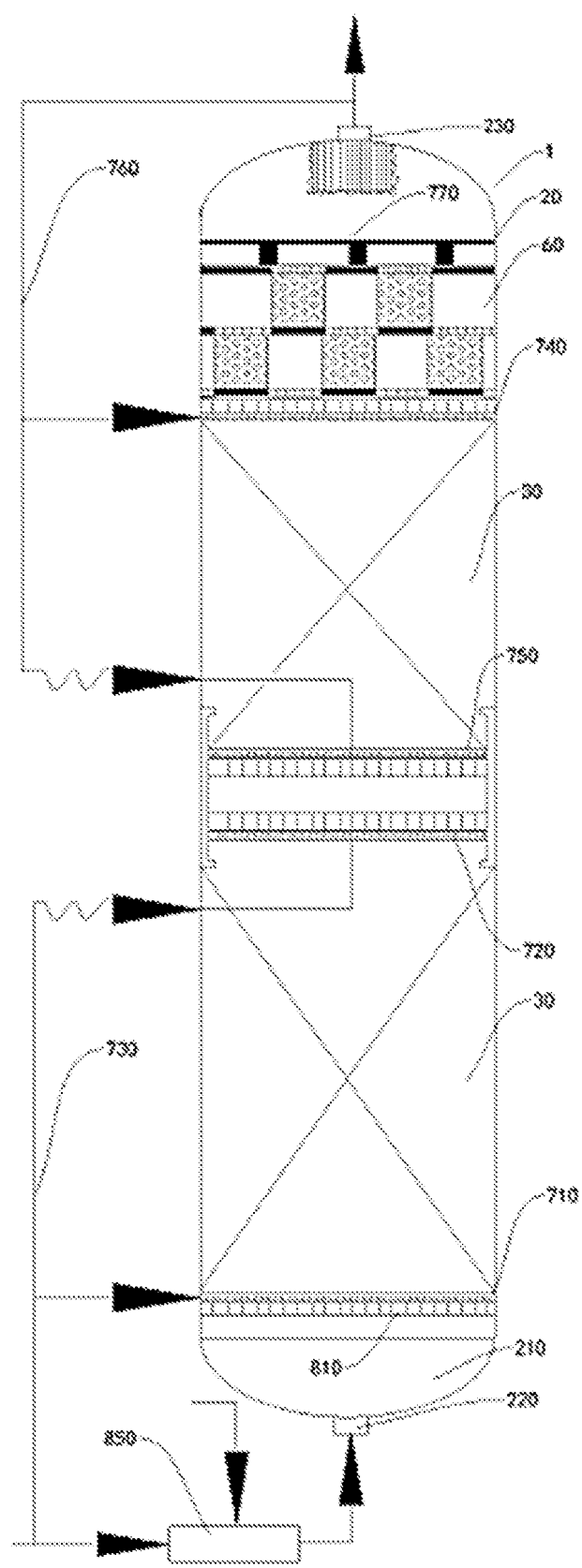
FIG. 36 is a schematic structural diagram of the upflow reactor according to the eighth embodiment of the present invention.

As shown in FIGS. 30, 31 and 36, the upflow reactor 1 further comprises a feeding distributor 70 and a feeding pipe 730. The feeding distributor 70 is arranged in the reaction chamber 210, and has a material inlet and a plurality of material outlets that are open downward, and the feeding pipe 730 is connected with the material inlet of the feeding distributor 70.

Thus, one part of the reaction materials can enter into the reaction chamber 210 from the reaction material inlet 220 and flow from bottom to top, and the other part of the reaction materials can enter into the feeding distributor 70 through the feeding pipe 730, and then leave the feeding distributor 70 from the material outlet of the feeding distributor 70 and enter into the reaction chamber 210. The other part of the reaction materials flows from top to bottom in the reaction chamber 210 to offset and relieve the impact force of that part of reaction materials, and then flows from bottom to top together with that part of reaction materials.

By providing the feeding distributor 70 with a material outlet that is open downward, one part of the reaction materials can flow from bottom to top, and the other part of the reaction materials can flow from top to bottom. Thus, the kinetic energy of the one part of the reaction materials can be reduced by means of the other part of the reaction materials, so as to offset and alleviate the impact force of the one part of the reaction materials, thereby alleviate the floating of the catalyst bed layer 30 so as to greatly reduce the gouging abrasion of the catalyst particles and thereby greatly reduce the amount of generated catalyst dust.

In addition, since the impact force of the one part of the reaction materials can be offset and relieved, the pressing device 10 can fall back more easily, which is to say, the pressing device 10 can press the catalyst bed layer 30 better and timelier, thereby the gouging abrasion of the catalyst particles can be further reduced greatly, and the amount of generated catalyst dust can be further reduced greatly.

As shown in FIGS. 30 and 36, the feeding distributor 70 comprises a lower feeding distributor 710 disposed below the catalyst bed layer 30. The lower feeding distributor 710 has a lower material inlet and a plurality of lower material outlets that are open downward, and the lower material inlet of the lower feeding distributor 710 is connected with the feeding pipe 730. Since the impact force of the reaction materials on the catalyst bed layer 30 decreases in the material feeding direction, i.e., the impact force of the reaction materials on the catalyst bed layer 30 decreases from bottom to top, the impact force of the part of the reaction materials can be offset and relieved better, by arranging a lower feeding distributor 710 below the catalyst bed layer 30. Thus, the floating of the catalyst bed layer 30 can be alleviated, and the pressing device 10 can press the catalyst bed layer 30 better and timelier, thereby the gouging abrasion of the catalyst particles can be greatly reduced, and the amount of generated catalyst dust can be greatly reduced.

As shown in FIGS. 30 and 36, the feeding distributor 70 may further comprise an upper feeding distributor 720 disposed above the catalyst bed layer 30. The upper feeding distributor 720 has an upper material inlet and a plurality of upper material outlets that are open downward, and the upper material inlet of the upper feeding distributor 720 is connected with the feeding pipe 730. Thus, more reaction materials can flow from top to bottom in the reaction chamber 210 first, so that the impact force of the reaction materials flowing from bottom to top can be further offset and relieved, and the pressing device 10 can press the catalyst bed layer 30 better and timelier, thus the floating of the catalyst bed layer 30 can be alleviated, the gouging abrasion of the catalyst particles can be greatly reduced, and the amount of generated catalyst dust can be greatly reduced.

As shown in FIGS. 30 and 36, the upflow reactor 1 comprises a plurality of feeding distributors 70 and a plurality of catalyst bed layers 30 arranged in the vertical direction. An upper feeding distributor 720 is provided above each catalyst bed layer 30 except the topmost catalyst bed layer 30, and a lower feeding distributor 710 is provided below each catalyst bed layer 30 except the topmost catalyst bed layer 30. That is to say, for a plurality of catalyst bed layers 30 except the topmost catalyst bed layer 30, an upper feeding distributor 720 is arranged above each catalyst bed layer 30 and a lower feeding distributor 710 is arranged below each catalyst bed layer 30, so that the upper feeding distributor 720 of a feeding distributor 70 and the lower feeding distributor 710 of another feeding distributor 70 are arranged between two adjacent catalyst bed layers 30.

Thus, more reaction materials can flow from top to bottom in the reaction chamber 210 first, so that the impact force of the reaction materials flowing from bottom to top can be further offset and relieved, the floating of the catalyst bed layer 30 can be alleviated and the pressing device 10 can press the catalyst bed layer 30 better and timelier, thereby the gouging abrasion of the catalyst particles can be greatly reduced, and the amount of generated catalyst dust can be greatly reduced.

The upflow reactor 1 may further comprise an upper circulated material distributor 740, a lower circulated material distributor 750 and a circulated material pipe 760. The upper circulated material distributor 740 is arranged in the reaction chamber 210 and located above the topmost catalyst bed layer 30, and has an upper circulated material inlet and a plurality of upper circulated material outlets that are open downward.

The lower circulated material distributor 750 is arranged in the reaction chamber 210 and located below the topmost catalyst bed layer 30 but above other catalyst bed layers 30 (except the topmost catalyst bed layer 30). The lower circulated material distributor 750 has a lower circulated material inlet and a plurality of lower circulated material outlets that are open downward. A first end of the circulated material pipe 760 is in communication with the reaction material outlet 230, and a second end of the circulated material pipe 760 is in communication with each of the upper circulated material inlet and the lower circulated material inlet. Thus, the impact force of the reaction materials can be further offset and alleviated, and the pressing device 10 can press the catalyst bed layer 30 better and timelier, thereby the floating of the catalyst bed layer 30 can be alleviated, the gouging abrasion of the catalyst particles can be greatly reduced, thereby the amount of generated catalyst dust can be greatly reduced.

As shown in FIGS. 30 and 36, the upflow reactor 1 comprises a press cover grating 770, a sliding support grating 780, a plurality of catalyst bed layers 30 and a plurality of pressing devices 10. The pressing device 10 comprises a third slideway 173 disposed on the circumferential wall face 211 of the reaction chamber 210 and a pressing plate 130a disposed on the third slideway 173 to be movable up and down. For a plurality of catalyst bed layers 30 except the topmost catalyst bed layer 30, the pressing plates 130a of the plurality of pressing devices 10 can be pressed against the plurality of catalyst bed layers 30 in one-to-one correspondence. For a plurality of catalyst bed layers 30 except the topmost catalyst bed layer 30, a lower feeding distributor 710 is arranged below each catalyst bed layer 30 and adjacent to the catalyst bed layer 30, and an upper feeding distributor 720 is arranged between each catalyst bed layer 30 and the pressing plate 130a capable of pressing the catalyst bed layer 30.

The press cover grating 770 is arranged above the topmost catalyst bed layer 30, and an upper circulated material distributor 740 is arranged between the press cover grating 770 and the topmost catalyst bed layer 30. The sliding support grating 780 is arranged on the circumferential wall face 211 of the reaction chamber 210 to be movable in the vertical direction. For example, the circumferential wall face 211 of the reaction chamber 210 may be provided with a slideway, on which the sliding support grating 780 is arranged to be movable in the vertical direction. The sliding support grating 780 is located below the topmost catalyst bed layer 30, so that the topmost catalyst bed layer 30 can be supported on the sliding support grating 780, and a lower circulated material distributor 750 is arranged between the sliding support grating 780 and the topmost catalyst bed layer 30.

As shown in FIGS. 1 and 3-7, the upflow reactor 1 further comprises a dust removing device 60 arranged in the reaction chamber 210 and located above the pressing device 10. The dust removing device 60 comprises a lower plate 610a, a middle plate 620a, an upper plate 630a, a plurality of third dust removing members 640a and a plurality of fourth dust removing members 650a. The middle plate 620a is located between the lower plate 610a and the upper plate 630a in the vertical direction. The lower plate 610a is provided with a plurality of first material channels 611a, the middle plate 620a is provided with a plurality of second material channels 621a, and the upper plate 630a is provided with a plurality of third material channels 631a.

The plurality of third dust removing members 640a are arranged between the lower plate 610a and the middle plate 620a in the vertical direction, and each third dust removing member 640a is opposite to the portion of the lower plate 610a without the first material channels 611a in the vertical direction, which is to say, each third dust removing member 640a is not opposite to the first material channels 611a in the vertical direction. The plurality of third dust removing members 640a are opposite to the plurality of second material channels 621a in one-to-one correspondence in the vertical direction. That is to say, the quantity of the third dust removing members 640a is equal to that of the second material channels 621a, each third dust removing member 640a is opposite to one second material channel 621a in the vertical direction, and each second material channel 621a is opposite to one third dust removing member 640a in the vertical direction.

The plurality of fourth dust removing members 650a are arranged between the middle plate 620a and the upper plate 630a in the vertical direction, and each fourth dust removing member 650a is opposite to the portion of the middle plate 620a without the second material channel 621a in the vertical direction, which is to say, each fourth dust removing member 650a is not opposite to the second material channels 621a in the vertical direction. The plurality of fourth dust removing members 650a are opposite to the plurality of third material channels 631a in one-to-one correspondence in the vertical direction. That is to say, the quantity of the fourth dust removing members 650a is equal to that of the third material channels 631a, each fourth dust removing member 650a is opposite to one third material channel 631a in the vertical direction, and each third material channel 631a is opposite to one fourth dust removing member 650a in the vertical direction.

Owing to the buoyancy of the reaction materials and the fluctuation of the flow rate and/or pressure of the reaction materials, gouging abrasion of the catalyst particles is inevitably, consequently some catalyst dust may be produced. By arranging a dust removing device 60 above the pressing device 10, the catalyst dust carried by the reaction materials can be intercepted by the dust removing device 60, so as to prevent the catalyst dust from clogging the reaction material outlet 230, and further prolong the operation time of the upflow reactor 1.

The reaction materials passing through the pressing device 10 enter into the space between the lower plate 610a and the middle plate 620a through the first material channel 611a first. Since the third dust removing members 640a are not opposite to the first material channels 611a but opposite to the second material channels 621a in the vertical direction, the reaction materials entering into the space between the lower plate 610a and the middle plate 620a are laterally deflected to enter into the third dust removing members 640a, and then pass through the third dust removing members 640a and the second material channels 621a sequentially and enter into the space between the middle plate 620a and the upper plate 630a.

Since the fourth dust removing members 650a are not opposite to the second material channels 621a but opposite to the third material channels 631a in the vertical direction, the reaction materials entering into the space between the middle plate 620a and the upper plate 630a are laterally deflected to enter into the fourth dust removing members 650a, and then leave the dust removing device 60 through the fourth dust removing members 650a and the third material channels 631a sequentially. By deflecting the reaction materials, the dust removing efficiency (interception efficiency) of the dust removing device 60 can be improved.

Figure 3:
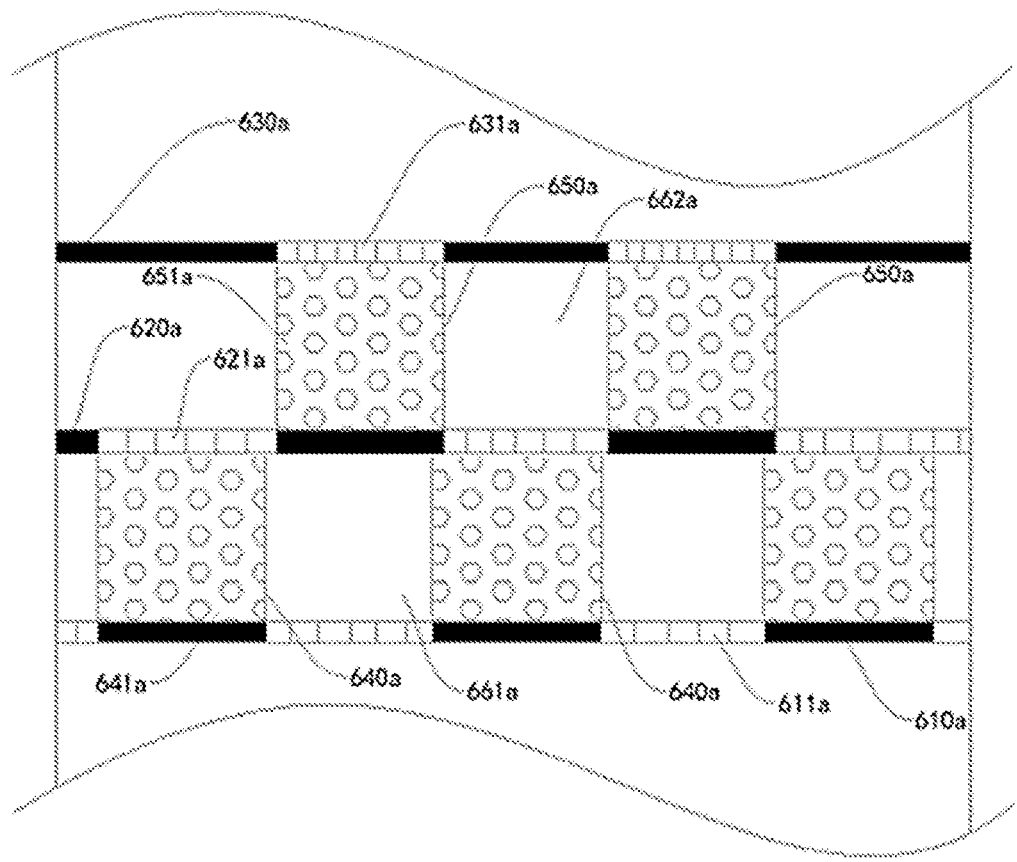
FIG. 3 is a partial schematic structural diagram of the upflow reactor according to the first embodiment of the present invention.
Figure 4:
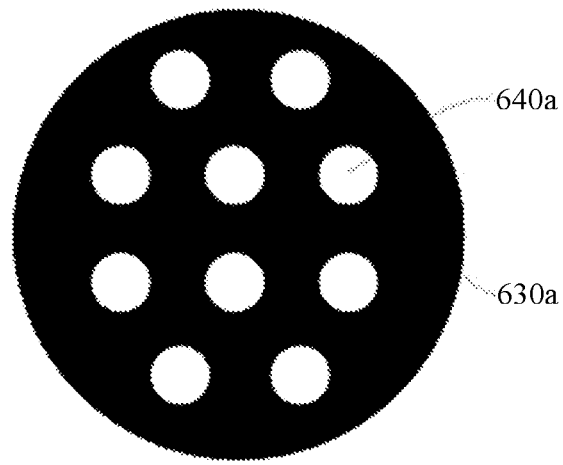
FIG. 4 is a schematic structural diagram of the upper plate of the dust removing device of the upflow reactor according to the first embodiment of the present invention.
Figure 5:
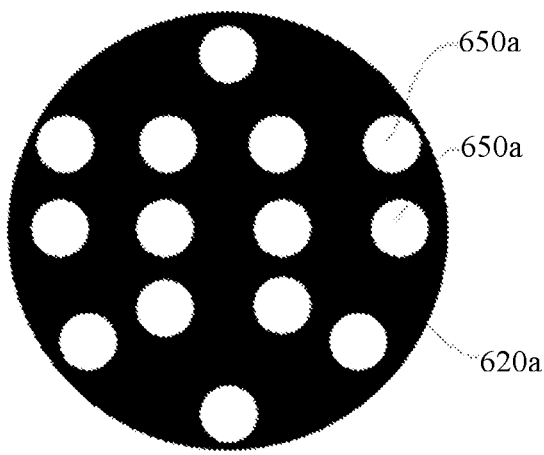
FIG. 5 is a schematic structural diagram of the middle plate of the dust removing device of the upflow reactor according to the first embodiment of the present invention.
Figure 6:
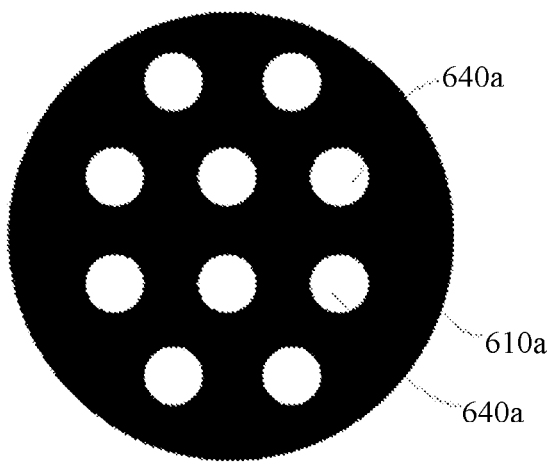
FIG. 6 is a schematic structural diagram of the lower plate of the dust removing device of the upflow reactor according to the first embodiment of the present invention.
Figure 7:
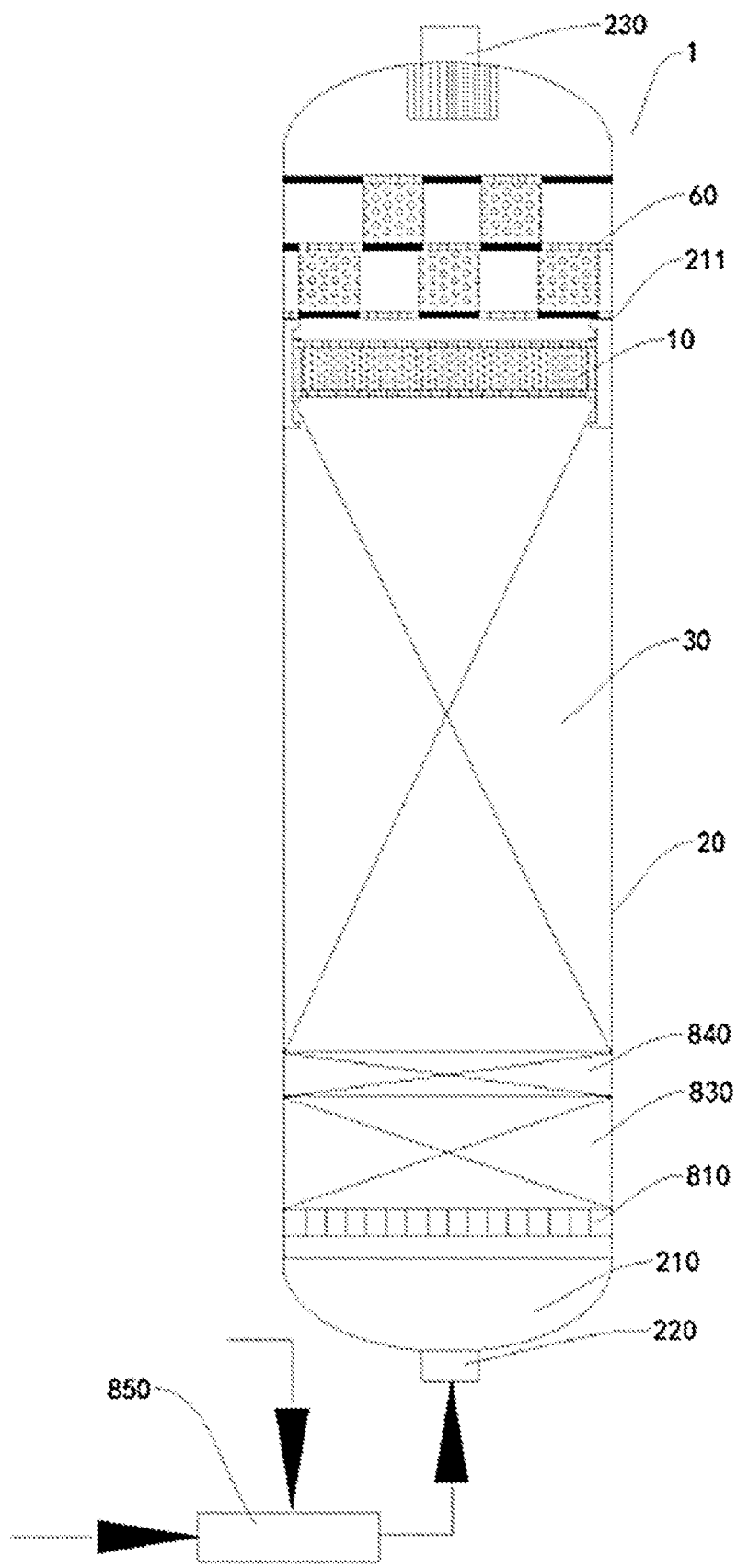
FIG. 7 is a schematic structural diagram of the upflow reactor according to the first embodiment of the present invention.

As shown in FIG. 3, the third dust removing members 640a are not opposite to the first material channels 611a in the vertical direction, the first material channels 611a are not opposite to the second material channels 621a in the vertical direction, the second material channels 621a are not opposite to the third material channels 631a in the vertical direction, and the fourth dust removing members 650a are not opposite to the second material channels 621a in the vertical direction. The third dust removing members 640a are not opposite to the fourth dust removing members 650a in the vertical direction, which is to say, the third dust removing members 640a and the fourth dust removing members 650a are staggered from each other in the horizontal direction. The fourth dust removing members 650a may be opposite to the first material channels 611a in the vertical direction. As shown in FIGS. 1 and 7, all of the lower plate 610a, the middle plate 620a and the upper plate 630a may be arranged horizontally, and may be fixedly arranged on the circumferential wall face 211 of the reaction chamber 210.

Optionally, the bottom end of the third dust removing member 640a is in contact with the lower plate 610a, and the top end of the third dust removing member 640a is in contact with the middle plate 620a. Thus, the reaction materials can almost completely pass through the third dust removing members 640a, so that more catalyst dust can be intercepted, and the operation time of the upflow reactor 1 can be further prolonged.

Optionally, the bottom end of the fourth dust removing member 650a is in contact with the middle plate 620a, and the top end of the fourth dust removing member 650a is in contact with the upper plate 630a. Thus, the reaction materials can almost completely pass through the fourth dust removing members 650a, so that more catalyst dust can be intercepted, and the operation time of the upflow reactor 1 can be further prolonged.

As shown in FIGS. 1 and 7, a second material circulation cavity 661a is defined between two adjacent third dust removing members 640a, and the second material circulation cavity 661a is opposite to the first material channel 611a in the vertical direction. A third material circulation cavity 662a is defined between two adjacent fourth dust removing members 650a, and the third material circulation cavity 662a is opposite to the second material channel 621a in the vertical direction. Thus, the structure of the dust removing device 60 is more reasonable.

As shown in FIGS. 1 and 7, each third dust removing member 640a has a third accommodating cavity 641a, which is filled with an inert filling material. Each fourth dust removing member 650a has a fourth accommodating cavity 651a, which is filled with an inert filling material.

Optionally, the inert filling material may be one or more of inert alumina, porous ceramic material and porous metal material. For example, the third accommodating cavity 641a is filled with inert alumina ceramic balls and/or porous ceramic particles, and the fourth accommodating cavity 651a is filled with inert alumina ceramic balls and/or porous ceramic particles.

For example, the diameter of the inert alumina ceramic balls in the third accommodating cavity 641a may be greater than that of the inert alumina ceramic balls in the fourth accommodating cavity 651a. Thus, catalyst dust in larger size (larger particles) can be intercepted by the third dust removing member 640a, while catalyst dust in smaller size (smaller particles) can be intercepted by the fourth dust removing member 650a, so that hierarchical interception can be realized.

Figure 14:
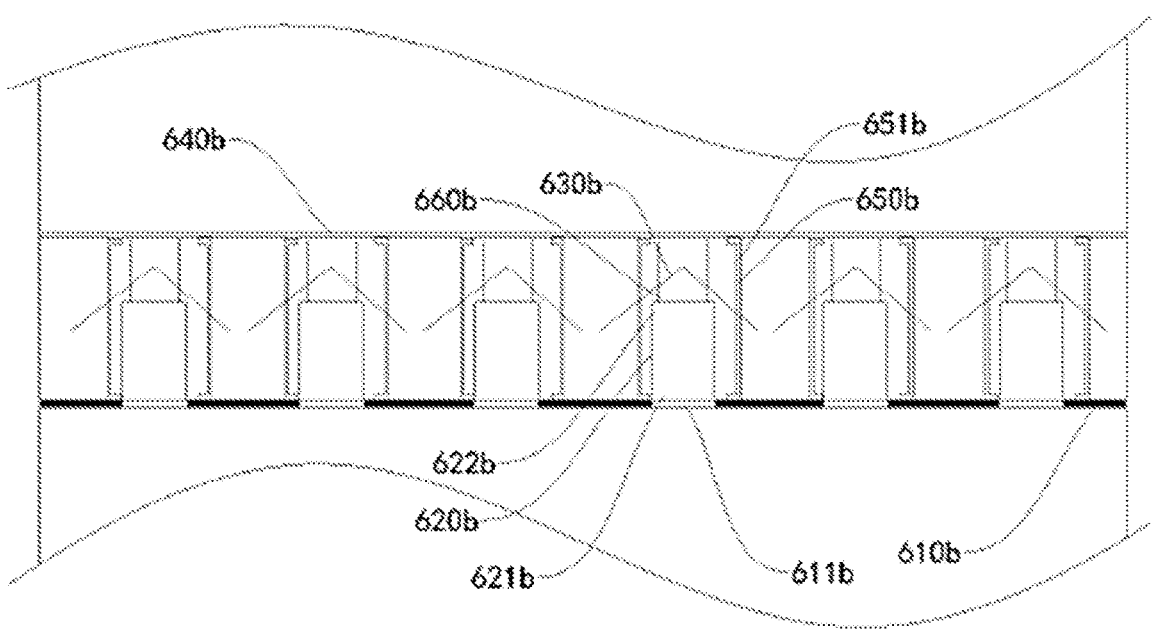
FIG. 14 is a partial schematic structural diagram of the upflow reactor according to the third embodiment of the present invention.

As shown in FIGS. 12, 14 and 15, the upflow reactor 1 further comprises a dust removing device 60, which is arranged in the reaction chamber 210 and located above the pressing device 10. The dust removing device 60 comprises a dust deposition plate 610b, a plurality of separating cylinders 620b and a plurality of separating caps 630b. The dust deposition plate 610b is provided with a plurality of fourth material channels 611b.

The plurality of separating cylinders 620b are arranged on the dust deposition plate 610b, the bottom end of each separating cylinder 620b is opened to form a material inlet 621b, and the top end of each separating cylinder 620b is opened to form a material outlet 622b. The material inlets 621b of the plurality of separating cylinders 620b are connected with the plurality of fourth material channels 611b in one-to-one correspondence. In other words, the quantity of the material inlets 621b of the separating cylinders 620b may be equal to the quantity of the fourth material channels 611b, the material inlet 621b of each separating cylinder 620b is connected with a fourth material channel 611b, and each fourth material channel 611b is connected with the material inlet 621b of one separating cylinder 620b.

The plurality of separating caps 630b are located above the plurality of separating cylinders 620b in one-to-one correspondence. In other words, the quantity of the separating cylinders 620b may be equal to the quantity of the separating caps 630b, each separating cap 630b is located above one separating cylinder 620b, and one separating cap 630b is provided above each separating cylinder 620b. The separating caps 630b are spaced apart from the corresponding separating cylinders 620b, which is to say, the separating caps 630b are spaced apart from the separating cylinders 620b located below them.

The reaction materials passing through the pressing device 10 enter into the separating cylinders 620b through the fourth material channels 611b and the material inlets 621b sequentially, flow from bottom to top, and are deflected under the action of the separating caps 630b, so that the catalyst dust entrained in the reaction materials deposit on the dust deposition plate 610b under the action of gravity, thus deposition of the catalyst dust is realized. By deflecting the reaction materials, i.e., altering the flow direction of the reaction materials, the catalyst dust in the reaction materials can be effectively prevented from carried away by the reaction materials owing to excessively high flow speed of the reaction materials.

By arranging a dust removing device 60 above the pressing device 10, the catalyst dust carried by the reaction materials can be intercepted by the dust removing device 60, so as to prevent the catalyst dust from clogging the reaction material outlet 230, and further prolong the operation time of the upflow reactor 1.

Optionally, each separating cap 630b may be arranged to be movable up and down. Thus, as the amount of catalyst dust depositing on the dust deposition plate 610b gradually increases, the separating cap 630b can move upward, so that a circulation space of the reaction materials can be maintained and the deposition effect of the catalyst dust can be ensured, so as to effectively intercept the catalyst dust and keep stable pressure drop in the deposited catalyst dust layer.

Optionally, the rim of the projection of the separating cap 630b on a horizontal plane is located at the outer side of the rim of the projection of the corresponding separating cylinder 620b on the horizontal plane. Thus, more reaction materials can be deflected, thereby the catalyst dust can be intercepted better. As shown in FIG. 14, the separating cap 630b is in a horn shape.

As shown in FIGS. 12, 14 and 15, the dust removing device 60 further comprises a top plate 640b and a plurality of outer cylinders 650b. The bottom end of each outer cylinder 650b is connected with the dust deposition plate 610b, and the top end of each outer cylinder 650b is connected with the top plate 640b. The plurality of separating cylinders 620b are arranged in the plurality of outer cylinders 650b in one-to-one correspondence, and the plurality of separating caps 630b are arranged in the plurality of outer cylinders 650b in one-to-one correspondence. That is to say, each outer cylinder 650b is provided with one separating cylinder 620b and one separating cap 630b therein. The inner circumferential face 651b of the outer cylinder 650b forms a slideway face, and the separating cap 630b is overlapped on the inner circumferential face 651b of the corresponding outer cylinder 650b to be movable up and down. Thus, the structure of the dust removing device 60 is more reasonable.

As shown in FIGS. 12, 14 and 15, the separating cylinders 620b are arranged on the circumferential wall face 211 of the reaction chamber 210, and the top plates 640b are arranged on the circumferential wall face 211 of the reaction chamber 210. Optionally, each separating cylinder 620b is provided with a connecting plate 660b that can move up and down, and the separating cap 630b is connected with the corresponding connecting plate 660b (the connecting plate 660b arranged on the corresponding separating cylinder 620b). Thus, the structure of the dust removing device 60 is more reasonable.

Figure 8:
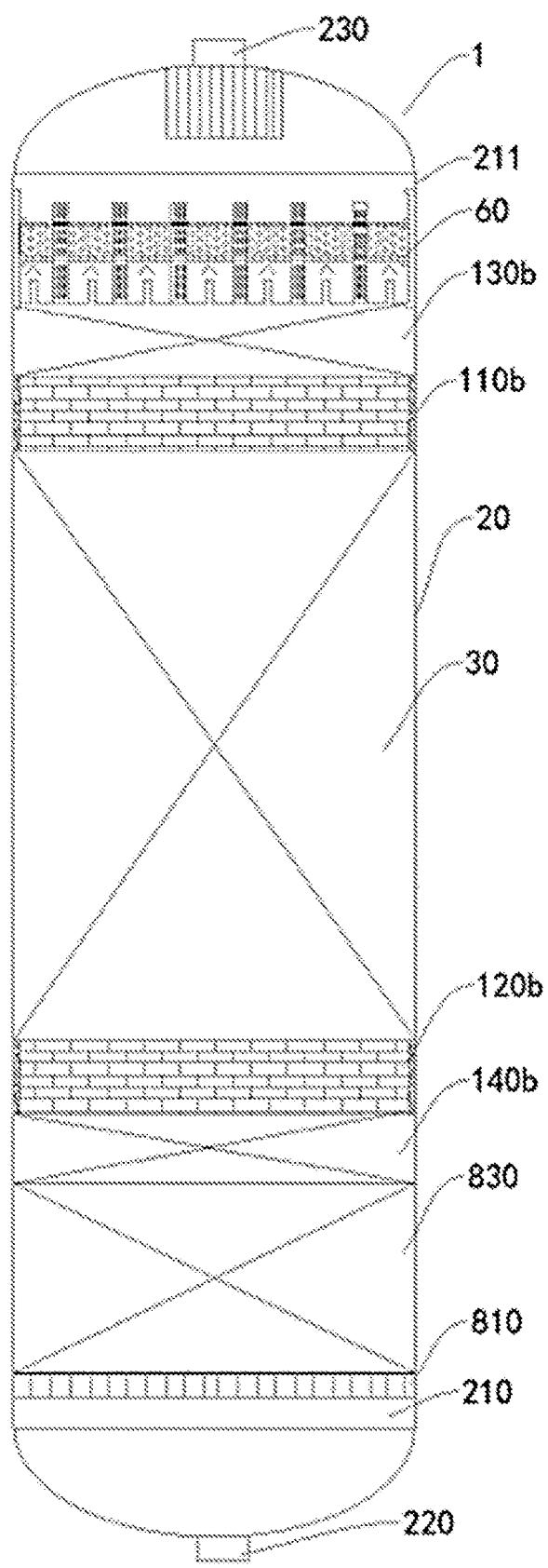
FIG. 8 is a schematic structural diagram of the upflow reactor according to a second embodiment of the present invention.
Figure 9:
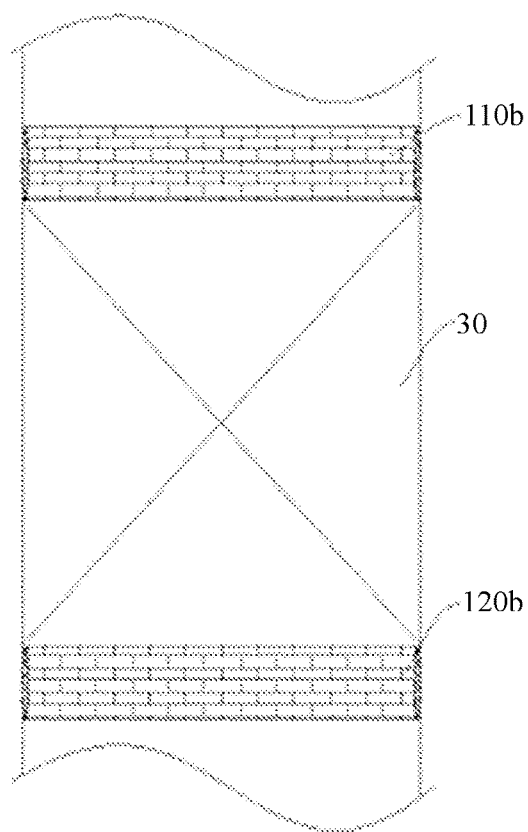
FIG. 9 is a partial schematic structural diagram of the upflow reactor according to the second embodiment of the present invention.
Figure 10:
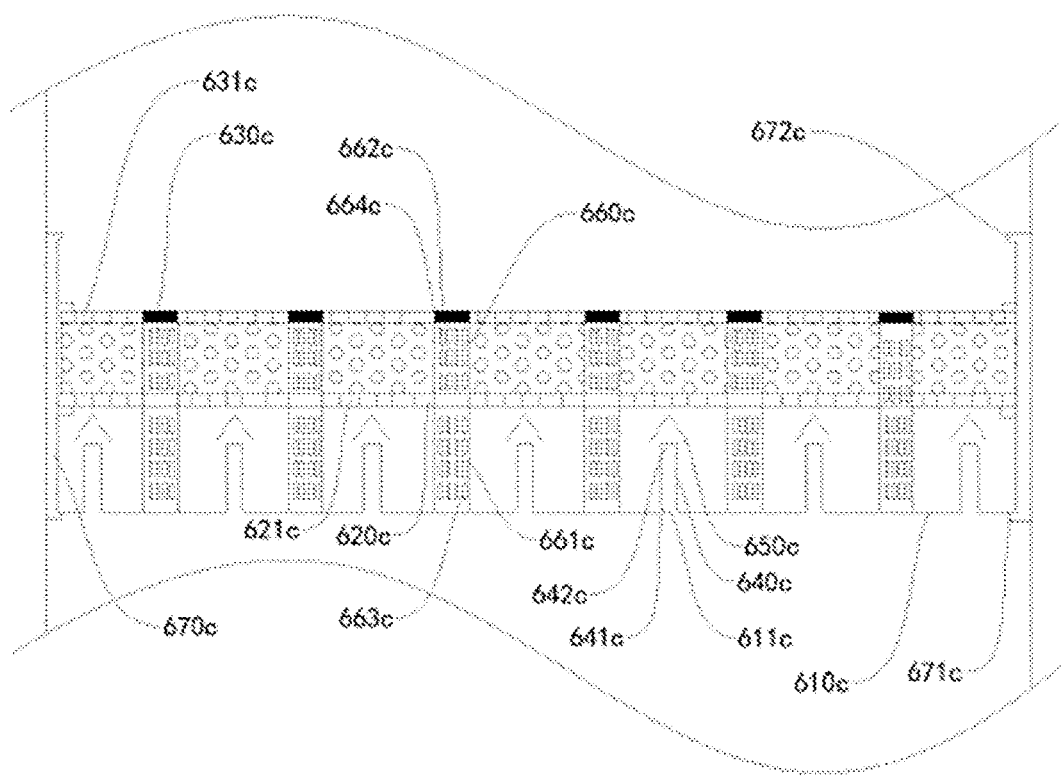
FIG. 10 is a partial schematic structural diagram of the upflow reactor according to the second embodiment of the present invention.
Figure 11:
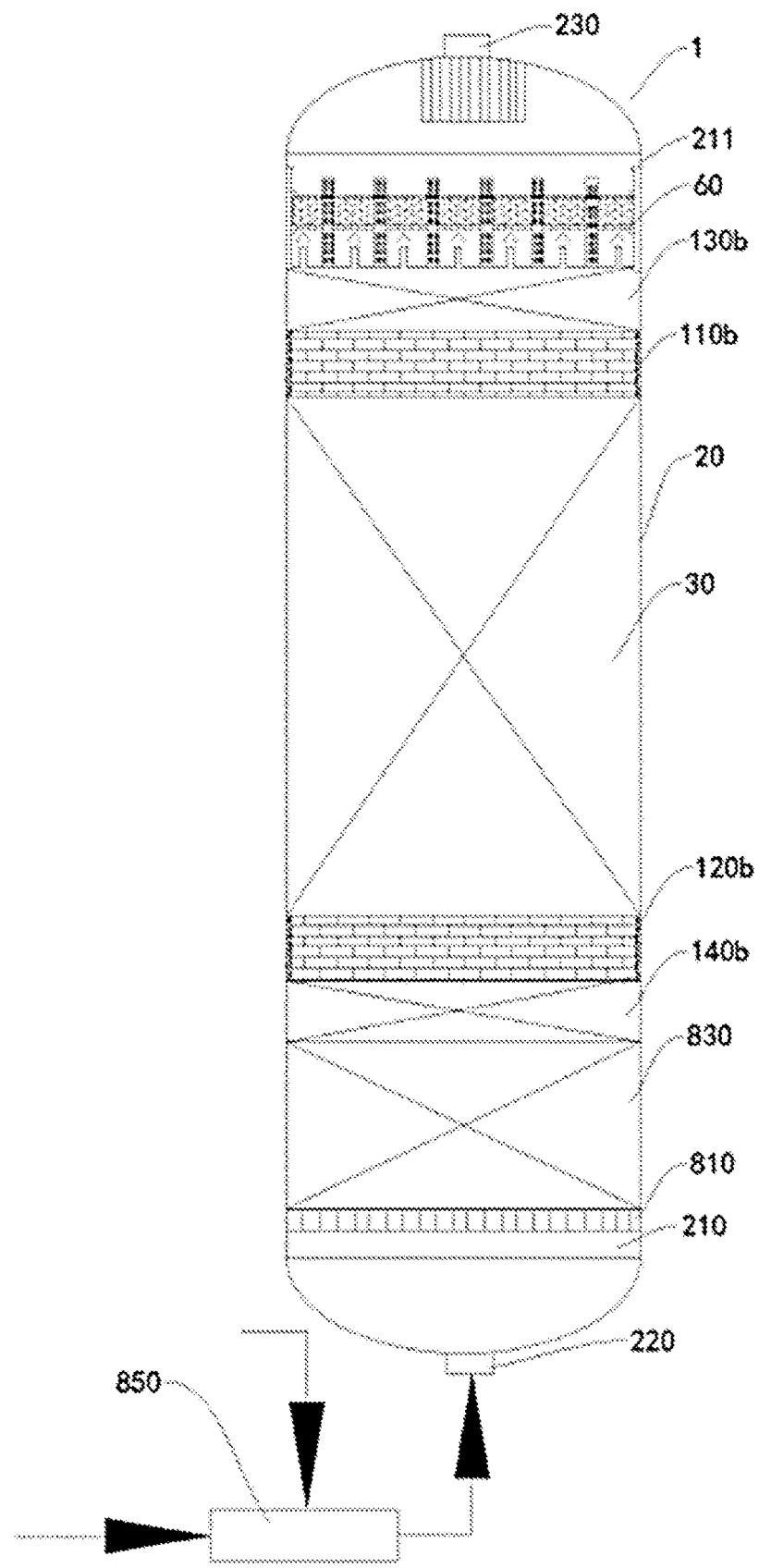
FIG. 11 is a schematic structural diagram of the upflow reactor according to the second embodiment of the present invention.

As shown in FIGS. 8, 10 and 11, the upflow reactor 1 further comprises a dust removing device 60, which is arranged in the reaction chamber 210 and located above the pressing device 10. The dust removing device 60 comprises a lower plate 610c, a middle plate 620c, an upper plate 630c, a plurality of separating cylinders 640c, a plurality of separating caps 650c, and a plurality of filtering cylinders 660c. The middle plate 620c is located between the lower plate 610c and the upper plate 630c in the vertical direction.

The lower plate 610c is provided with a plurality of first material channels 611c, the upper plate 630c is provided with a plurality of third material channels 631c, and an inert filling material is arranged between the upper plate 630c and the middle plate 620c. Optionally, the inert filling material may be one or more of inert alumina, porous ceramic material and porous metal material. For example, inert alumina ceramic balls and/or porous ceramic particles may be arranged (filled) between the upper plate 630c and the middle plate 620c.

The plurality of separating cylinders 640c are arranged on the lower plate 610c, the bottom end of each separating cylinder 640c is opened to form a material inlet 641c, the top end of each separating cylinder 640c is opened to form a material outlet 642c, and the material outlets 642c of the plurality of separating cylinders 640c are connected with the plurality of first material channels 611c in one-to-one correspondence. The plurality of separating caps 650c are located above the plurality of separating cylinders 640c in one-to-one correspondence, and the separating caps 650c are spaced apart from the corresponding separating cylinders 640c.

Each filtering cylinder 660c is arranged on the lower plate 610c, a first portion 661c of each filtering cylinder 660c is located between the lower plate 610c and the middle plate 620c in the vertical direction, and a second portion 662c of each filtering cylinder 660c is located between the middle plate 620c and the upper plate 630c in the vertical direction, wherein the first portion 661c of each filtering cylinder 660c is provided with a material inlet 663c, the second portion 662c of each filtering cylinder 660c is provided with a material outlet 664c, and the filtering cylinder 660c is filled with an inert filling material. Optionally, the inert filling material may be one or more of inert alumina, porous ceramic material and porous metal material. For example, the filtering cylinder 660c is filled with inert alumina ceramic balls and/or porous ceramic particles.

The reaction materials passing through the pressing device 10 enter into the separating cylinders 640c through the first material channels 611c and the material inlets 641c sequentially, flow from bottom to top, and are deflected under the action of the separating caps 650c, so that the catalyst dust entrained in the reaction materials deposit on the lower plate 610c under the action of gravity, thus deposition of the catalyst dust is realized. By deflecting the reaction materials, i.e., altering the flow direction of the reaction materials, the catalyst dust in the reaction materials can be effectively prevented from carried away by the reaction materials owing to excessively high flow speed of the reaction materials.

Then, the deflected reaction materials enter into the filtering cylinders 660c through the material inlets 663c, and the deflected reaction materials (generally flowing laterally) can wash the surfaces of the filtering cylinders 660c, which is beneficial to prevent the surfaces of the filtering cylinders 660c (especially the material inlets 663c) from being clogged by catalyst dust. The inert filling material in the filtering cylinders 660c can intercept the catalyst dust carried by the reaction materials.

The reaction materials in the filtering cylinders 660c can leave the filtering cylinders 660c through the material outlets 664c and enter into the space between the middle plate 620c and the upper plate 630c. The inert filling material arranged between the upper plate 630c and the middle plate 620c can intercept the catalyst dust carried by the reaction materials leaving the filtering cylinders 660c, and finally the reaction materials leave the dust removing device 60 through the third material channels 631c.

Thus, the catalyst dust carried by the reaction materials can be intercepted for many times, thereby hierarchical interception of the catalyst dust carried by the reaction materials can be realized, so as to prevent local clogging resulted from the catalyst dust. For example, catalyst dust in larger size (larger particles) is intercepted by the separating caps 650c, while catalyst dust in smaller size (smaller particles) is intercepted by the filtering cylinders 660c and the inert filling material arranged between the upper plate 630c and the middle plate 620c. By arranging a dust removing device 60 above the pressing device 10, the catalyst dust carried by the reaction materials can be intercepted by the dust removing device 60, so as to prevent the catalyst dust from clogging the reaction material outlet 230, and further prolong the operation time of the upflow reactor 1.

Optionally, each separating cap 650c may be arranged to be movable up and down. Thus, as the amount of catalyst dust depositing on the lower plate 610c gradually increases, the separating cap 650c can move upward, so that a circulation space of the reaction materials can be maintained and the deposition effect of the catalyst dust can be ensured, so as to effectively intercept the catalyst dust and keep stable pressure drop in the deposited catalyst dust layer.

Optionally, the rim of the projection of the separating cap 650c on a horizontal plane is located at the outer side of the rim of the projection of the corresponding separating cylinder 640c on the horizontal plane. Thus, more reaction materials can be deflected, thereby the catalyst dust can be intercepted better. As shown in FIG. 10, the separating cap 630b is in a horn shape.

The filling ratio of the inert filling material between the upper plate 630c and the middle plate 620c is smaller than or equal to a second preset value, wherein, the filling ratio of the inert filling material between the upper plate 630c and the middle plate 620c is equal to the total volume of the inert filling material divided by the volume between the upper plate 630c and the middle plate 620c.

The middle plate 620c is provided with a plurality of second material channels 621c. Thus, a part of the reaction materials can enter into the space between the upper plate 630c and the middle plate 620c through the second material channels 621c, and then leave the dust removing device 60 through the inert filling material and the third material channels 631c. Thus, the processing capacity of the dust removing device 60 in unit time can be increased, which is to say, more reaction materials can pass through the dust removing device 60 in unit time. The lower plate 610c may be fixedly arranged on the circumferential wall face 211 of the reaction chamber 210, and each of the middle plate 620c and the upper plate 630c may be arranged on the circumferential wall face 211 of the reaction chamber 210 to be movable up and down, which is to say, the inert filling material between the upper plate 630c and the middle plate 620c is also movable up and down. Thus, the middle plate 620c, the upper plate 630c and the inert filling material can move up and down according to the pressure drop in the catalyst dust layer depositing on the lower plate 610c.

Specifically, as the upflow reactor 1 operates, the amount of catalyst dust depositing on the lower plate 610c becomes more and more, which results in a decreased flow space of the reaction materials and increased pressure drop in the catalyst dust layer. The middle plate 620c, the upper plate 630c and the inert filling material can move upward so as to increase the volume between the lower plate 610c and the middle plate 620c, thereby increase the flow space of the reaction materials and decrease the pressure drop in the catalyst dust layer. Thus, the flow rate of the reaction materials can be kept substantially constant, so that the pressure drop in the catalyst dust layer can be stabilized, thus the pressure drop in the upflow reactor 1 can be stabilized.

The middle plate 620c and the upper plate 630c may be connected by a connecting member. For example, the top end of the connecting member is connected with the upper plate 630c, and the bottom end of the connecting member is connected with the middle plate 620c. Thus, the middle plate 620c, the upper plate 630c, and the inert filling material filled between the middle plate 620c and the upper plate 630c can move as an entire assembly.

As shown in FIGS. 8, 10 and 11, the dust removing device 60 may further comprise a fourth slideway 670c arranged on the circumferential wall face 211 of the reaction chamber 210, the lower plate 610c may be fixedly arranged on the fourth slideway 670c, and each of the middle plate 620c and the upper plate 630c may be arranged on the fourth slideway 670c to be movable up and down. Thus, the lower plate 610c, the middle plate 620c and the upper plate 630c can be installed more conveniently and easily, thereby the manufacturing difficulty of the upflow reactor 1 can be decreased.

Optionally, a seal ring is provided between the fourth slideway 670c and the upper plate 630c, and a seal ring is provided between the fourth slideway 670c and the middle plate 620c. Thus, the inert filling material can be prevented from running off between the middle plate 620c and the fourth slideway 670c and between the upper plate 630c and the fourth slideway 670c.

As shown in FIGS. 8, 10 and 11, the fourth slideway 670c is provided with a supporting boss 671c and an upper limiting boss 672c, the lower plate 610c is supported on the supporting boss 671c, and the upper plate 630c is located below the upper limiting boss 672c. The upper limiting boss 672c can work with the upper plate 630c to limit the upward movement distance of the upper plate 630c.

As shown in FIG. 10, a plurality of filtering cylinders 660c are arranged around each separating cylinder 640c, and a plurality of separating cylinders 640c are arranged around each filtering cylinder 660c. Thus, the reaction materials leaving the separating cylinders 640c can enter into the filtering cylinders 660c more uniformly.

Figure 21:
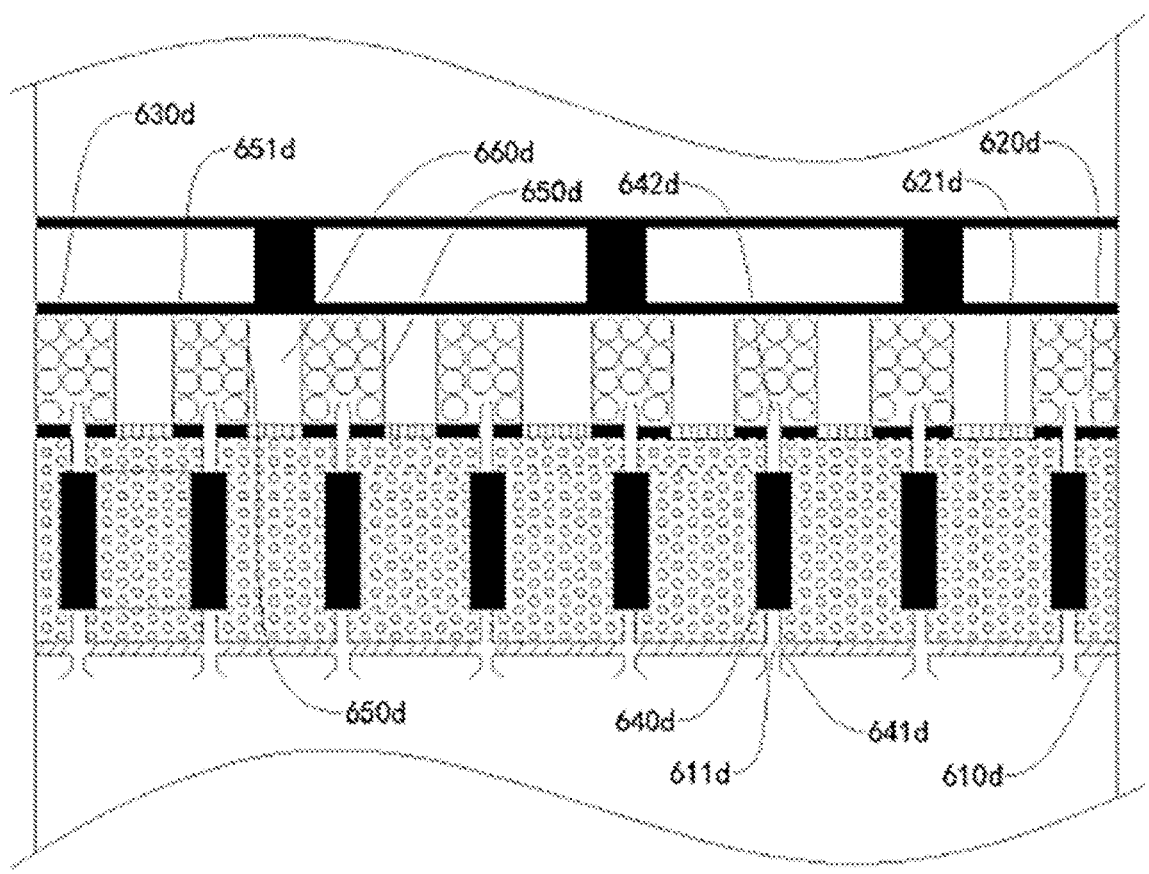
FIG. 21 is a partial schematic structural diagram of the upflow reactor according to the fifth embodiment of the present invention.

As shown in FIGS. 19, 21 and 22, the upflow reactor 1 further comprises a dust removing device 60, which is arranged in the reaction chamber 210 and located above the pressing device 10. The dust removing device 60 comprises a lower plate 610d, a middle plate 620d, an upper plate 630d and a plurality of membrane filtering assemblies 640d, and the middle plate 620d is located between the lower plate 610d and the upper plate 630d in the vertical direction. The lower plate 610d is provided with a plurality of first material channels 611d, the middle plate 620d is provided with a plurality of second material channels 621d, and the upper plate 630d is provided with a plurality of third material channels. An inert porous material is provided between the middle plate 620d and the upper plate 630d. Optionally, the inert filling material may be one or more of inert alumina, porous ceramic material and porous metal material. For example, inert alumina ceramic balls and/or porous ceramic particles may be arranged (filled) between the middle plate 620d and the upper plate 630d.

The material inlet 641d of each membrane filtering assembly 640d is connected with the first material channel 611d, and the material outlets 642d of a plurality of membrane filtering assemblies 640d extend into the inert porous material arranged between the middle plate 620d and the upper plate 630d. The expression "the material inlet 641d of the membrane filtering assembly 640d is connected with the first material channel 611d" should be understood broadly. The expression "the material inlet 641d of the membrane filtering assembly 640d is connected with the first material channels 611*d*" includes, but is not limited to: a. the material inlet 641*d* of the membrane filtering assembly 640*d* is connected with the top edge of the first material channel 611*d*; b. the material inlet 641*d* of the membrane filtering assembly 640*d* extends into the first material channel 611*d*; c. the material inlet 641*d* of the membrane filtering assembly 640*d* passes through the first material channel 611*d* so as to be located below the first material channel 611*d*.

The reaction materials passing through the pressing device 10 can enter into the membrane filtering assemblies 640*d* through the first material channels 611*d* and the material inlets 641*d*, and the membrane filtering assemblies 640*d* filter the reaction materials to intercept the catalyst dust carried by the reaction materials. One part of the reaction materials can pass through the tube wall of the membrane filtering assembly 640*d*, and the other part of the reaction materials and the catalyst dust intercepted by the membrane filtering assembly 640*d* can enter into the inert filling material arranged between the middle plate 620*d* and the upper plate 630*d* through the material outlet 642*d* of the membrane filtering assembly 640*d*, the inert filling material can intercept the intercepted catalyst dust carried by the other part of the reaction materials (the catalyst dust intercepted by the membrane filtering assembly 640*d*). The one part of the reaction materials can leave the pressing device 10 through the second material channels 621*d* and the third material channels sequentially, and the other part of the reaction materials can leave the pressing device 10 through the third material channels.

Owing to the buoyancy of the reaction materials and the fluctuation of the flow rate and/or pressure of the reaction materials, gouging abrasion of the catalyst particles is inevitably, consequently some catalyst dust may be produced. By arranging a dust removing device 60 above the pressing device 10, the catalyst dust carried by the reaction materials can be intercepted by the dust removing device 60, so as to prevent the catalyst dust from clogging the reaction material outlet 230, and further prolong the operation time of the upflow reactor 1.

Optionally, an inert filling material is provided between the lower plate 610*d* and the middle plate 620*d*. The inert filling material may be one or more of inert alumina, porous ceramic material and porous metal material. For example, inert alumina ceramic balls and/or porous ceramic particles may be arranged (filled) between the lower plate 610*d* and the middle plate 620*d*. Some of the plurality of first material channels 611*d* are connected with the material inlets 641*d* of the membrane filtering assemblies 640*d*.

That is to say, the others of the plurality of first material channels 611*d* are not connected with the material inlets 641*d* of the membrane filtering assemblies 640*d*. Thus, a part of the reaction materials can enter into the space between the lower plate 610*d* and the middle plate 620*d* through the others of the plurality of first material channels 611*d*, so that the inert filling material arranged between the lower plate 610*d* and the middle plate 620*d* can intercept the catalyst dust carried by that part of the reaction materials.

Since the reaction materials can enter into the space between the lower plate 610*d* and the middle plate 620*d* through the material inlets 641*d* of the plurality of membrane filtering assemblies 640*d* and the others of the plurality of first material channels 611*d*, the processing capacity of the dust removing device 60 in unit time can be improved, which is to say, more reaction materials can pass through the dust removing device 60 in unit time.

As shown in FIGS. 19, 21 and 22, the dust removing device 60 comprises a plurality of third dust removing members 650*d*, each of which is arranged between the upper plate 630*d* and the middle plate 620*d*, and each third dust removing member 650*d* has a third accommodating cavity 651*d* filled with an inert porous material. The material outlets 642*d* of the plurality of membrane filtering assemblies 640*d* extend into the inert porous material in the plurality of third accommodating cavities 651*d* in one-to-one correspondence. Thus, the structure of the dust removing device 60 is more reasonable.

Optionally, a second material circulation cavity 660*d* is defined between two adjacent third dust removing members 650*d*, and the second material circulation cavity 660*d* is opposite to the second material channel 621*d* in the vertical direction, and is opposite to the third material channel in the vertical direction. Thus, the structure of the dust removing device 60 is more reasonable. The reaction materials passing through the third dust removing member 650*d* can enter into the second material circulation cavity 660*d*, the reaction materials passing through the second material channel 621*d* can also enter into the second material circulation cavity 660*d*, and the reaction materials in the second material circulation cavity 660*d* can leave the dust removing device 60 through the third material channel.

As shown in FIGS. 12 and 15, the upflow reactor 1 further comprises a sliding support 410, which is arranged in the reaction chamber 210 to be movable up and down. The catalyst bed layer 30 can be supported on the sliding support 410, and the sliding support 410 has a material channel to allow the reaction materials to pass through the sliding support 410.

As shown in FIGS. 12 and 15, the sliding support 410 comprises a first slideway 411 and a first grating plate 412, wherein the first slideway 411 is arranged on the circumferential wall face 211 of the reaction chamber 210, the first grating plate 412 can move up and down on the first slideway 411, and the catalyst bed layer 30 can be supported on the first grating plate 412.

Optionally, the first slideway 411 is provided with a lower limiting boss 4111 and an upper limiting boss 4112, wherein the first grating plate 412 is located between the lower limiting boss 4111 and the upper limiting boss 4112 in the vertical direction, the lower limiting boss 4111 can work with the first grating plate 412 to limit the downward movement distance of the first grating plate 412, and the upper limiting boss 4112 can work with the first grating plate 412 to limit the upward movement distance of the first grating plate 412.

As shown in FIGS. 1-7, the upflow reactor 1 further comprises a protectant layer 830, which is arranged in the reaction chamber 210 and located below the catalyst bed layer 30. Thus, the metal impurities and solid particles, etc. in the reaction materials can be removed by means of the protectant layer 830, and the substances that are easy to coke in the reaction materials can be appropriately hydrogenated at the same time, so as to alleviate poisoning and coking of the catalyst and prolong the service life of the catalyst.

The present invention further provides an upflow reactor 1, which comprises a housing 20, in which a supporting plate 810, a catalyst bed layer 30 and a pressing device 10 are arranged in the material flow direction. The bottom of the housing 20 is provided with a reaction material inlet 220, and the top of the housing 20 is provided with a reaction material outlet 230. The pressing device 10 comprises a third slideway 173, a floatable pressing layer and a sealing member, wherein the floatable pressing layer comprises an upper pressing plate 110*a*, a lower pressing plate 120*a* and a fixed interlayer between the upper pressing plate 110*a* and the upper pressing plate 110a. The upper pressing plate 110a and the lower pressing plate 120a are fixedly connected through several groups of axial ribs to form a cage-type frame structure.

One end of the sealing member is fixed on the rim of the floatable pressing layer, and the other end of the sealing member is movably overlapped on the surface of the third slideway 173. The sealing member keeps the floatable pressing layer highly sealed when the floatable pressing layer floats up and down on the surface of the third slideway 173, and prevents leakage of the materials, catalyst particles and catalyst dust. The sealing member may be a seal ring and/or a seal strip. The third slideway 173 is fixed on the circumferential wall face 211 of the reaction chamber 210 in the axial position of the upflow reactor 1, the lower edge of the third slideway 173 is adjacent to the catalyst bed layer 30, and the floatable pressing layer floats integrally on the third slideway 173.

The upper pressing plate 110a and the lower pressing plate 120a are in the same structural form or different structural forms, and employ parallel metal grating bars or Johnson screen. In the case that parallel metal grating bars are employed, the width of the grating bars is usually 20~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles outside the fixed interlayer in order to prevent the inert material from leaking out and prevent the catalyst from leaking in, and usually is 1 mm~30 mm; in the case that a Johnson screen is employed, the spacing between the mesh wires is usually 1 mm~10 mm, so as to prevent the catalyst particles from being stuck among the mesh wires.

The fixed interlayer is filled with an inert filling material, which is one or more of inert alumina ceramic balls and porous ceramic material. In use, the inert filling material has an appropriate movement space in the fixed interlayer and can move relatively to prevent adhesion and accumulation of the catalyst dust. In the case that the fixed interlayer is filled with inert alumina ceramic balls, the diameter of the inert alumina ceramic balls usually is 3 mm~30 mm.

In the upflow reactor 1 in the present invention, the catalyst bed layer 30 is filled with a catalyst with a catalytic function well known to those skilled in the art, and the filling height of the catalyst bed layer 30 may be determined by the optimum space velocity of the catalyst.

The length of the third slideway 173 is 10 mm~800 mm, preferably 50 mm~300 mm. The supporting plate 810 has a parallel metal grating structure. If the length of the third slideway 173 is too small, the catalyst particles may be jammed owing to the small floating space, which results in a shortened operation period; if the length of the third slideway 173 is too long, the floating space of the catalyst will be enlarged, which causes serious abrasion of the catalyst, consequently leads to problems such as excessive catalyst dust and falling of the active metal components of the catalyst.

A protectant layer 830 and/or a ceramic ball layer 840 are/is arranged in the housing 20. According to the material flow direction, the protectant layer 830 and the ceramic ball layer 840 are arranged between the supporting plate 810 and the catalyst bed layer 30. In the case that both the protectant layer 830 and the ceramic ball layer 840 are provided, the protectant layer 830 is arranged below the ceramic ball layer 840.

In the upflow reactor 1 in the present invention, the protectant layer 830 is filled with a protectant, which is mainly used for removing metal impurities and solid particles in the raw materials, and appropriately hydrogenate the substances that are easy to coke in the raw materials at the same time, so as to slow down poisoning and coking of the catalyst and prolong the service life of the main catalyst. The protectant may be a commercial product or prepared with an existing method in the prior art, and those choices are well known to those skilled in the art.

The height ratio of the protectant layer 830 to the catalyst bed layer 30 is 1:1~1:50, preferably 1:2~1:5. The ceramic ball layer 840 is filled with inert ceramic balls, and the height of the ceramic ball layer 840 is 50 mm~500 mm, preferably 100 mm~300 mm. A wire mesh, preferably a stainless steel wire mesh, is laid above the ceramic ball layer 840.

In the upflow reactor 1 of the present invention, the supporting plate 810 has a parallel metal grating structure for supporting the weight of the upper catalyst bed layer 30 thereon. The supporting plate 810 may be well known to those skilled in the art, and may be selected and changed according to the actual requirement. Usually, the supporting plate 810 comprises a main beam, grating bars and a screen, wherein the two sides of the main beam are fixedly overlapped on the ledges of the inner wall of the reactor, the grating bars are located on the main beam and the ledges, the screen is laid on the top surfaces of the grating bars, and the mesh number of the screen is usually 5~30-mesh, preferably 10~20-mesh.

A dust removing device 60 is arranged above the pressing device 10, and certain space is reserved between the pressing device 10 and the dust removing device 60 for the pressing device 10 to float up and down. The dust removing device 60 comprises an upper plate 630a, a middle plate 620a, a lower plate 610a and dust collecting net blocks, wherein a primary filtering layer is formed between the lower plate 610a and the middle plate 620a, a secondary filtering layer is formed between the upper plate 630a and the middle plate 620a, dust collecting net blocks are arranged uniformly in the primary filtering layer and the secondary filtering layer in a staggered manner, the surfaces of the upper plate 630a, the middle plate 620a, and the lower plate 610a attain a staggered sealing effect, so that the materials follow a Z-shaped movement locus when passing through the dust removing device 60.

The dust collecting net blocks can be third dust removing member 640a and fourth dust removing member 650a, and the surfaces of the dust collecting net blocks are wrapped by a stainless steel wire mesh or Johnson screen, and the dust collecting net blocks are filled with an inert porous material. Inert alumina ceramic balls in $\varphi 10$~$\varphi 30$ diameter are filled in the dust collecting net blocks in the primary filtering layer for intercepting and collecting large-particle catalyst dust, and inert alumina ceramic balls in $\varphi 3$~$\varphi 13$ diameter are filled in the dust collecting net blocks in the secondary filtering layer for intercepting and collecting small-particle catalyst dust.

The dust collecting net block is in a shape that is any of cylindrical shape, cubic shape, rhombic shape, cuboid shape, and polygonal shape, preferably in a cylindrical shape. The unit height of the dust collecting net blocks is 10 mm~1,000 mm, preferably 50 mm~200 mm.

The upflow reactor 1 is applicable to hydrogenation reactions of hydrocarbon oils. The hydrocarbon oils are hydrocarbon raw materials with any fraction within a distillation range of 130° C.~550° C., and may be one or more of naphtha, reformate oil, aviation kerosene, diesel oil, wax oil, lube oil, residual oil, deasphalted oil, biodiesel, animal oil or vegetable oil. The hydrogenation reaction conditions of the upflow reactor 1 are as follows: the temperature is 40° C.~360° C.; the pressure is 0.5 MPa~20.0 MPa, preferably 1.0 MPa~8.0 MPa; the liquid hourly space velocity is 0.5 $h^{-1}$~15 $h^{-1}$; the mass ratio of hydrogen to oil is 0.001%~15%, preferably 0.01%~5%. When the upflow reactor 1 is used for liquid-phase hydrogenation reaction of hydrocarbon oils, firstly, raw oil and hydrogen are mixed and dissolved to obtain a material flow containing hydrogen; then, the material flow is introduced as feed materials from the bottom of the upflow reactor 1, and the material flow exits from the top of the upflow reactor 1 after the reaction. In the mixing and dissolving process, the mass ratio of hydrogen to oil is 0.001%~15%; the mixing and dissolving conditions of the hydrogen and oil are as follows: temperature: 40° C.~360° C., pressure: 0.5 MPa~20.0 MPa, retention time: 0.5 min~30 min.

The mixing and dissolving of the raw oil and hydrogen may be carried out in a conventional shell-type hydrogen-oil mixing assembly, and the shell may contain any one or more of SWN-type, SMX-type, SMK-type, SML-type, SMH-type, and spiral plates, corrugated plates, rotating blades, flat blades, curved blades or perforated plates, etc.; alternatively, the raw oil and hydrogen may be dissolved and dispersed by means of a membrane tube micro-disperser, microplate, or microporous material, etc., preferably a membrane tube micro-disperser, and the bubble size of pre-dispersed hydrogen is 10 nm~1,000 nm, usually 50 nm~500 nm. The mixture formed by mixing hydrogen and oil and fed into the reactor may be in gas and liquid phases or a pure liquid phase in which hydrogen is dissolved and dispersed.

To overcome the drawbacks in the prior art, the present invention provides an upflow reactor 1 and an application therefore. The upflow reactor 1 is provided with a pressing device 10 therein, which can float up and down with the fluctuation of a catalyst bed layer 30, so as to prevent abrasion of the particles in the catalyst floating process, protect the catalyst and reduce dust. A dust removing device 60 is arranged at the top of the catalyst bed layer 30, so as to uniformly intercept and collect catalyst dust and maintain long-time stability of the pressure drop in the bed layer.

In the upflow reactor 1 in the present invention, the pressing device 10 is arranged above the catalyst bed layer 30, and the pressing device 10 floats up and down with the expansion/contraction of the catalyst bed layer 30, and its position is mainly related with the pressure drop in the catalyst bed layer 30; when the pressure drop in the catalyst bed layer 30 is small, the position of the pressing device 10 is close to the bottom of the upflow reactor 1; when the pressure drop in the catalyst bed layer 30 is great, the position of the pressing device 10 is close to the top of the upflow reactor 1.

Compared with the prior art, the upflow reactor 1 provided by the present invention has the following advantages:
1. The upflow reactor 1 is provided with a pressing device 10. Compared with traditional upflow reactors, in the upflow reactor 1, on one hand, abrasion and powdering of the catalyst particles resulted from settlement of the catalyst after liquid feeding into the upflow reactor 1 can be prevented so as to protect the catalyst and reduces dust; on the other hand, as the pressure drop in the catalyst bed layer 30 gradually increases, the pressing device 10 can float upward to ensure long-time operation of the reactor.
2. The frame composed of the upper pressing plate 110a and the lower pressing plate 120a of the pressing device 10 is an integral fixed structure, which floats up and down integrally when floating in the upflow reactor 1. However, the inert filling material in the middle interlayer has an appropriate movement space, and the inert filling material (e.g., inert alumina ceramic balls) can move relatively, so as to prevent adhesion and accumulation of the catalyst dust.
3. A dust removing device 60 is arranged above the pressing device 10. Owing to the buoyancy and production fluctuations during the use of the catalyst, it is inevitable that some dust will be generated as a result of collision and wear among the particles. With the dust removing device 60, the catalyst dust passing through the pressing device 10 can be filtered off to prevent the dust from entering into other parts (e.g., the top outlet pipe) and clogging. The dust removing device 60 employs a hierarchical filtering and graded filling approach to intercept and filter the dust sequentially according to the particle size of the dust, so that the filtering layer can intercept the dust uniformly and prevent local clogging; the flow in the catalyst dust filtering layer follows a Z-shaped deflected movement locus, which is beneficial for dust interception and settlement.
4. The pressing device 10 can float up and down with the expansion of the catalyst bed layer 30, so as to prevent abrasion of the particles of the catalyst in the floating process, protect the catalyst and reduce dust at the same time. In addition, by arranging a dust removing device 60 at the top of the catalyst bed layer 30, the catalyst dust can be intercepted and collected uniformly, and long-time stability of the pressure drop in the bed layer can be maintained.

As shown in FIG. 7, hydrogen and raw oil are dissolved and mixed in a hydrogen-oil mixer 850 to form a gas-liquid mixture or a liquid-phase material in which hydrogen is dissolved, then the mixture is introduced as feed materials into the upflow reactor 1 through the reaction material inlet 220, passes through the supporting plate 810, the protectant layer 830, the ceramic ball layer 840, the catalyst bed layer 30, the pressing device 10 and the dust removing device 60 sequentially, and then leaves the upflow reactor 1 through the reaction material outlet 230 as outputted materials.

During normal operation, owing to the particularity of the reaction process and the buoyancy, the catalyst bed layer 30 is in an expanded state after the material feeding and floats up and down with the fluctuations of the material feeding, while the pressing device 10 floats up and down with the catalyst bed layer 30, thus the abrasion of the catalyst particles and generated dust are reduced; the material passing through the pressing device 10 enters into the dust removing device 60, and passes through the lower plate 610a, the primary filtering layer, the middle plate 620a, the secondary filtering layer and the upper plate 630a sequentially, so as to filter off, intercept and collect the dust entrained in the material in a staged manner.

The raw oil used in the embodiments and comparative examples of the present invention is first side cut from an atmospheric and vacuum distillation device, and the specific properties of the raw oil are shown in Table 1. The catalyst used in the hydrogenation reactions in the embodiments and the comparative examples is FH-40A from Fushun Research Institute of Petrochemical Technology, and the protectant is FBN-03B01 from Fushun Research Institute of Petrochemical Technology.

TABLE 1

| Properties of Raw Oil | |
| --- | --- |
|  | Raw oil |
| Density, g/cm³ | 0.812 |
| Distillation range (ASTM D86), °C. | |
| IBP/10% | 156/178 |
| 20%/50% | 182/205 |
| 90%/FBP | 241/273 |
| Mercaptan sulfur, μg/g | 46 |
| Sulfur, μg/g | 347 |
| Nitrogen content, μg/g | 16 |
| Aromatic content, v % | 11.8 |

Embodiment 1

Raw oil and hydrogen are mixed in a conventional static mixer (model SX2.3/25-6.4-500), and then the mixture is introduced as feed materials into an upflow reactor 1 (the reactor diameter is 100 mm), the upflow reactor 1 is filled with a supporting plate 810, a protectant layer 830 in 120 mm height, a φ13 mm alumina ceramic ball layer 840 (the height is 80 mm, a 10-mesh stainless steel wire mesh is laid above the ceramic ball layer 840), a catalyst bed layer 30 in 300 mm height, and a pressing device 10 in 120 mm height sequentially in the material flow direction, wherein the supporting plate 810 comprises a main beam, grating bars and a screen, wherein the two sides of the main beam are fixedly overlapped on the ledges of the inner wall of the upflow reactor 1, the grating bars are located on the main beam and the ledges, the screen is laid on the top surfaces of the grating bars, and the mesh number of the screen is 12-mesh.

The pressing device 10 comprises a third slideway 173, a floatable pressing layer and a sealing member, wherein the floatable pressing layer comprises an upper pressing plate 110a, a lower pressing plate 120a and a fixed interlayer between the upper pressing plate 110a and the upper pressing plate 110a. The fixed interlayer is filled with φ13 inert alumina ceramic balls; the upper pressing plate 110a and the lower pressing plate 120a are in different structural forms, the upper pressing plate 110a employs parallel metal grating bars in 30 mm width, and the slits between the grating bars is in 10 mm width; the lower pressing plate 120a employs a Johnson screen with 2 mm spacing between the mesh wires; in the filling process, each bed layer is compacted and filled; wherein no stainless steel wire mesh is filled between the bed layers. The measurement results are shown in Table 2.

Embodiment 2

The upflow reactor 1 of the present invention is used, raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into the upflow reactor 1 (the diameter of the upflow reactor 1 is 150 mm); the reactor is filled with a supporting plate 810, a protectant layer 830 in 100 mm height, a φ13 mm alumina ceramic ball layer 840 (the height is 80 mm, a 10-mesh stainless steel wire mesh is laid above the ceramic ball layer 840), a catalyst bed layer 30 in 450 mm height, a pressing device 10 in 150 mm height, a dust removing device 60 (with a primary filtering layer in 60 mm height filled with dust collecting net blocks composed of φ13 mm alumina ceramic balls and a Johnson screen and a secondary filtering layer in 60 mm height filled with dust collecting net blocks composed of φ3-φ6 mm alumina ceramic balls and a Johnson screen) sequentially in the material flow direction; wherein the supporting plate 810 comprises a main beam, grating bars and a screen, wherein the two sides of the main beam are fixedly overlapped on the ledges of the inner wall of the reactor, the grating bars are located on the main beam and the ledges, the screen is laid on the top surfaces of the grating bars, and the mesh number of the screen is 12-mesh.

The pressing device 10 comprises a third slideway 173, a floatable pressing layer and a sealing member, wherein the floatable pressing layer comprises an upper pressing plate 110a, a lower pressing plate 120a and a fixed interlayer between the upper pressing plate 110a and the upper pressing plate 110a. The fixed interlayer is filled with φ10 porous ceramic particles; the upper pressing plate 110a and the lower pressing plate 120a are in the same structural form, and both of them employ a Johnson screen with 2 mm spacing between the mesh wires; in the filling process, each bed layer is compacted and filled; wherein no stainless steel wire mesh is filled between the bed layers. The measurement results are shown in Table 2.

Embodiment 3

The upflow reactor 1 provided by the present invention is used, raw oil and hydrogen are mixed in a conventional static mixer (model SX2.3/25-6.4-500), and then the mixture is introduced as feed materials into the upflow reactor 1 (the diameter of the upflow reactor 1 is 300 mm); the upflow reactor 1 is filled with a supporting plate 810, a protectant layer 830 in 60 mm height, a φ13 mm alumina ceramic ball layer (the height is 40 mm), a catalyst bed layer 30 in 500 mm height, a pressing device 10 in 200 mm height, a dust removing device 60 (with a primary filtering layer in 60 mm height filled with dust collecting net blocks composed of φ13 mm alumina ceramic balls and a Johnson screen and a secondary filtering layer in 60 mm height filled with dust collecting net blocks composed of φ3~φ6 mm alumina ceramic balls and a Johnson screen) sequentially in the material flow direction; wherein the supporting plate 810 comprises a main beam, grating bars and a screen, wherein the two sides of the main beam are fixedly overlapped on the ledges of the inner wall of the reactor, the grating bars are located on the main beam and the ledges, the screen is laid on the top surfaces of the grating bars, and the mesh number of the screen is 12-mesh.

The pressing device 10 comprises a third slideway 173, a floatable pressing layer and a sealing member, wherein the floatable pressing layer comprises an upper pressing plate 110a, a lower pressing plate 120a and a fixed interlayer between the upper pressing plate 110a and the upper pressing plate 110a. The fixed interlayer is filled with φ10 porous ceramic particles; the upper pressing plate 110a and the lower pressing plate 120a are in the same structural form, and both of them employ a Johnson screen with 2 mm spacing between the mesh wires; in the filling process, each bed layer is compacted and filled; wherein no stainless steel wire mesh is filled between the bed layers. The measurement results are shown in Table 2.

Comparative Example 1

Compared with the embodiment 1, the difference lies in that no pressing device 10 is provided in the reactor, but two ceramic ball layers are provided instead.

Raw oil and hydrogen are mixed in a conventional static mixer (model SX2.3/25-6.4-500), and then the mixture is introduced as feed materials into a conventional upflow reactor (the diameter of the reactor is 100 mm); the reactor is filled with a catalyst support grating, a protectant layer in 120 mm height, a φ13 mm alumina ceramic ball layer in 80 mm height, a catalyst bed layer in 300 mm height, a φ3~φ6 mm alumina ceramic ball layer in 60 mm height, and a φ13 mm alumina ceramic ball layer in 60 mm height sequentially in the material flow direction; in the filling process, each bed layer is compacted and filled; wherein a 12-mesh stainless steel wire mesh is filled between the protectant layer and the catalyst bed layer, and a 12-mesh stainless steel wire mesh is also filled between the catalyst bed layer and the φ3~φ6 mm alumina ceramic ball layer, to prevent loss of the catalyst. The measurement results are shown in Table 2.

Comparative Example 2

Compared with the embodiment 2, the difference lies in that no pressing device 10 is provided in the reactor, but two ceramic ball layers are provided instead.

Raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into an upflow reactor (the diameter of the reactor is 150 mm); the reactor is filled with a catalyst support grating, a protectant layer in 100 mm height, a φ13 mm alumina ceramic ball layer in 80 mm height, a catalyst bed layer in 450 mm height, a φ3~φ6 mm alumina ceramic ball layer in 130 mm height, and a φ13 mm alumina ceramic ball layer in 130 mm height sequentially in the material flow direction; in the filling process, each bed layer is compacted and filled; wherein no stainless steel wire mesh is filled between the bed layers. The measurement results are shown in Table 2.

catalyst abrasion, consequently the dust produced resulted from catalyst abrasion may easily clog the silts between the grating bars, causing rapid increase of pressure drop in the reactor bed layer. On the contrary, if the apparent liquid flow velocity is low, the impact force on the catalyst bed layer and the protectant bed layer will be small, resulting in reduced catalyst abrasion, thereby the pressure drop in the reactor bed layer will increase slowly. Thus, the method for measuring the application result of the upflow reactor in the embodiments 1-3 and the comparative examples 1 and 2 is as follows: Under the condition of the same processing capacity, a conventional upflow reactor is compared with the upflow reactor 1 in the present invention, and the increase rate of pressure drop in the reactor bed layer is tested by changing the apparent liquid flow velocity in the process of comparison. After certain operation time, the lower the pressure drop in the catalyst bed layer is, the better the application result is. In order to reduce the error caused by the experiment, the apparent liquid flow velocity is determined by measuring for several times and averaging.

It can be seen from the increase rates of pressure drop in the reactor in the embodiments 1-3 and the comparative examples 1 and 2: the increase rate of pressure drop in the upflow reactor 1 in the present invention is low, and the operation time of the device is greatly prolonged, which indicate that the pressing device 10 can effectively fix the catalyst bed layer 30, and the abrasion condition of the catalyst particles is significantly improved. In addition, it can be seen from the low increase rate of pressure drop in the upflow reactor 1 in the present invention: the dust removing device 60 can intercept almost all dust and realize uniform dust collection.

As shown in FIGS. 8-11, the present invention further provides an upflow reactor 1, which comprises a housing 20, in which a supporting plate 810 and a catalyst bed layer 30 are arranged in the material flow direction, and a lower

TABLE 2

Measurement Results

| | Embodiment 1 | Embodiment 2 | Embodiment 3 | Comparative example 1 | Comparative example 2 |
|---|---|---|---|---|---|
| Apparent liquid flow velocity, m/s | 0.0224 | 0.0194 | 0.0176 | 0.0104 | 0.0112 |
| | 0.0212 | 0.0202 | 0.0172 | 0.0106 | 0.0109 |
| | 0.0238 | 0.0198 | 0.0168 | 0.0118 | 0.0108 |
| Average, m/s | 0.0224 | 0.0198 | 0.0172 | 0.01093 | 0.0109 |
| Operation time, min. | 13928 | 17865 | 25274 | 6481 | 8344 |
| Pressure drop in catalyst bed layer, ΔP | 10.37 | 8.45 | 13.98 | 14.77 | 15.86 |
| Amount of dust collected by primary filtering layer, g | — | 0.055 | 0.086 | — | — |
| Amount of dust collected by secondary filtering layer, g | — | 0.010 | 0.017 | — | — |

Note:
The apparent liquid flow velocity refers to the average flow velocity of the liquid flowing through an empty tower without any component installed in the upflow reactor, which is obtained by dividing the flow of the liquid fed into the upflow reactor by the cross-sectional area of the upflow reactor.

It is well known to those skilled in the art: when upflow hydrogenation reaction is carried out with a conventional hydrogenation reactor, there are certain requirements for the ratio of height to diameter of the catalyst in order to ensure the reaction effect and long-time operation; moreover, the diameter of the reactor should not be too large or too small, otherwise the apparent liquid flow velocity in the upflow reactor will be affected. If the apparent liquid flow velocity is high, the impact force on the catalyst bed layer and the protectant bed layer will be great, resulting in serious elastic bearing layer is arranged at the bottom of the catalyst bed layer 30 and/or an upper elastic bearing layer is arranged at the top of the catalyst bed layer 30. The upper elastic bearing layer comprises an upper elastomer bed layer 110*b* and an upper bearing layer 130*b*, and the lower elastic bearing layer comprises a lower elastomer bed layer 120*b* and a lower bearing layer 140*b*. The lower elastomer bed layer 120*b* is located above the lower bearing layer 140*b*, and the upper bearing layer 130*b* is located below the upper elastomer bed layer 110*b*. Both the upper elastomer bed layer 110b and the lower elastomer bed layer 120b comprise several plastic elastomer units, each of which contains particles made of an elastic material, and gaps between the plastic elastomer units and inside the units are used as fluid flow channels.

The particles are in a shape that comprises one or more of spherical shape, strip shape, polygonal shape, tooted spherical shape, and block shape; the elastic material is a high temperature-resistant rubber material, specifically is one or more of silicone rubber, boron silicone rubber and fluorosilicone rubber. Both the upper bearing layer 130b and the lower bearing layer 140b have an integral frame structure that is filled with inert ceramic balls therein and has a screen on the periphery.

When the catalyst bed layer 30 floats up and down, the lower elastomer bed layer 120b and the upper elastomer bed layer 110b undergo deformation so that its volume is reduced or increased, thus repeatedly prevent the pressure drop in the catalyst bed layer 30 from changing, which is to say, the lower elastomer bed layer 120b and the upper elastomer bed layer 110b can be deformed under the action of the catalyst bed layer 30, and can be recovered to the original volume and shape after the force of action is withdrawn. The height of the lower elastomer bed layer 120b and the upper elastomer bed layer 110b is usually 10 mm~500 mm, preferably 50 mm~200 mm.

The upper bearing layer 130b is configured to support and offset the deformation displacement of the upper elastomer bed layer 110b, and the lower bearing layer 140b is configured to support and offset the deformation displacement of the lower elastomer bed layer 120b, so that the lower elastomer bed layer 120b and the upper elastomer bed layer 110b are deformed in a limited space. Both the upper bearing layer 130b and the lower bearing layer 140b are integral frame structures that are filled with inert ceramic balls and have a screen on the periphery, and the screen may be made of stainless steel, specifically one or more of SS 30408, SS 30403, SS 31608, SS 31603 and SS 32168. The screen has certain anti-deformation ability, and usually uses steel wires in 0.1 mm~2 mm diameter, which are usually used for weaving wire meshes. The height of the upper bearing layer 130b and the lower bearing layer 140b is usually 50 mm~1,000 mm, preferably 200 mm~500 mm.

The upflow reactor 1 comprises a dust removing device 60 therein, which is arranged at the top of the housing 20 and above the catalyst bed layer 30. In the case that an upper bearing layer 130b is arranged at the top of the catalyst bed layer 30, the dust removing device 60 is arranged above the upper bearing layer 130b.

The dust removing device 60 comprises a fourth slideway 670c and a dust removing unit, wherein the dust removing device 60 comprises a lower plate 610c, a middle plate 620c, an upper plate 630c and a filtering cylinder 660c, the lower plate 610c is fixed at the bottommost end of the fourth slideway 670c, and the middle plate 620c and the upper plate 630c are connected via several sets of axial ribs to form a robust cage-type frame structure. The interlayer between the lower plate 610c and the middle plate 620c is a dust collecting layer, and the interlayer between the middle plate 620c and the upper plate 630c is a dust filtering layer. The bottom end of the filtering cylinder 660c is fixed on the surface of the lower plate 610c, the filtering cylinder 660c extends upward through the dust collecting layer and the dust filtering layer, and the surface of the filtering cylinder 660c uniformly provided with pores as material flow channels.

The upper plate 630c and the middle plate 620c are movably overlapped on the fourth slideway 670c. The fourth slideway 670c is a steel structure fixed on the inner wall of the housing 20 in the axial position of the upflow reactor 1, the upper side of the fourth slideway 670c is a closure space of the upflow reactor 1, and the dust filtering layer in the dust removing device 60 can float up and down integrally on the fourth slideway 670c. The length of the fourth slideway 670c is 10 mm~800 mm, preferably 50 mm~300 mm. If the length is too small, dust will quickly accumulate owing to a small floating space, resulting in clogging, increased pressure drop, and shortened operation time.

The middle plate 620c and the upper plate 630c are respectively movably overlapped on the fourth slideway 670c in the form of a seal ring or seal strip, and the dust filtering layer floats up and down according to the pressure drop in the lower dust collecting layer. When the amount of dust accumulated in the dust collecting layer is large, the material flow space will be decreased and the pressure drop will increase, and the dust filtering layer will float upward integrally, so that the flux of the materials in the dust collecting layer will remain unchanged, thus stable pressure drop in the dust collecting layer is ensured.

The inert material filled in the dust filtering layer may be one or more of inert alumina ceramic balls, inert porous ceramic material and inert porous metal material, preferably is inert alumina ceramic balls, more preferably is inert alumina ceramic balls in $\varphi 3$ mm~$\varphi 30$ mm diameter. The inert porous metal material is formed by micro-spherical metal (commonly known as powder) sintered at a high temperature, with tiny pores distributed therein, and is an excellent fine filtering material. During use, the inert material in the dust filtering layer has an appropriate movement space in the interlayer, and the inert material can move relatively to prevent local clogging and uneven accumulation of catalyst dust. Usually, the filling porosity of the inert material is 0.5%~15%, preferably 3%~8%, wherein the porosity refers to the proportion of the void volume in the bulk volume of the bulk particles.

The shell of the filtering cylinder 660c is made of a stainless steel wire mesh or Johnson screen, and the filtering cylinder 660c is filled with a filling material for filtering fluid materials. The filling material is an inert porous material, such as one or more of inert ceramic balls, ceramic membrane, and metal sintered filtering element, etc., preferably is inert alumina ceramic balls, more preferably is $\varphi 3$~$\varphi 30$ inert alumina ceramic balls. The porosity of the filtering cylinder 660c is 10%~98%, preferably 50%~80%, and the pores of the filtering cylinder 660c are in a shape that is any of circular shape, strip shape, triangular shape and star shape. The filtering cylinder 660c is in a shape that is any of cylindrical shape, cubic shape, rhombic shape, cuboid shape, and polygonal shape, preferably in a cylindrical shape.

The dust filtering layer is filled with an inert material, which may be one or more of inert alumina ceramic balls, inert porous ceramic material and inert porous metal material, preferably is inert alumina ceramic balls, further preferably is inert alumina ceramic balls in $\varphi 3$ mm~$\varphi 30$ mm diameter. The filling porosity of the inert material is 0.5%~15%, preferably 3%~8%.

The dust collecting layer comprises liquid-solid separating units, and the bottom end of each liquid-solid separating unit is fixed on the lower plate 610c. The liquid-solid separating unit is an assembly with a liquid-solid separation function, and the structure of the assembly is of any one or a combination of deflecting plate type, baffle type, cyclone type, coalescing type, chimney type and rotary type. Under the action of the liquid-solid separating unit, the large-particle catalyst dust carried in the reaction materials is separated, and the separated large-particle dust deposit on the lower plate 610c under the action of gravity. The liquid-solid separating unit and the filtering cylinder 660c are preferably arranged alternately. The dust filtering layer is filled with an inert material, and the materials from the dust collecting layer enter through the lower part of the filtering cylinder 660c and flow out through the upper part of the filtering cylinder 660c, and enter the dust filtering layer, so that the small particles and tiny dust carried by the materials are intercepted; finally, the materials leave the dust removing device 60.

The upper plate 630c and the lower plate 610c may be in the same structural form or different structural forms, and may be formed by jointed parallel metal grating bars or a Johnson screen; in the case that parallel metal grating bars are employed, the width of the grating bars is usually 20~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material from leaking out and prevent the catalyst from leaking in, and usually is 1 mm~30 mm; in the case that a Johnson screen is employed, the spacing between the mesh wires is usually 1 mm~10 mm, so as to prevent the catalyst particles from being stuck among the mesh wires.

The middle plate 620c may be formed by jointed parallel metal grating bars or a Johnson screen. It is required that there is no gap between the metal grating bars or the mesh wires so as to intercept the materials, so that the liquid material separated by the liquid-solid separating unit is deflected laterally and enters into the filtering cylinder. Thus, on one hand, the dust can be prevented from being carried away owing to excessive flow velocity, the dust separation effect of the materials can be improved, and more large-size dust is deposited in the dust collecting layer; on the other hand, the materials repeatedly wash the surface of the filtering cylinder 660c during in the lateral deflection process, which is beneficial for preventing the surface of the filtering cylinder 660c from being clogged by the dust.

The main function of the dust collecting layer is to collect large-particle catalyst dust in the reaction materials on the top surface of the lower plate 610c; the main function of the dust filtering layer is to intercept and collect small-particle catalyst dust in the reaction materials in the filling material in the dust filtering layer.

The supporting plate 810 is formed by jointed parallel metal grating bars, and is used for supporting the weight of the upper catalyst bed layer 30. A protectant layer 830 is filled above the supporting plate 810 first, and the height ratio of the protectant layer 830 to the catalyst bed layer 30 is 1:1~1:50, preferably 1:2~1:5. To overcome the drawbacks in the prior art, the present invention provides an upflow reactor 1, which is provided with a lower elastomer bed layer 120b and an upper elastomer bed layer 110b therein, wherein the lower elastomer bed layer 120b and the upper elastomer bed layer 110b can be deformed synchronously with the expansion and contraction of the catalyst bed layer 30, thereby the increase of the pressure drop in the catalyst bed layer 30 resulted from abrasion of the particles in the floating process of the catalyst can be prevented. By providing the dust removing device 60, the catalyst dust can be uniformly intercepted and collected, and the increase of the pressure drop in the upflow reactor 1 can be further controlled to maintain long-time stable operation of the upflow reactor 1.

Compared with the prior art, the upflow reactor 1 provided by the present invention has the following advantages:
1. The lower elastic bed layer 120b and the upper elastic bed layer 110b can be deformed synchronously with the expansion and contraction of the catalyst bed layer 30, thus the increase of pressure drop in the bed layer resulted from abrasion of the particles in the floating process of the catalyst can be alleviated; the lower bearing layer 140b and the upper bearing layer 130b are used to support and press the lower elastic bed layer 120b and the upper elastic bed layer 110b, thus the deformation and displacement of the lower elastic bed layer 120b and the upper elastic bed layer 110b are confined in a certain space.
2. The dust removing device 60 comprises a dust collecting layer and a dust filtering layer, wherein the main function of the dust collecting layer is to collect large-particle catalyst dust in the reaction materials on the top surface of the lower plate 610c, and the main function of the dust filtering layer is to intercept and collect small-particle catalyst dust in the reaction materials in the filling material in the dust filtering layer, thus staged removing and collection of the catalyst dust is realized and local clogging of the catalyst dust is prevented.
3. The dust filtering layer floats up/down according to the pressure drop in the lower dust collecting layer. When the amount of dust accumulated in the dust collecting layer is large, the material flow space decreases and the pressure drop increases, and the dust filtering layer floats up integrally, so that the flux of the materials in the dust collecting layer remains unchanged, thus stable pressure drop in the dust collecting layer is ensured, thereby the pressure drop in the entire upflow reactor 1 is stable.
4. On one hand, the dust in the materials is removed by the liquid-solid separating units and deposit; on the other hand, the liquid material after the liquid-solid separation is laterally deflected and enters into the filtering cylinder 660c. When the flow direction of the materials is changed, the dust in the materials can be effectively prevented from being carried away owing to excessive flow velocity, and more large-size dust can deposit in the dust collecting layer. At the same time, the surface of the filtering cylinder 660c can be washed repeatedly by the lateral flow of the materials, which is beneficial for preventing the surface of the filtering cylinder 660c from being filled and clogged by the dust.

As shown in FIG. 11, hydrogen and raw oil are dissolved and mixed in a hydrogen-oil mixer 850 to form a gas-liquid mixture or a liquid-phase material in which hydrogen is dissolved, the mixture is introduced into the upflow reactor 1 through a reaction material inlet and passes through the supporting plate 810, the lower supporting layer 140b, the lower elastomer bed layer 120b, the catalyst bed layer 30, the upper elastomer bed layer 110b, the upper supporting layer 130b and the dust removing device 60 sequentially, then the materials leave the upflow reactor 1 as an effluent of the upflow hydrogenation reaction through the reaction material outlet.

In the normal material reaction process, owing to the particularity of the reaction process, the catalyst bed layer 30 is in an expanded state after the material feeding and floated up and down with the fluctuations of the material feeding. When the catalyst bed layer 30 expands and floats, the lower elastomer bed layer 120b and the upper elastomer bed layer 110b contract and deform; when the catalyst bed layer 30 contracts, the lower elastomer bed layer 120b and the upper elastomer bed layer 110b expand and deform, thus the volume of the catalyst bed layer 30 is limited. Thus, on one hand, abrasion of the catalyst particles after the increase of the volume of the catalyst bed layer 30 is prevented, which is beneficial for reducing dust; on the other hand, the pressure drop in catalyst bed layer 30 is controlled to be stable.

The material passing through the catalyst bed layer 30 enters into the dust removing device 60; specifically, the material enters into the dust collecting layer first, and then enters into the dust filtering layer. In the dust collecting layer 16, the materials are subjected to liquid-solid separation under the action of liquid-solid separating units arranged on the top surface of the lower plate 610c, the separated liquid enters into the dust filtering layer through the filtering cylinder 660c, and the separated large-particle catalyst dust is collected on the surface of the lower plate 610c. As the amount of dust increases, the dust filtering layer floats upward for stabilizing the pressure drop in the upflow reactor 1; after the small-particle catalyst dust in the materials entering into the dust filtering layer is intercepted and collected, the materials pass through the upper plate 630c and leave the dust filtering layer.

Embodiment 4

The upflow reactor 1 provided by the present invention is used; raw oil and hydrogen are mixed in a conventional static mixer (model SX2.3/20-6.4-450), and then the mixture is introduced as feed materials into the upflow reactor 1 (the diameter of the upflow reactor 1 is 100 mm). The upflow reactor 1 is filled with a supporting plate 810, a protectant layer 830 in 100 mm height, a lower bearing layer 140b in 60 mm height, a lower elastomer bed layer 120b in 50 mm height, a catalyst bed layer 30 in 550 mm height (a 12-mesh stainless steel mesh is laid above the catalyst bed layer 30) and an upper bearing layer 130b in 100 mm height sequentially in the material flow direction. The supporting plate 810 is formed by jointed parallel metal grating bars, and a 20-mesh screen is laid on the top surfaces of the grating bars; the lower bearing layer 140b is filled with φ2.0 mm inert ceramic balls, and has an integral frame structure made of a screen with 1 mm wire diameter on the periphery; the lower elastomer bed layer 120b is filled with spherical elastic particles made of silicone rubber. The upper bearing layer 130b is filled with φ3~6 mm inert ceramic balls. In the filling process, each bed layer is compacted and filled. The measurement results are shown in Table 3.

Embodiment 5

The upflow reactor 1 of the present invention is used, raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into the upflow reactor 1 in the present invention (the diameter of the upflow reactor 1 is 200 mm); the upflow reactor 1 is filled with a supporting plate 810, a protectant layer 830 in 50 mm height, a catalyst bed layer 30 in 600 mm height, an upper elastomer bed layer 110b in 30 mm height, an upper bearing layer 130b in 50 mm height, and a dust removing device 60 in 100 mm height sequentially in the material flow direction (the fixed height of the dust filtering layer is 50 mm, and the fixed interlayer is filled with φ13 mm alumina ceramic balls; the shell of the filtering cylinder 660c is made of a Johnson screen, and is filled with φ3~φ6 mm alumina ceramic balls; the fourth slideway 670c is in 130 mm total length; the supporting plate 810 is formed by jointed parallel metal grating bars, and a 20-mesh screen is laid on the top surfaces of the grating bars; the upper bearing layer 130b is filled with φ2.0 mm inert ceramic balls, and the periphery of the upper bearing layer 130b is formed by an integral frame structure made of a wire mesh with 1 mm wire diameter; the upper elastomer bed layer 110b is filled with spherical elastomer made of boron silicone rubber. In the dust removing device 60, the interlayer between the lower plate 610c and the middle plate 620c is a dust collecting layer, the interlayer between the middle plate 620c and the upper plate 630c is a dust filtering layer, and the bottom end of the filtering cylinder 660c is fixed on the surface of the lower plate 610c; the upper plate 630c and the lower plate 610c are in the same structure, and both of them are formed by jointed parallel metal grating bars, in 30 mm width, and the width of the slits between the grating bars is 2 mm; the middle plate 620c employs a Johnson screen with 1 mm mesh spacing; the liquid-solid separating unit is of baffle type, the bottom end of the liquid-solid separating unit is fixed on the lower plate 610c, and the liquid-solid separating unit and the filtering cylinder 660c are preferably arranged alternately; the filtering cylinder 660c penetrates through the dust collecting layer and the dust filtering layer, and the filtering cylinder 660c is in a cylindrical shape, and the surface of the filtering cylinder 660c is uniformly perforated at 75% porosity, and the pores are strip-shaped; the filtering cylinder 660c is made of a Johnson screen, and is filled with φ3~φ6 mm inert alumina ceramic balls. In the dust filtering layer, the void ratio of the inert alumina ceramic balls is 3.8%. In the filling process, each bed layer is compacted and filled. The measurement results are shown in Table 3.

Embodiment 6

The upflow reactor 1 provided by the present invention is used, raw oil and hydrogen are mixed in a conventional static mixer (model SX2.3/20-6.4-450), and then the mixture is introduced as feed materials into the upflow reactor 1 in the present invention (the diameter of the upflow reactor 1 is 200 mm); the upflow reactor 1 is filled with a supporting plate 810, a lower bearing layer 140b, a lower elastomer bed layer 120b, a catalyst bed layer 30, an upper elastomer bed layer 110b, an upper bearing layer 130b, and a dust removing device 60 sequentially in the material flow direction (the fixed height of the dust filtering layer is 75 mm, and the fixed interlayer is filled with φ13 mm alumina ceramic balls; the shell of the filtering cylinder 660c is made of a Johnson screen, and is filled with φ3~φ6 mm alumina ceramic balls); the fourth slideway 670c is in 180 mm total length; the supporting plate 810 is formed by jointed parallel metal grating bars, and a 20-mesh screen is laid on the top surfaces of the grating bars; the lower bearing layer 140b is filled with φ2.0 mm inert ceramic balls, and has an integral frame structure made of a screen with 1 mm wire diameter on the periphery; the upper bearing layer 130b is identical to the lower bearing layer 140b; the lower elastomer bed layer 120b is filled with strip-shaped elastomer made of silicone rubber, and is identical to the upper elastomer bed layer 110b; in the dust removing device 60, the interlayer between the lower plate 610c and the middle plate 620c is a dust collecting layer, the interlayer between the middle plate 620c and the upper plate 630c is a dust filtering layer, and the bottom end of the filtering cylinder 660c is fixed on the surface of the lower plate 610c. the upper plate 630c and the lower plate 610c are in the same structure, and both of them are formed by jointed parallel metal grating bars, in 30 mm width, and the width of the slits between the grating bars is 2 mm; the middle plate 620c employs a Johnson screen with 1 mm mesh spacing; the bottom end of the liquid-solid separating unit is fixed on the lower plate 610c, and the liquid-solid separating unit and the filtering cylinder 660c are preferably arranged alternately; the liquid-solid separating unit is of baffle type; the filtering cylinder 660c is in a cylindrical shape, the surface of the filtering cylinder 660c is uniformly provided with pores at 60% porosity, and the pores is circular pores. The shell of the filtering cylinder 660c is made of a Johnson screen, and the filtering cylinder 660c is filled with φ3~φ6 inert alumina ceramic balls; the void ratio of the inert alumina ceramic balls in the dust filtering layer is 6.3%; each bed layer is compacted and filled in the filling process. The measurement results are shown in Table 3.

Comparative Example 3

Compared with the embodiment 4, the difference lies in that the reactor is not provided with the lower bearing layer 140b and the lower elastomer bed layer 120b, but only one ceramic ball layer is respectively arranged on the upper part and lower part of the catalyst instead.

Raw oil and hydrogen are mixed in a conventional static mixer (model SX2.3/25-6.4-500), and then the mixture is introduced as feed materials into a conventional upflow reactor (the diameter of the reactor is 100 mm); the reactor is filled with a catalyst support grating, a protectant layer in 120 mm height, a φ13 mm alumina ceramic ball layer in 80 mm height, a catalyst bed layer in 550 mm height, and a φ13 mm alumina ceramic ball layer in 60 mm height sequentially in the material flow direction; in the filling process, each bed layer is compacted and filled; wherein a 12-mesh stainless steel wire mesh is filled between the protectant layer and the catalyst bed layer, and a 12-mesh stainless steel wire mesh is also filled between the catalyst bed layer and the φ13 mm alumina porcelain ball layer, to prevent loss of the catalyst. The measurement results are shown in Table 3.

Comparative Example 4

Compared with the embodiment 4, the difference lies in that the reactor is not provided with the lower bearing layer 140b and the lower elastomer bed layer 120b, but only one ceramic ball layer is arranged on the lower part of the catalyst and two ceramic ball layers are arranged on the upper part of the catalyst instead.

Raw oil and hydrogen are mixed in a conventional static mixer (model SX2.3/25-6.4-450), and then the mixture is introduced as feed materials into a conventional upflow reactor; the diameter of the reactor is 200 mm; the reactor is filled with a catalyst support grating, a protectant layer in 100 mm height, a φ13 mm alumina ceramic ball layer in 80 mm height, a catalyst bed layer in 500 mm height, a φ3~φ6 mm alumina ceramic ball layer in 120 mm height, and a φ13 mm alumina ceramic ball layer in 120 mm height sequentially in the material flow direction; in the filling process, each bed layer is compacted and filled; wherein no stainless steel wire mesh is filled between the bed layers. The measurement results are shown in Table 3.

TABLE 3

| | Measurement Results | | | | |
|---|---|---|---|---|---|
| | Embodiment 4 | Embodiment 5 | Embodiment 6 | Comparative example 3 | Comparative example 4 |
| Apparent liquid flow velocity, m/s | 0.0203 0.0209 0.0217 | 0.0257 0.0245 0.0232 | 0.0198 0.0202 0.0208 | 0.0165 0.0158 0.0161 | 0.0195 0.0186 0.0193 |
| Average, m/s | 0.0210 | 0.0245 | 0.0203 | 0.0161 | 0.0191 |
| Operation time, min. | 17956 | 18750 | 22274 | 5200 | 5542 |
| Pressure drop in reactor, ΔP | 9.37 | 7.45 | 5.98 | 22.40 | 20.20 |
| Amount of dust collected by dust collecting layer, g | — | 0.052 | 0.066 | — | — |
| Amount of dust collected by dust filtering layer, g | — | 0.017 | 0.021 | — | — |

It can be seen from the increase rate of the pressure drop in the reactor in the embodiments 4-6 and comparative examples 3 and 4: utilizing the upflow reactor 1 in the present invention, the increase rate of the pressure drop in the reactor is low, which is to say, the increase rate of the pressure drop in the reactor is effectively controlled, thereby the operation time of the device is greatly prolonged. The result indicates that the lower elastomer bed layer 120b and/or the upper elastomer bed layer 110b can be deformed synchronously with the expansion and contraction of the catalyst bed layer 30, so that the increase of the bed layer pressure drop resulted from abrasion of the particles in the floating process of the catalyst is prevented on one hand; with the dust removing device 60 arranged on the upper part of the upflow reactor 1, uniform interception and collection of the catalyst dust is realized, and the increase of the pressure drop in the reactor is further controlled, and long-time stable operation of the upflow reactor is maintained on the other hand.

As shown in FIGS. 12-15, the upflow reactor 1 comprises a housing 20, in which a sliding support 410, a catalyst bed layer 30 and a pressing device 10 are arranged in the material flow direction. The bottom of the housing 20 is provided with a reaction material inlet 220, and the top of the housing 20 is provided with a reaction material outlet 230.

The sliding support 410 comprises a first slideway 411, a first grating plate 412 and a sealing member, wherein the first slideway 411 is fixed on the inner surface of the upflow reactor 1 in the axial position of the upflow reactor 1, and the first grating plate 412 is movably overlapped on the first slideway 411 and sealed with the first slideway 411 by the sealing member; one end of the sealing member is fixed on the rim of the first grating plate 412, and the other end of the sealing member is movably overlapped on the surface of the first slideway 411.

The pressing device 10 comprises a third slideway 173, a floatable layer and a sealing member, wherein the floatable layer floats integrally on the third slideway 173; the floatable layer comprises an upper pressing plate 110a, a lower pressing plate 120a, a fixed interlayer between the upper pressing plate 110a and the lower pressing plate 120a, and the upper pressing plate 110a and the lower pressing plate 120a are fixedly connected by several sets of axial ribs to form a cage-type frame structure; one end of the sealing member is fixed on the rim of the floatable pressing layer, and the other end of the sealing member is movably overlapped on the surface of the third slideway 173.

The length of the third slideway 173 is 10 mm~800 mm, preferably 50 mm~300 mm. If the length of the third slideway 173 is too small, the catalyst particles may be jammed owing to the small floating space, which results in a shortened operation period; if the length of the third slideway 173 is too long, the floating space of the catalyst will be enlarged, which causes serious abrasion of the catalyst, consequently leads to problems such as excessive catalyst dust and falling of the active metal components of the catalyst.

N catalyst bed layers 30 are provided, namely the first catalyst bed layer 30, the second catalyst bed layer 30, . . . , the $(N-1)^{th}$ catalyst bed layer 30, and the $N^{th}$ catalyst bed layer 30 ($N \geq 1$); N pressing devices 10 are provided, namely the first pressing device 10, the second pressing device 10, . . . , the $(N-1)^{th}$ pressing device 10, and the $N^{th}$ pressing device 10 ($N \geq 1$). The quantity of the catalyst bed layers 30 is equal to that of the pressing devices 10, and the catalyst bed layers 30 and the pressing devices 10 are alternately arranged, including the first catalyst bed layer 30, the first pressing device 10, the second catalyst bed layer 30, the second pressing device 10, . . . , the $(N-1)^{th}$ catalyst bed layer 30, the $(N-1)^{th}$ pressing device 10, the $N^{th}$ catalyst bed layer 30 and the $N^{th}$ pressing device 10 arranged sequentially in the material flow direction.

The catalyst bed layers 30 are in height incremented sequentially in the material feeding direction of the reactor, i.e., from the first catalyst bed layer 30, the second catalyst bed layer 30, . . . , the $(N-1)^{th}$ catalyst bed layer 30 to the $N^{th}$ catalyst bed layer 30. the pressing devices 10 are in height decremented sequentially in the material feeding direction of the reactor, i.e., from the first pressing device 10, the second pressing device 10, . . . , the $(N-1)^{th}$ pressing device 10 to the $N^{th}$ pressing device 10. The height of each catalyst bed layer 30 is usually 30 mm~5,000 mm, preferably 300 mm~2,000 mm.

The first grating plate 412 is formed by parallel metal grating bars or a Johnson screen. The upper pressing plate 110a and the lower pressing plate 120a are in the same structural form or different structural forms, and employ parallel metal grating bars or Johnson screen. In the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material and the catalyst from leaking out, and usually is 1 mm~30 mm; in the case that a Johnson screen is employed, the spacing between the mesh wires is usually 1 mm~10 mm, so as to prevent the catalyst particles from being stuck among the mesh wires.

The fixed interlayer is filled with an inert filling material, which is one or more of inert alumina ceramic balls, porous ceramic material, and porous metal material. In use, the inert filling material has an appropriate movement space in the fixed interlayer and can move relatively to prevent adhesion and accumulation of the catalyst dust. In the case that the fixed interlayer is filled with inert alumina ceramic balls, the diameter of the inert alumina ceramic balls usually is 3 mm~30 mm.

A dust removing device 60 is arranged above the topmost pressing device 10, and certain space is reserved between the topmost pressing device 10 and the dust removing device 60 for the topmost pressing device 10 to float up and down.

The dust removing device 60 comprises a top plate 640b, a dust deposition plate 610b, and several groups of liquid-solid separating assemblies arranged between the top plate 640b and the dust deposition plate 610b and uniformly arranged on the dust deposition plate 610b; the liquid-solid separating assembly comprises an outer cylinder 650b, a separating cylinder 620b and a separating cap 630b, wherein the separating cylinder 620b is fixed on the dust deposition plate 610b, the separating cap 630b is located above the separating cylinder 620b, and the separating cap 630b and the separating cylinder 620b are connected by a connecting plate 660b; the lower part of the outer cylinder 650b is fixed on the dust deposition plate 610b, the upper part of the outer cylinder 650b is fixed on the top plate 640b, and the separating cap 630b is movably overlapped on the slideway surface.

The materials enter into the separating cylinder 620b from the bottom of the separating cylinder 620b, and are deflected by the separating cap 630b, and the dust particles entrained in the materials deposit on the dust deposition plate 610b under the action of gravity, so that deposition of the dust in the materials is realized. As the amount of the dust depositing on the dust deposition plate 610b gradually increases, the separating cap 630b can float upward along the outer cylinder 650b, thereby maintains the material circulation space and the liquid-solid deposition effect. The materials enter into the separating cylinder 620b from the bottom of the separating cylinder 620b, and are deflected by the separating cap 630b, and the dust particles entrained in the materials deposit on the dust deposition plate 610b under the action of gravity, so that deposition of the dust in the materials is realized.

The separating cylinder 620b is in a shape that is any of cylindrical shape, cubic shape, rhombic shape, cuboid shape, and polygonal shape, preferably in a cylindrical shape; the unit height of the liquid-solid separating assembly is 10~1,000 mm, preferably 50~200 mm.

To overcome the drawbacks in the prior art, the present invention provides an upflow reactor 1, in which a pressing device 10 and a dust removing device 60 are arranged. The upflow reactor 1 in the present invention can minimize the abrasion among the catalyst particles during movement, prolong the service life of the catalyst, realize axial homogenization of catalyst dust along the upflow reactor 1, greatly alleviate the increase of pressure drop in the catalyst bed layer 30, and maintain long-time stable operation of the upflow reactor 1.

In the upflow reactor 1 in the present invention, the pressing device 10 floats up and down with the expansion/contraction of the catalyst bed layer 30 during the operation, and its position is mainly related with the buoyancy of the catalyst bed layer 30; when the buoyancy of the catalyst bed layer 30 is small, the pressing device 10 is located close to the bottom of the upflow reactor 1; and when the buoyancy of the catalyst bed layer 30 is great, the pressing device 10 is located close to the top of the upflow reactor 1. By configuring the pressing device 10 to float up and down with the catalyst bed layer 30, the abrasion of the catalyst particles is reduced and the pressure drop in the catalyst bed layer 30 is stable.

Compared with the prior art, the upflow reactor 1 provided by the present invention has the following advantages:

1. Compared with traditional upflow reactors, the upflow reactor 1 is provided with a pressing device 10. In the upflow reactor 1, on one hand, abrasion and powdering of the catalyst particles resulted from settlement of the catalyst after liquid feeding into the upflow reactor 1 can be prevented so as to protect the catalyst and reduces dust; on the other hand, as the pressure drop in the catalyst bed layer 30 gradually increases, the pressing device 10 can float upward to ensure long-time operation of the reactor.
2. By providing multiple groups of catalyst bed layers 30 in height incremented in the material feeding direction of the reactor and multiple groups of pressing devices 10 in height decremented in the material feeding direction of the reactor, the pressure drop in the catalyst bed layers 30 can be controlled in sections, so as to realize homogenized distribution of the catalyst dust in the axial direction of the reactor and alleviate the increase of pressure drop.
3. A dust removing device 60 is arranged above the $N^{th}$ pressing device 10. Owing to the buoyancy and production fluctuations during the use of the catalyst, it is inevitable that some dust will be generated as a result of collision and wear among the particles. With the dust removing device 60, the catalyst dust passing through the pressing device 10 can be filtered off to prevent the dust from entering into other parts (e.g., the top outlet pipe) and clogging.
4. The frame composed of the upper pressing plate 110a and the lower pressing plate 120a in the pressing device 10 is an integral fixed structure, which floats up and down integrally when floating in the upflow reactor 1. However, the inert ceramic balls or inert filling material filled in the middle interlayer has an appropriate movement space, and the ceramic balls can move relatively, so as to prevent adhesion and accumulation of the catalyst dust.
5. The dust removing device 60 is provided with a floating separating cap 630b, which can be adjusted according to the amount of the dust in the materials to effectively intercept the catalyst dust and keep stable pressure drop in the dust removing device 60.

As shown in FIG. 15, the specific reaction process will be explained in an example of liquid-phase hydrogenation process of an oil product: hydrogen and raw oil are dissolved and mixed in the hydrogen-oil mixer 850 to form a gas-liquid mixture or a liquid phase material in which hydrogen is dissolved; the mixture is introduced as feed materials for upflow hydrogenation reaction into the upflow reactor 1 through the reaction material inlet, and then passes through the sliding support 410, the first catalyst bed layer 30, the first pressing device 10, the second catalyst bed layer 30, the second pressing device 10, to the $N^{th}$ catalyst bed layer 30, the $N^{th}$ pressing device 10 and the dust removing device 60 sequentially; then the materials leave the upflow reactor 1 as an effluent of the upflow hydrogenation reaction through the reaction material outlet.

During normal operation, owing to the particularity of the reaction process, under the action of buoyancy, the catalyst bed layers 30 (including the first catalyst bed layer 30, the second catalyst bed layer 30, ..., and the $N^{th}$ catalyst bed layer 30) are in an expanded state after material feeding, and float up and down with the fluctuations of material feeding, while the pressing devices 10 (including the first pressing device 10, the second pressing device 10, ..., and the $N^{th}$ pressing device 10) float up and down with the expansion/contraction of the catalyst bed layers 30, so as to reduce abrasion of the catalyst particles and reduce catalyst dust; the materials passing through the $N^{th}$ pressing device 10 enters into the dust removing device 60, and the dust entrained in the materials is filtered off, intercepted and collected in sections.

Embodiment 7

The upflow reactor 1 in the present invention is employed. Raw oil and hydrogen are mixed in a conventional static mixer (model SV2.3/25-6.4-500), and then the mixture is introduced as feed materials into the upflow reactor 1 (the diameter of the upflow reactor 1 is 100 mm), which is filled with a sliding support 410, a first catalyst bed layer 30 in 300 mm height, a first pressing device 10 in 100 mm height, a second catalyst bed layer 30 in 500 mm height, and a second pressing device 10 in 80 mm height sequentially in the material flow direction; the length of the first slideway 411 is 60 mm; in the first pressing device 10, the upper pressing plate 110a and the lower pressing plate 120a are in the same structural form, and both of them employ parallel metal grating bars, the width of the grating bars usually is 40 mm, and the width of the gaps between the grating bars is 2 mm; the fixed interlayer is filled with φ3~φ6 inert alumina ceramic balls; the second pressing device 10 is identical to the first pressing device 10; in the filling process, each bed layer is compacted and filled; wherein no stainless steel wire mesh is filled between the bed layers. The measurement results are shown in Table 4.

Embodiment 8

The upflow reactor 1 of the present invention is used, raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into the upflow reactor 1 (the diameter of the upflow reactor 1 is 150 mm); the reactor is filled with a sliding support 410, a first catalyst bed layer 30 in 400 mm height, a first pressing device 10 in 100 mm height, a second catalyst bed layer 30 in 600 mm height, a second pressing device 10 in 80 mm height and a dust removing member 60 in 120 mm height sequentially in the material flow direction; the length of the first slideway 411 is 80 mm; in the first pressing device 10, the upper pressing plate 110a and the lower pressing plate 120a are in the same structural form, and both of them employ parallel metal grating bars, the width of the grating bars is 40 mm, and the width of the gaps between the grating bars is 2 mm; the fixed interlayer is filled with φ3~φ6 inert alumina ceramic balls; the second pressing device 10 is identical to the first pressing device 10; the separating cylinder 620b in the liquid-solid separating assembly is in a cylindrical shape and the unit height is 50 mm. In the filling process, each bed layer is compacted and filled; wherein no stainless steel wire mesh is filled between the bed layers. The measurement results are shown in Table 4.

Embodiment 9

The upflow reactor 1 provided by the present invention is used, raw oil and hydrogen are mixed in a conventional static mixer (model SV2.3/25-6.4-500), and then the mixture is introduced as feed materials into the upflow reactor 1 (the diameter of the upflow reactor 1 is DN300×1070 mm); the upflow reactor 1 is filled with a sliding support 410, a first catalyst bed layer 30 in 400 mm height, a first pressing device 10 in 120 mm height, a second catalyst bed layer 30 in 600 mm height, a second pressing device 10 in 100 mm height and a dust removing member 60 in 150 mm height sequentially in the material flow direction; the length of the first slideway 411 is 80 mm; in the first pressing device 10, the upper pressing plate 110a and the lower pressing plate 120a are in the same structural form, and both of them employ parallel metal grating bars, the width of the grating bars usually is 40 mm, and the width of the gaps between the grating bars is 2 mm; the fixed interlayer is filled with φ3~φ6 inert alumina ceramic balls; the second pressing device 10 is identical to the first pressing device 10, and the separating cylinder 620b in the liquid-solid separating assembly is in a cylindrical shape and the unit height is 70 mm; in the filling process, each bed layer is compacted and filled; wherein no stainless steel wire mesh is filled between the bed layers. The measurement results are shown in Table 4.

Comparative Example 5

Compared with the embodiment 7, the difference lies in that there is no floating support grating, pressing device an catalyst dust deposition layer in the reactor, but a conventional catalyst filling method is employed; however, the catalyst bed layer is divided into two layers, each of which is fixed by a fixing grating, and ceramic ball layers are filled above and below the catalyst respectively.

Raw oil and hydrogen are mixed in a conventional static mixer (model SV2.3/25-6.4-500), and then the mixture is introduced as feed materials into a conventional upflow reactor; the diameter of the reactor is 150 mm; the reactor is filled with a catalyst support grating, a φ13 mm alumina ceramic ball layer in 60 mm height, a φ3~φ6 mm alumina ceramic ball layer in 60 mm height, a catalyst bed layer in 300 mm height, a φ3~φ6 mm alumina ceramic ball layer in 60 mm height, a φ13 mm alumina ceramic ball layer in 60 mm height, a catalyst support grating, a φ13 mm alumina ceramic ball layer in 60 mm height, a φ3~φ6 mm alumina ceramic ball layer in 60 mm height, a catalyst bed layer in 300 mm height, a φ3~φ6 mm alumina ceramic ball layer in 60 mm height, a φ13 mm alumina ceramic ball layer in 60 mm height, and a catalyst press cover grating sequentially in the material flow direction; in the filling process, each bed layer is compacted and filled; wherein no stainless steel wire mesh is filled between the bed layers. The measurement results are shown in Table 4.

It can be seen from the increase rate of the pressure drop in the reactor in embodiments 7-9 and comparative example 5: utilizing the upflow reactor 1 in the present invention, the increase rate of the pressure drop in the reactor is low and the operation time of the device is greatly prolonged, which indicates that the present invention can effectively prevent abrasion and powdering of the catalyst particles during movement resulted from catalyst sinking after liquid feeding, protect the catalyst and reduce catalyst dust; in addition, by arranging pressing devices 10 between the catalyst bed layers, the catalyst bed layers 30 are fixed in sections and the pressure drop is controlled in sections; thus homogenized distribution of the catalyst dust in the axial direction of the upflow reactor 1 is realized, and the increase of pressure drop is alleviated, and long-time operation of the upflow reactor 1 is ensured.

As shown in FIGS. 16-18, the upflow reactor 1 comprises a housing 20, in which a supporting plate 810, a catalyst bed layer 30 and a pressing device 10 are arranged in the material flow direction; the bottom of the housing 20 is provided with a reaction material inlet 220, and the top of the housing 20 is provided with a reaction material outlet 230.

The pressing device 10 comprises a floating grating interlayer, a separating unit and a third slideway 173, wherein the floating grating interlayer is movably connected on the third slideway 173, the third slideway 173 is fixed on the inner surface of the upflow reactor 1 in the axial position of the upflow reactor 1, and the lower edge of the third slideway 173 is adjacent to the catalyst bed layer 30. The length of the third slideway 173 is usually 10 mm~800 mm, preferably 50 mm~300 mm. If the length is too small, the slideway may be clogged easily owing to the small floating space of the catalyst particles, resulting in a shortened operation period; if the length is too great, the floating space of the catalyst will be so large that the catalyst will be abraded seriously, causing problems such as excessive catalyst dust.

The floating grating interlayer comprises an upper pressing plate 110a, a lower pressing plate 120a, and a fixed interlayer between the upper pressing plate 110a and the lower pressing plate 120a, wherein the upper pressing plate 110a and the lower pressing plate 120a are fixedly connected by several sets of axial ribs to form a cage-type frame structure, and a plurality of second dust removing pieces 150 are arranged in the interlayer, with a space reserved between adjacent second dust removing pieces 150 as a first material circulation cavity 152; the surface of the lower pressing plate 120a at a position corresponding to the first material circulation cavity 152 is hermetic; further preferably, the

TABLE 4

| Measurement Results | | | | |
|---|---|---|---|---|
| | Embodiment 7 | Embodiment 8 | Embodiment 9 | Comparative example 5 |
| Apparent liquid flow velocity, m/s | 0.0194 | 0.0234 | 0.0186 | 0.0132 |
| | 0.0201 | 0.0222 | 0.0192 | 0.0129 |
| | 0.0198 | 0.0218 | 0.0188 | 0.0128 |
| Average, m/s | 0.0198 | 0.0225 | 0.0189 | 0.0130 |
| Operation time, min. | 16760 | 18865 | 25542 | 9550 |
| Pressure drop in reactor, ΔP | 8.43 | 8.32 | 7.98 | 17.857 |
| Amount of dust deposited in catalyst dust deposition layer, g | — | 0.075 | 0.052 | — | surface of the upper pressing plate 110a at a position corresponding to the second dust removing member 150 is hermetic.

The separating unit is fixed on the upper part of the upper pressing plate 110a, and is used for performing liquid-solid separation of the reaction materials from the first material circulation cavity 152; the separating unit comprises a first separating member 180 and a second separating member 190, wherein the first separating member 180 comprises a first supporting member 182 and a first oblique plate 181 recessed upward, the second separating member 190 comprises a second supporting member 192 and a second oblique plate 191 recessed downward, the first supporting member 182 and the second supporting member 192 are fixed on the upper pressing plate 110a, the first oblique plate 181 is fixed on the first supporting member 182, and the second oblique plate 191 is fixed on the second supporting member 192.

The first oblique plate 181 of the first separating member 180 is at a position lower than the position of the second oblique plate 191 of the second separator 190, so that the first oblique plate 181 recessed upward in the first separating member 180 and the second oblique plate 191 recessed downward in the second separating member 190 form a material channel 183. The material is laterally deflected in the process of flowing through the second dust removing member 150, which is to say, the materials from the lower catalyst bed layer 30 enter into the second dust removing member 150 through the lower pressing plate 120a, the dust in the materials is removed and collected by the second dust removing member 150, and then the materials are laterally deflected into the first material circulation cavity 152 and then enter into the separating unit. When the materials passes through the material channel 183 from bottom to top, liquid-solid separation happens, and the catalyst dust entrained in the materials is separated and deposit on the first oblique plate 181 recessed upward in the first separating member 180.

N catalyst bed layers 30 are provided, namely the first catalyst bed layer 30, the second catalyst bed layer 30, . . . , the $(N-1)^{th}$ catalyst bed layer 30, and the $N^{th}$ catalyst bed layer 30 (N≥1); N pressing devices 10 are provided, namely the first pressing device 10, the second pressing device 10, . . . , the $(N-1)^{th}$ pressing device 10, and the $N^{th}$ pressing device 10(N≥1). The quantity of the catalyst bed layers 30 is equal to that of the pressing devices 10, and the catalyst bed layers 30 and the pressing devices 10 are alternately arranged, including the first catalyst bed layer 30, the first pressing device 10, the second catalyst bed layer 30, the second pressing device 10, . . . , the $(N-1)^{th}$ catalyst bed layer 30, the $(N-1)^{th}$ pressing device 10, the $N^{th}$ catalyst bed layer 30 and the $N^{th}$ pressing device 10 arranged sequentially in the material flow direction.

The catalyst bed layers 30 are in height incremented sequentially in the material feeding direction of the reactor, i.e., from the first catalyst bed layer 30, the second catalyst bed layer 30, . . . , the $(N-1)^{th}$ catalyst bed layer 30 to the $N^{th}$ catalyst bed layer 30. the pressing devices 10 are in height decremented sequentially in the material feeding direction of the reactor, i.e., from the first pressing device 10, the second pressing device 10, . . . , the $(N-1)^{th}$ pressing device 10 to the $N^{th}$ pressing device 10. The height of each catalyst bed layer 30 is usually 30 mm~5,000 mm, preferably 300 mm~2,000 mm.

The catalyst bed layers 30 are in height incremented sequentially in the material feeding direction of upflow reactor 1, mainly because that the impact force of the reaction materials on the catalyst bed layers and the buoyancy of the catalyst decrease gradually in the material feeding direction of the upflow reactor 1. Thus, the abrasion of the catalyst bed layers 30 is decremented in the material feeding direction. Therefore, the application result can be ensured by increasing the height of each catalyst bed layer 30 appropriately; likewise, the pressing devices 10 are in height decremented sequentially in the material feeding direction of the reactor in an opposite trend to the height of the catalyst bed layers 30, because that the impact force of the reaction materials on the catalyst bed layers and the buoyancy of the catalyst decrease gradually in the material feeding direction of the upflow reactor 1. The decremented height of the pressing devices 10 attains an effect of balancing the buoyancy of the catalyst and fixing the catalyst bed layers 30.

The supporting plate 810 is of a slat type for supporting the weight of the catalyst bed layer 30 on it. The upper pressing plate 110a and the lower pressing plate 120a are in the same structural form or different structural forms, and employ parallel metal grating bars or Johnson screen. In the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material and the catalyst from leaking out, and usually is 1 m~30 mm; in the case that a Johnson screen is employed, the spacing between the mesh wires is usually 1 mm~10 mm, so as to prevent the catalyst particles from being stuck among the mesh wires.

A protectant layer 830 and/or a ceramic ball layer 840 is arranged between the supporting plate 810 and the catalyst bed layer 30. In a case that both the protectant layer 830 and the ceramic ball layer 840 are provided, the ceramic ball layer 840 is located above the protectant layer 830. The height ratio of the protectant layer 830 to the catalyst bed layer 30 is 1:1~1:50, preferably 1:2~1:5. The ceramic ball layer 840 is filled with inert ceramic balls, and the height of the ceramic ball layer 840 is 50 mm~500 mm, preferably 100 mm~300 mm; a wire mesh, preferably a stainless steel wire mesh, is further laid above the ceramic ball layer 840.

The surface of the second dust removing member 150 is wrapped with a stainless steel wire mesh or Johnson screen, and the second dust removing member 150 is filled with an inert filling material, which is one or more of inert alumina ceramic balls, porous ceramic particles and porous metal material.

In use, the inert filling material has an appropriate movement space in the second dust removing member 150 and can move relatively to prevent adhesion and accumulation of the catalyst dust. In the case that the second dust removing member 150 is filled with inert alumina ceramic balls, the diameter of the inert alumina ceramic balls usually is 3 mm~30 mm. Usually, the height of the second dust removing member 150 is generally 10 mm~3,000 mm, preferably 50 mm~300 mm.

To overcome the drawbacks in the prior art, the present invention provides an upflow reactor 1, in which a pressing device 10 is arranged, so as to effectively reduce abrasion of the catalyst particles during movement, prolong the service life of the catalyst, continuously remove the catalyst dust in the reaction process, improve the reaction uniformity, greatly alleviate the increase of pressure drop in the catalyst bed layer 30, and maintain stable long-time operation of the upflow reactor 1.

During normal operation, owing to the particularity of the reaction process, under the action of buoyancy, the catalyst bed layers 30 are in an expanded state after material feeding, and float up and down with the fluctuations of material feeding, thus wearing of the catalyst happens. The pressing device 10 can not only float up and down with the expansion/contraction of the catalyst bed layer 30 so as to reduce abrasion of the catalyst particles and catalyst dust, but also intercept and deposit the dust produced by catalyst wearing at the lower part.

Compared with the prior art, the upflow reactor 1 provided by the present invention has the following advantages:
1. Compared with traditional upflow reactors, the upflow reactor 1 in the present invention is provided with a pressing device 10. In the upflow reactor 1, on one hand, abrasion and powdering of the catalyst particles resulted from settlement of the catalyst after liquid feeding into the upflow reactor 1 can be prevented so as to protect the catalyst and reduces dust; on the other hand, as the pressure drop in the catalyst bed layer 30 gradually increases, the pressing device 10 can float upward to ensure long-time operation of the upflow reactor 1.
2. The upflow reactor of the present invention is provided with several groups of catalyst bed layers 30 and pressing devices 10, the catalyst bed layers 30 are in height incremented sequentially in the material feeding direction of the upflow reactor 1, and the pressing devices 10 are in height decremented sequentially in the material feeding direction of the upflow reactor 1. By means of such an arrangement, the pressure drop in the catalyst bed layers 30 can be controlled in sections, so that the distribution of the catalyst dust is homogenized in the axial direction of the upflow reactor 1 and the increase of pressure drop is alleviated. Since the impact force of the reaction materials on the catalyst bed layer 30 and the buoyancy of the catalyst decrease gradually in the material feeding direction of the upflow reactor 1, the abrasion of the catalyst bed layers 30 tends to decrease. Therefore, the application result can be ensured by appropriately increasing the height of each catalyst bed layer 30.
3. In the upflow reactor 1 in the present invention, the frame composed of the upper pressing plate 110a and the lower pressing plate 120a in the pressing device 10 is an integral fixed structure, which floats up and down integrally in the upflow reactor 1. However, the inert filling material filled in the second dust removing member 150 has an appropriate movement space, and the filling material (e.g., ceramic balls) can move relatively, thus adhesion and accumulation of the catalyst dust can be prevented, thereby uniform and stable pressure drop in the entire catalyst bed layer 30 can be ensured.
4. The upflow reactor 1 in the present invention is provided with several layers of pressing devices 10, and each layer of pressing device 10 has the function of removing the catalyst dust and depositing the dust, so as to realize homogenized distribution of catalyst dust in the reaction process, thereby achieves uniform pressure drop in the catalyst bed layers 30.

Embodiment 10

The upflow reactor 1 in the present invention is employed. Raw oil and hydrogen are mixed in a conventional static mixer (model SX2.3/20-6.4-500), and then the mixture is introduced as feed materials into the upflow reactor 1 in the present invention (the diameter of the upflow reactor 1 is 100 mm), which is filled with a supporting plate 810, a protectant layer 830 in 100 mm height, a first catalyst bed layer 30 in 550 mm height, and a first pressing device 10 in 200 mm height sequentially in the material flow direction; the supporting plate 810 is of a slat type, with a 10-mesh screen laid on the top surface of the supporting plate 810. The first pressing device 10 comprises a floating grating interlayer, a separating unit and a third slideway 173, wherein the floating grating interlayer is movably connected on the third slideway 173, and the length of the third slideway 173 is 200 mm; the grating interlayer comprises an upper pressing plate 110a, a lower pressing plate 120a, and a fixed interlayer between the upper pressing plate 110a and the lower pressing plate 120a; a second dust removing member 150 is provided in the fixed interlayer, and a space is reserved between adjacent second dust removing members 150 as a first material circulation cavity 152; the surface of the lower pressing plate 120a at a position corresponding to the first material circulation cavity 152 is hermetic, the surface of the upper pressing plate 110a at a position corresponding to the second dust removing member 150 is hermetic, and the height of the second dust removing member 150 is 80 mm; the upper pressing plate 110a and the lower pressing plate 120a are in the same structural form, and both of they are formed by jointed parallel metal grating bars in 40 mm width, and the width of the slits between the metal grating bars is 2 mm; the surface of the second dust removing member 150 is wrapped with a Johnson screen, and the second dust removing member 150 is filled with φ3~φ6 inert alumina ceramic balls. In the filling process, each bed layer is compacted and filled. The measurement results are shown in Table 5.

Embodiment 11

The upflow reactor 1 of the present invention is used, raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into the upflow reactor 1 in the present invention (the diameter of the upflow reactor 1 is DN200 mm); the upflow reactor 1 is filled with a supporting plate 810, a protectant layer 830 in 100 mm height, a first catalyst bed layer 30 in 300 mm height, a pressing device 10 in 120 mm height, a second catalyst bed layer 30 in 400 mm height, and a pressing device 10 in 80 mm height sequentially in the material flow direction; the supporting plate 810 is of a slat type, with a 10-mesh screen laid on the top surface of the supporting plate 810. The first pressing device 10 in 120 mm height comprises a floating grating interlayer, a separating unit and a third slideway 173, wherein the floating grating interlayer is movably connected on the third slideway 173, and the length of the third slideway 173 is 120 mm; the grating interlayer comprises an upper pressing plate 110a, a lower pressing plate 120a, and a fixed interlayer between the upper pressing plate 110a and the lower pressing plate 120a; a second dust removing member 150 is provided in the fixed interlayer, and a space is reserved between adjacent second dust removing members 150 as a first material circulation cavity 152; the surface of the lower pressing plate 120a at a position corresponding to the first material circulation cavity 152 is hermetic, the surface of the upper pressing plate 110a at a position corresponding to the second dust removing member 150 is hermetic, and the height of the second dust removing member 150 is 50 mm; the upper pressing plate 110a and the lower pressing plate 120a are in the same structural form, and both of them employ a Johnson screen with 2 mm spacing between the mesh wires; the surface of the second dust removing member 150 is wrapped with a Johnson screen, and the second dust removing member 150 is filled with φ3~φ6 inert alumina ceramic balls. The pressing device 10 in 80 mm height comprises a floating grating interlayer, a separating unit and a third slideway 173, and the length of the third slideway 173 is 80 mm; the grating interlayer comprises an upper pressing plate 110a, a lower pressing plate 120a, and a fixed interlayer between the upper pressing plate 110a and the lower pressing plate 120a; a second dust removing member 150 is provided in the fixed interlayer, and a space is reserved between adjacent second dust removing members 150 as a first material circulation cavity 152; the surface of the lower pressing plate 120a at a position corresponding to the first material circulation cavity 152 is hermetic, the surface of the upper pressing plate 110a at a position corresponding to the second dust removing member 150 is hermetic, and the height of the second dust removing member 150 is 30 mm; the upper pressing plate 110a and the lower pressing plate 120a are in the same structural form, and both of them employ a Johnson screen with 2 mm spacing between the mesh wires; the surface of the second dust removing member 150 is wrapped with a Johnson screen, and the second dust removing member 150 is filled with φ3~φ6 inert alumina ceramic balls. In the filling process, each bed layer is compacted and filled. The measurement results are shown in Table 5.

TABLE 5

Measurement Results

|  | Embodiment 10 | Embodiment 11 |
|---|---|---|
| Apparent liquid flow velocity, m/s | 0.0243 | 0.0207 |
|  | 0.0249 | 0.0205 |
|  | 0.0247 | 0.0212 |
| Average, m/s | 0.0246 | 0.0208 |
| Operation time, min | 18956 | 21550 |
| Pressure drop in reactor, ΔP | 8.37 | 7.80 |
| Amount of deposited dust, g | 0.072 | 0.056 |

It can be seen from the increase rate of the pressure drop in the reactor in the embodiments 10 and 11: utilizing the upflow reactor 1 in the present invention, the increase rate of the pressure drop in the reactor is low, which is to say, the increase rate of the pressure drop in the reactor is effectively controlled, and the operation time of the device is greatly prolonged. The result indicates that the pressing device 10 employed in the method of the present invention has a function of controlling the floating of the catalyst bed layers 30 and removing catalyst dust. Thus, the increase of bed layer pressure drop resulted from particle wearing in the process of catalyst floating can be alleviated, and homogenization of the catalyst dust in the reaction process can be realized, so as to achieve uniform pressure drop in the catalyst bed layers 30, effectively control the increase of pressure drop in the reactor, and maintain long-time stable operation of the upflow reactor 1.

As shown in FIGS. 19-22, the present invention further provides an upflow reactor 1, which comprises a housing 20, in which a pressing device 10 and a catalyst bed layer 30 are arranged in the material flow direction; the bottom of the housing 20 is provided with a liquid phase material inlet 220, the top of the housing 20 is provided with a reaction material outlet 230, and the side wall of the housing 20 is provided with a connecting pipe 172.

The pressing device 10 comprises a third slideway 173 and a hydrogen supply and dust filtering assembly that comprises an upper pressing plate 110a, a lower pressing plate 120a and a second membrane assembly 160; the upper pressing plate 110a and the upper pressing plate 110a are fixed by connecting ribs to form a dust filtering interlayer, and the second membrane assembly 160 is arranged in the dust filtering interlayer, the bottom end of the second membrane assembly 160 is in communication with a hydrogen inlet through a second gas intake pipe 174, and the top end of the second membrane assembly 160 is closed and fixed on the bottom surface of the upper pressing plate 110a by connecting ribs.

The second membrane assembly 160 may contain one or more membrane separating tubes, into which a gas is introduced and permeates and diffuses through the nano/micron-pores in the tube wall under the differential pressure to form nano/micron-bubbles, which enter into the dust filtering interlayer that serves as a place for storing nano/micron-bubbles and dissolving and mixing gas and liquid; the nano/micron hydrogen bubbles formed by the membrane separating tubes are usually in size of 0.5 nm~1,000 nm, preferably in size of 50 nm~500 nm.

N catalyst bed layers 30 are provided, namely the first catalyst bed layer 30, the second catalyst bed layer 30, . . . , the $(N-1)^{th}$ catalyst bed layer 30, and the $N^{th}$ catalyst bed layer 30 (N≥1); N pressing devices 10 are provided, namely the first pressing device 10, the second pressing device 10, . . . , the $(N-1)^{th}$ pressing device 10, and the $N^{th}$ pressing device 10 (N≥1).

N connecting pipes (hydrogen inlet pipes) 172 (N≥1) are provided, namely, the first connecting pipe 172, the second connecting pipe 172, . . . , the $(N-1)^{th}$ connecting pipe 172, and the $N^{th}$ connecting pipe 172. The connecting pipes 172 are in one-to-one correspondence with the pressing devices 10, and each pressing device 10 is in communication with the connecting pipe 172 through a second gas intake pipe 174. The connecting pipe 172 is a hose in certain length, which ensures that the hose is always slack to a certain degree in the up-and-down floating process of the pressing device 10, so as to avoid leakage at the material inlet/outlet connection. The material of the hose is determined according to the material properties and operating conditions, and is usually a metal material. The metal hose usually comprises a corrugated pipe, a mesh sleeve and a joint, wherein the corrugated pipe is the body of the metal hose and is flexible, while the mesh sleeve attains an effect of strengthening and shielding.

The quantity of the catalyst bed layers 30 is equal to that of the pressing devices 10, and the catalyst bed layers 30 and the pressing devices 10 are alternately arranged, including the first catalyst bed layer 30, the first pressing device 10, the second catalyst bed layer 30, the second pressing device 10, . . . , the $(N-1)^{th}$ catalyst bed layer 30, the $(N-1)^{th}$ pressing device 10, the $N^{th}$ catalyst bed layer 30 and the $N^{th}$ pressing device 10 arranged sequentially in the material flow direction.

The catalyst bed layers 30 are in height incremented sequentially in the material feeding direction of the reactor, i.e., from the first catalyst bed layer 30, the second catalyst bed layer 30, . . . , the $(N-1)^{th}$ catalyst bed layer 30 to the $N^{th}$ catalyst bed layer 30. the pressing devices 10 are in height decremented sequentially in the material feeding direction of the reactor, i.e., from the first pressing device 10, the second pressing device 10, . . . , the $(N-1)^{th}$ pressing device 10 to the N$^{th}$ pressing device 10. The height of each catalyst bed layer 30 is usually 30 mm~5,000 mm, preferably 300 mm~2,000 mm.

Since the impact force of the reaction materials on the catalyst bed layers 30 and the buoyancy of the catalyst gradually decrease in the material feeding direction of the upflow reactor 1, the abrasion of the catalyst bed layers 30 is in a decremented trend. Therefore, the application result can also be ensured by increasing the height of the catalyst bed layer 30 appropriately, and the decremented height of the pressing devices 10 can balance the buoyancy of the catalyst and the force for fixing the catalyst bed layers 30.

A third slideway 173 is fixed on the inner surface of the upflow reactor 1 at a position in the axial position of the upflow reactor 1, and the hydrogen supply and dust filtering assembly slides integrally on the third slideway 173. The length of the third slideway 173 is 10 mm~800 mm, preferably 50 mm~300 mm. If the length of the third slideway 173 is too small, the catalyst particles may be jammed owing to the small floating space, which results in a shortened operation period; if the length of the third slideway 173 is too long, the floating space of the catalyst will be enlarged, which causes serious abrasion of the catalyst, consequently leads to problems such as excessive catalyst dust and falling of the active metal components of the catalyst.

The upper pressing plate 110a and the lower pressing plate 120a are in the same structural form or different structural forms, and employ parallel metal grating bars or Johnson screen. In the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material and the catalyst from leaking out, and usually is 1 mm~30 mm; in the case that a Johnson screen is employed, the spacing between the mesh wires is usually 1 mm~10 mm, so as to prevent the catalyst particles from being stuck among the mesh wires.

The dust filtering interlayer is filled with an inert filling material, which is one or more of inert alumina ceramic balls, porous ceramic particles, and porous metal material. In use, the inert filling material has an appropriate movement space in the dust filtering interlayer and can move relatively to prevent adhesion and accumulation of the catalyst dust. In the case that the dust filtering interlayer is filled with inert alumina ceramic balls, the diameter of the inert alumina ceramic balls usually is 3 mm~30 mm. Usually, the height of the dust filtering interlayer 150 is generally 10 mm~3,000 mm, preferably 50 mm~300 mm.

A dust removing device 60 is arranged above the topmost catalyst bed layer 30 for fixing the entire catalyst bed layer 30 and filtering and intercepting catalyst dust. The dust removing device 60 comprises a lower plate 610d, a middle plate 620d, an upper plate 630d, a cover plate and a membrane filtering assembly 640d; wherein a first filtering layer is arranged between the lower plate 610d and the middle plate 620d, a second filtering layer is arranged between the middle plate 620d and the upper plate 630d, the membrane filtering assembly 640d is arranged in the first filtering layer, a third dust removing member 650d and a cavity are arranged in a spaced manner in the second filtering layer, the bottom end of the membrane filtering assembly 640d passes through the lower plate 610d through a liquid inlet pipe, and the top end of the membrane filtering assembly 640d passes through the middle plate 620d through a liquid outlet pipe and extends into the third dust removing member 650d in the second filtering layer.

The first filtering layer is filled with a filtering material, which is one or more of inert alumina ceramic balls, porous ceramic particles and porous metal material, preferably is inert alumina ceramic balls, and more preferably is inert alumina ceramic balls in φ1 mm~φ6 mm diameter.

The third dust removing member 650d in the second filtering layer is in the form of a filtering cylinder, the shell of the third dust removing member 650d is made of a stainless steel wire mesh or Johnson screen, and the third dust removing member 650d is filled with an inert filling material, which is one or more of inert alumina ceramic balls, porous ceramic particles and porous metal material. In use, the inert filling material has an appropriate movement space in the third dust removing member 650d and can move relatively to prevent adhesion and accumulation of the catalyst dust. In the case that the third dust removing member 650d is filled with inert alumina ceramic balls, preferably the diameter of the inert alumina ceramic balls is 6 mm~16 mm. Usually, the height of the first filtering layer is 50 mm~1,000 mm, and the height of the second filtering layer is 30 mm~500 mm.

After the reaction materials enter into the membrane filtering assembly 640d through the liquid inlet pipe, a majority part of the materials permeates out of the tube of the membrane filtering assembly 640d, and most of the dust in the reaction materials is removed; then, the reaction materials pass through the first filtering layer, in which all dust is removed; then reaction materials leave the dust removing device 60 from the channel in the cavity, while the remaining impermeable materials in the membrane filtering assembly 640d enter into the first filtering layer through the liquid outlet pipe, and then leave the dust removing device 60 after the dust is removed.

The cover plate is located at the top of the dust removing device 60, and a main beam composed of a plurality of I-beams is fixedly connected to the top surface of the upper plate 630d. When the upflow reactor 1 is used for liquid-phase hydrogenation of hydrocarbon oil, the raw oil directly enters into the upflow reactor 1, or is premixed with a part of hydrogen and then enters into the upflow reactor 1.

Usually, the amount of premixed hydrogen accounts for 0.001 wt %~15 wt % of the total amount of hydrogen, and the premixing and dissolution conditions are: temperature: 40° C.~360° C., pressure: 0.5 MPa~20.0 MPa, and retention time: 0.5 min~30 min. The premixing process may be carried out in a conventional shell-type hydrogen-oil mixing assembly, and the shell may contain any one or more of SWN-type, SMX-type, SMK-type, SML-type, SMH-type, and spiral plates, corrugated plates, rotating blades, flat blades, curved blades or perforated plates, etc.; alternatively, the raw oil and hydrogen may be dissolved and dispersed by means of a membrane tube micro-disperser, microplate, or microporous material, etc., preferably a membrane tube micro-disperser, and the bubble size of pre-dispersed hydrogen is 10 nm~1,000 nm, usually 50~500 nm.

To overcome the drawbacks in the prior art, the present invention provides an upflow reactor 1, in which a pressing device 10 is provided, and the pressing device 10 skillfully integrate functions of hydrogen supply and dust filtration between the catalyst bed layers 30, thus the degree of hydrogenation reaction can be effectively controlled, the reaction efficiency and reaction uniformity can be improved, and, at the same time, the wearing among the catalyst particles in the reaction process is greatly inhibited, and the catalyst dust is removed in situ; thus the service life of the catalyst is improved, the pressure drop in the catalyst bed layers 30 is greatly alleviated, and long-time stable operation of the upflow reactor 1 is maintained.

Compared with the prior art, the upflow reactor 1 provided by the present invention has the following advantages:

1. Compared with traditional upflow reactors, the upflow reactor 1 of the present invention is provided with a multiple layers of pressing devices 10. Since the pressing devices 10 skillfully integrate functions of hydrogen supply and dust filtration between the catalyst bed layers 30, the degree of hydrogenation reaction can be effectively controlled, the reaction efficiency and reaction uniformity can be improved, and, at the same time, the wearing among the catalyst particles in the reaction process is greatly inhibited, and the catalyst dust is removed in situ; thus the service life of the catalyst is improved, the pressure drop in the catalyst bed layers 30 is greatly alleviated, and long-time stable operation of the liquid phase reactor is maintained.
2. The upflow reactor 1 in the present invention is provided with several groups of catalyst bed layers 30 and pressing devices 10, the catalyst bed layers 30 are in height incremented sequentially in the material feeding direction of the upflow reactor 1, and the pressing devices 10 are in height decremented sequentially in the material feeding direction of the upflow reactor 1. By means of such an arrangement, hydrogen can be supplied in sections, the pressure drop in the catalyst bed layers 30 can be controlled in sections, so that the depth of the hydrogenation reaction is effectively controlled, and the distribution of the catalyst dust is homogenized in the axial direction of the upflow reactor 1.
3. The dust filtering interlayer in the pressing device 10 may be filled with an inert filling material. During use, the inert filling material has an appropriate movement space in the dust filtering interlayer, so that the inert filling material can move relatively to prevent adhesion and accumulation of catalyst dust.
4. A dust removing device 60 is arranged immediately above the $N^{th}$ catalyst bed layer 30. On one hand, the dust removing device 60 covers and fixes the entire catalyst bed layer 30 more firmly to prevent the occurrence of material channeling, internal component deformation and agent loss phenomena resulted from non-uniform stress on the catalyst bed layers 30; on the other hand, the dust removing device 60 can effectively filter, intercept and remove a small amount of catalyst dust entrained in the materials, so as to prevent the dust from entering into the follow-up pipelines and causing clogging.

As shown in FIG. 22, the specific reaction process will be explained in an example of liquid-phase hydrogenation process of an oil product: raw oil is introduced as a feed material for upflow hydrogenation reaction into the upflow reactor 1 through the reaction material inlet, and hydrogen is introduced into the upflow reactor 1 via a plurality of feed streams through connecting pipes such as the first connecting pipe 172, the second connecting pipe 172 and the $N^{th}$ connecting pipe 172 respectively; the raw materials from the bottom of the upflow reactor 1 pass through the first pressing device 10, the first catalyst bed layer 30, the second pressing device 10, the second catalyst bed layer 30, the $N^{th}$ pressing device 10, the $N^{th}$ catalyst bed layer 30 and the dust removing device 60 sequentially, and then leave the upflow reactor 1 as the effluent of the upflow hydrogenation reaction through the reaction material outlet.

The raw oil used in the embodiments 12 and 13 is reformed oil from a continuous reformer. The reformed oil is introduced into the upflow reactor 1 of the present invention, and hydrogen is divided into multiple streams and introduced into the pressing device 10, so that a hydrodeolefining reaction takes place. The specific composition of the raw oil is shown in Table 6. The catalyst used in the hydrogenation reactions in the embodiments 12 and 13 is FHDO-18 from Fushun Research Institute of Petrochemical Technology, and the protectant is FBN-03B01 from Fushun Research Institute of Petrochemical Technology.

TABLE 6

Composition of the Raw Oil

| | Alkanes, wt % | Olefins, wt % | Cycloalkanes, wt % | Aromatics, wt % | Total, wt % |
|---|---|---|---|---|---|
| H₂ | 0.010 | | | | 0.010 |
| C1 | 0.013 | | | | 0.013 |
| C2 | 0.115 | 0.00 | | | 0.115 |
| C3 | 0.475 | 0.003 | | | 0.478 |
| C4 | 1.615 | 0.050 | | | 1.665 |
| C5 | 2.104 | 0.136 | | | 2.250 |
| C6 | 8.755 | 0.714 | 0.154 | 7.443 | 17.066 |
| C7 | 3.441 | 0.288 | 0.172 | 21.789 | 25.690 |
| C8 | 0.933 | 0.077 | 0.096 | 25.651 | 26.757 |
| C9 | 0.058 | 0.010 | 0.010 | 17.147 | 17.225 |
| C10+ | 0.01 | — | — | 8.728 | 8.738 |
| Total | 17.533 | 1.279 | 0.432 | 80.756 | 100.00 |

Embodiment 12

The upflow reactor 1 in the present invention is employed (the reactor is provided with two catalyst bed layers and two floating hydrogen supply and dust filtering layers); raw oil is introduced as a feed material into the upflow reactor 1 (the diameter of the upflow reactor 1 is 100 mm), and hydrogen is divided into two streams and introduced into the first pressing device 10 and the second pressing device 10 respectively, wherein the second membrane assemblies 160 in the first pressing device and the second pressing device 10 disperse the hydrogen into micro-bubbles in size of 50 nm. The upflow reactor 1 is filled with a first pressing device 10 in 180 mm height, a first catalyst bed layer 30 in 400 mm height, a second pressing device 10 in 100 mm height, a second catalyst bed layer 30 in 600 mm height, and a ceramic ball layer in 100 mm height sequentially in the material flow direction; the first pressing device 10 comprises a third slideway 173 and a hydrogen supply and dust filtering assembly that comprises an upper pressing plate 110a, a lower pressing plate 120a and a second membrane assembly 160, wherein the upper pressing plate 110a and the lower pressing plate 120a are fixed by connecting ribs to form a dust filtering interlayer; the second membrane assembly 160 is arranged in the dust filtering interlayer; the bottom end of the second membrane assembly 160 is in communication with a hydrogen inlet through a pipeline; the top end of the second membrane assembly 160 is closed and fixed to the bottom surface of the upper pressing plate 110a; the second membrane assembly 160 may contain 36 membrane tubes, and the hydrogen introduced into the tubes permeates and diffuses through the nano/micron channels in the tube walls under the differential pressure to form bubbles in 50 nm diameter and enters into the dust filtering interlayer; the length of the third slideway 173 is 180 mm, and the hydrogen supply and dust filtering assembly slides integrally on the third slideway 173; the upper pressing plate 110*a* and the lower pressing plate 120*a* are in the same structural form, and both of they are formed by jointed parallel metal grating bars in 40 mm width, and the width of the slits between the metal grating bars is 2 mm; the dust filtering interlayer is filled with φ3~φ6 inert alumina ceramic balls; the second pressing device 10 has the same structure as the first pressing device 10, except that the length of the third slideway 173 is 100 mm; In the filling process, each bed layer is compacted and filled. The measurement results are shown in Table 7.

Embodiment 13

The upflow reactor 1 in the present invention is employed; raw oil is introduced as a feed material into the upflow reactor 1 (the diameter of the upflow reactor 1 is 200 mm), and hydrogen is divided into three streams and introduced into the first pressing device 10, the second pressing device 10, and the third pressing device 10 respectively, wherein the second membrane assemblies 160 in the first pressing device 10, the second pressing device 10 and the third pressing device 10 disperse the hydrogen into micro-bubbles in size of 50 nm. The upflow reactor 1 is filled with a first pressing device 10 in 200 mm height, a first catalyst bed layer 30 in 700 mm height, a second pressing device 10 in 150 mm height, a second catalyst bed layer 30 in 800 mm height, a third pressing device 10 in 100 mm height, a third catalyst bed layer 30 in 600 mm height, and a dust removing device 60 in 150 mm height sequentially in the material flow direction; the first pressing device 10 comprises a third slideway 173 and a hydrogen supply and dust filtering assembly that comprises an upper pressing plate 110*a*, a lower pressing plate 120*a* and a second membrane assembly 160, wherein the upper pressing plate 110*a* and the lower pressing plate 120*a* are fixed by connecting ribs to form a dust filtering interlayer; the second membrane assembly 160 is arranged in the dust filtering interlayer; the bottom end of the second membrane assembly 160 is in communication with a hydrogen inlet through a pipeline; the top end of the second membrane assembly 160 is closed and fixed to the bottom surface of the upper pressing plate 110*a*; the second membrane assembly 160 may contain 36 membrane tubes, and the hydrogen introduced into the tubes permeates and diffuses through the nano/micron channels in the tube walls under the differential pressure to form bubbles in 50 nm diameter and enters into the dust filtering interlayer; the third slideway 173 is fixed on the inner surface of the upflow reactor 1 at a position in the axial position of the upflow reactor 1, and the length of the third slideway 173 is 200 mm; the hydrogen supply and dust filtering assembly slides integrally on the third slideway 173; the upper pressing plate 110*a* and the lower pressing plate 120*a* are in the same structural form, and both of them employ a Johnson screen with 2 mm spacing between the mesh wires; the dust filtering interlayer is filled with φ3 porous ceramic particles; the second pressing device 10 has the same structure as the first pressing device 10, except that the length of the third slideway 173 is 150 mm; the third pressing device 10 has the same structure as the first pressing device 10 and the second pressing device 10, except that the length of the third slideway 173 is 100 mm;

The dust removing device 60 comprises a lower plate 610*d*, a middle plate 620*d*, an upper plate 630*d*, a cover plate and a membrane filtering assembly 640*d*; a first filtering layer is arranged between the lower plate 610*d* and the middle plate 620*d*, a second filtering layer is arranged between the middle plate 620*d* and the upper plate 630*d*, the membrane filtering assembly 640*d* is arranged in the first filtering layer, the first filtering layer is filled with φ3~φ6 inert alumina ceramic balls, the height of the first filtering layer is 50 mm, and the height of the second filtering layer is 50 mm, the second filtering layer has a filtering cylinder therein, the shell of the filtering cylinder is made of a Johnson screen, and the filtering cylinder is filled with φ6 porous ceramic particles; the filtering cylinder is in a cylindrical shape, with pores uniformly arranged in its surface at 60% porosity, and the pores are in a slit shape; In the filling process, each bed layer is compacted and filled. The measurement results are shown in Table 7.

TABLE 7

Measurement Results

|  | Embodiment 12 | Embodiment 13 |
|---|---|---|
| Apparent liquid flow velocity, m/s | 0.0253 | 0.0198 |
|  | 0.0249 | 0.0203 |
|  | 0.0257 | 0.0209 |
| Average, m/s | 0.0253 | 0.0203 |
| Operation time, min | 19370 | 22580 |
| Pressure drop in reactor, ΔP | 8.37 | 5.25 |
| Total amount of accumulated dust in filtering layer, g | — | 0.038 |

It can be seen from the increase rate of the pressure drop in the reactor in the embodiments 12 and 13: utilizing the upflow reactor 1 in the present invention, the increase rate of the pressure drop in the reactor is low, which is to say, the increase rate of the pressure drop in the reactor is effectively controlled, thus the operation time of the device is greatly prolonged. The result indicates that the pressing device 10 used in the method in the present invention skillfully integrates hydrogen supply and dust filtering between the catalyst bed layers 30, thereby can effectively control the degree of the hydrogenation reaction, and improve the reaction efficiency and reaction uniformity; moreover, the abrasion of the catalyst particles in the reaction process is greatly inhibited, the catalyst dust is removed in situ, the service life of the catalyst is prolonged, the increase of the pressure drop in the catalyst bed layers is greatly alleviated, and long-time stable operation of the liquid phase reactor is maintained.

Figure 24:
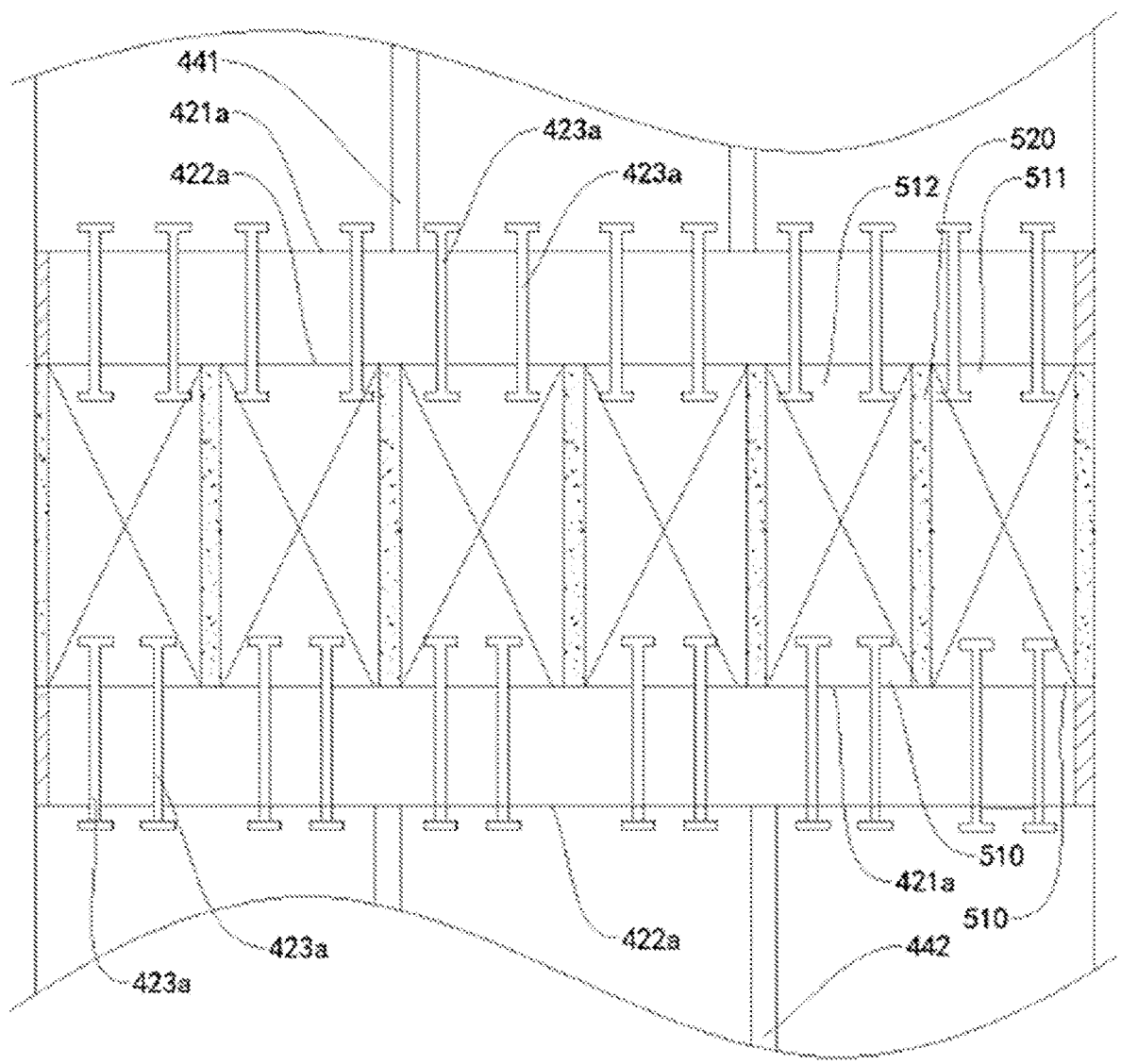
FIG. 24 is a partial schematic structural diagram of the upflow reactor according to the sixth embodiment of the present invention.

As shown in FIGS. 23-25, the present invention further provides an upflow reactor 1, which comprises a housing 20, in which a sliding support 410, a first catalyst bed layer 30, a linked dust filtering and deposition layer, a second catalyst bed layer 30 and a pressing device 10 are arranged in the material flow direction; the linked dust filtering and deposition layer is fixedly connected with a pressing device 10 and a sliding support 410 via an upper elastic member 441 and a lower elastic member 442 respectively, the bottom of the housing 20 is provided with a reaction material inlet 220, and the top of the housing 20 is provided with a reaction material outlet 230. The height of the second catalyst bed layer 30 is greater than or equal to that of the first catalyst bed layer 30, and the height ratio of the second catalyst bed layer 30 to the first catalyst bed layer 30 is 1:1-50:1, preferably 2:1-8:1.

The linked dust filtering and deposition layer comprises an upper linkage 420, a filtering device 50 and a lower linkage 430, wherein the upper linkage 420 comprises a first linking plate 421*a*, a second linking plate 422*a* and a plurality of first guiding members 423*a*, and is sealed with the inner wall of the upflow reactor 1 by means of a seal ring; the first linking plate 421*a* and the second linking plate 422*a* are horizontally arranged on the upper and lower parts of the upper linkage 420, and the plurality of first guiding members 423a are evenly arranged and pass through the first linking plate 421a and the second linking plate 422a in the axial direction; the lower linkage 430 also comprises a first linking plate 421a, a second linking plate 422a and a plurality of first guiding members 423a, and is sealed with the inner wall of the upflow reactor 1 by means of a seal ring; the first linking plate 421a and the second linking plate 422a are horizontally arranged on the upper and lower parts of the lower linkage 430, and the lower slideways are evenly arranged and pass through the first fixing plate and the second fixing plate of the lower linkage layer in the axial direction; a filtering device 50 is arranged between the second linking plate 422a of the upper linkage 420 and the first linking plate 421a of the lower linkage 430, a plurality of first dust removing members 510 are arranged in the filtering device 50, and an isolating member 520 is arranged between adjacent first dust removing members 510.

The first linking plate 421a and the second linking plate 422a of the upper linkage 420 are in the same structural form or in different structural forms, and may be formed by jointed parallel metal grating bars or a Johnson screen respectively; in the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material from leaking out and prevent the catalyst from leaking in, and usually is 1 mm~30 mm; in the case that a Johnson screen is employed, the spacing between the mesh wires is usually 1 mm~10 mm, so as to prevent the catalyst particles from being stuck among the mesh wires.

The first linking plate 421a and the second linking plate 422a of the lower linkage 430 are in the same structural form or in different structural forms, and may be formed by jointed parallel metal grating bars or a Johnson screen respectively; in the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material from leaking out and prevent the catalyst from leaking in, and usually is 1 mm~30 mm; in the case that a Johnson screen is employed, the spacing between the mesh wires is usually 1 mm~10 mm, so as to prevent the catalyst particles from being stuck among the mesh wires.

The sliding support 410 comprises a first grating plate 412 and a first slideway 411 that is fixed on the inner wall of the upflow reactor 1 at a position in the axial direction of the upflow reactor 1; the edge of the first grating plate 412 is movably overlapped on the first slideway 411, and is sealed with the first slideway 411 by means of a sealing member. One end of the sealing member is fixed on the rim of the first grating plate 412, and the other end of the sealing member is movably overlapped on the surface of the first slideway 411. The first slideway 411 is arranged along the entire circumference of the inner wall of the upflow reactor 1, and the length of the first slideway 411 is 10 mm~500 mm, preferably 30 mm~300 mm. If the length is too small, clogging may occur easily because the floating space is too small, resulting in a shortened operation period; if the length is too great, the floating space of the catalyst will be so large that the catalyst will be abraded seriously, causing problems such as excessive catalyst dust.

The pressing device 10 comprises a pressing plate 130a and a third slideway 173 that is fixed on the inner wall of the upflow reactor 1 in the axial position of the upflow reactor 1, the edge of the pressing plate 130a is movably overlapped on the third slideway 173, and is sealed with the third slideway 173 by means of a sealing member. One end of the sealing member is fixed on the rim of the pressing plate 130a, and the other end of the sealing member is movably overlapped on the surface of the third slideway 173. The third slideway 173 is arranged along the entire circumference of the inner wall of the upflow reactor 1, and the length of the third slideway 173 is 10 mm~500 mm, preferably 30 mm~300 mm. If the length is too small, clogging may occur easily because the floating space is too small, resulting in a shortened operation period; if the length is too great, the floating space of the catalyst will be so large that the catalyst will be abraded seriously, causing problems such as excessive catalyst dust.

The outer surface of the first dust removing member 510 is wrapped with a stainless steel wire mesh or Johnson screen, and the first dust removing member 510 is filled with an inert filling material for intercepting and collecting catalyst dust. The inert filling material is one or more of inert alumina ceramic balls, porous ceramic particles and porous metal material, preferably is inert alumina ceramic balls, further preferably is φ3~φ30 inert alumina ceramic balls. The first dust removing member 510 is in a shape that is any of cylindrical shape, cubic shape, rhombic shape, cuboid shape, and polygonal shape, preferably in a cylindrical shape; the height of the first dust removing member 510 is 10 mm~1,000 mm, preferably 30 mm~200 mm.

The first linking plate 421a and the second linking plate 422a of the upper linkage 420 are in the same structural form or in different structural forms, and is formed by jointed parallel metal grating bars or a Johnson screen respectively. The first linking plate 421a and the second linking plate 422a of the lower linkage 430 are in the same structural form or in different structural forms, and is formed by jointed parallel metal grating bars or a Johnson screen respectively.

The isolating member 520 is a granular element made of an elastic material, in which the granules are in a shape that comprises one or more of spherical shape, strip shape, polygonal shape, toothed spherical shape, and block shape, and the elastic material is a high temperature-resistant rubber material, in particular one or more of silicone rubber, boron silicone rubber and fluorosilicone rubber. When the amount of dust deposited in the filtering device 50 increases to an extent that the bed layer pressure drop increases, the first dust removing member 510 is radially deformed and squeezes the isolating member 520, so that the material throughput in the filtering device 50 is increased, the dust deposition in the filtering device 50 is enhanced, and the increase of the bed layer pressure drop is alleviated.

A press cover is arranged above the second catalyst bed layer 30, and is a main beam composed of a plurality of I-beams and is fixed on the upper part of the pressing device 10. A supporting plate 810 and/or a protectant layer 830 are/is arranged on the lower part of the first catalyst bed layer 30. In the case that both the supporting plate 810 and the protectant layer 830 are provided, the protectant layer 830 is located above the supporting plate 810.

To overcome the drawbacks in the prior art, the present invention provides an upflow reactor 1, in which an linked dust filtering and deposition layer is arranged, so as to effectively reduce abrasion of the catalyst particles during movement, prolong the service life of the catalyst, continuously remove the catalyst dust in the reaction process, improve the reaction uniformity, greatly alleviate the increase of pressure drop in the catalyst bed layer, and maintain stable long-time operation of the reactor.

In the upflow reactor 1 in the present invention, the upper part of the first catalyst bed layer 30 is adjacent to the filtering device 50. When the first catalyst bed layer 30 expands, the sliding support 410 and the lower linkage 430 act simultaneously, so that the sliding support 410 floats downward while the lower linkage 430 floats upward; when the first catalyst bed layer 30 contracts, the sliding support 410 and the lower linkage 430 act simultaneously; specifically, the sliding support 410 floats upward and the lower linkage 430 floats downward, so that the catalyst in the bed layer floats uniformly in the axial direction, thus local resistance is reduced and the pressure drop in the catalyst bed layer 30 is homogenized.

In the upflow reactor 1 in the present invention, the lower part of the second catalyst bed layer 30 is adjacent to the filtering device 50. When the second catalyst bed layer 30 expands, the pressing plate 130*a* and the upper linkage 420 act simultaneously, so that the pressing plate 130*a* floats upward while the upper linkage 420 floats downward; when the first catalyst bed layer 30 contracts, the pressing plate 130*a* and the upper linkage 420 act simultaneously; specifically, the sliding support 130*a* floats downward and the upper linkage 420 floats upward, so that the catalyst in the bed layer floats uniformly in the axial direction, thus local resistance is reduced and the pressure drop in the catalyst bed layer 30 is homogenized.

Compared with the prior art, the upflow reactor 1 provided by the present invention has the following advantages:
1. In the upflow reactor 1 in the present invention, the catalyst bed layer 30 is divided into a first catalyst bed layer 30 and a second catalyst bed layer 30 by arranging a linked dust filtering and deposition layer, the upper linkage 420 and the lower linkage 430 in the lined dust filtering and deposition layer are respectively connected with the pressing plate 130*a* and the sliding support 410 and float in a linked way, the pressing plate 130*a* and the sliding support 410 can float up and down, while the filtering device 50 for of the linked dust filtering and deposition layer is fixed.
2. The linked dust filtering and deposition layer is linked with the pressing plate 130*a* and the sliding support 410. When the second catalyst bed layer 30 expands, the pressing plate 130*a* and the upper linkage 420 act at the same time, and the pressing plate 130*a* floats upward while the upper linkage 420 floats downward; when the first catalyst bed layer 30 contracts, the pressing plate 130*a* and the upper linkage 420 act simultaneously; specifically, the sliding support 130*a* floats downward and the upper linkage 420 floats upward, so that the catalyst in the bed layer floats uniformly in the axial direction, thus local resistance is reduced and the pressure drop in the catalyst bed layer is homogenized.
3. By arranging a linked dust filtering and deposition layer in the upflow reactor 1 of the present invention, on one hand, the impact force of the feed reaction materials on the second catalyst bed layer 30 is buffered and rapidly reduced, the abrasion of the catalyst particles is greatly reduced, and the amount of generated dust is greatly reduced, thus the pressure drop in the second catalyst bed layer 30 is controlled to a lower level, while a small amount of dust generated by the first catalyst bed layer 30 is filtered and deposit through the linked dust filtering and deposition layer, and the pressure drop in the first catalyst bed layer 30 can be effectively controlled.
4. Filtering devices 50 are arranged in the linked dust filtering and deposition layer, and isolating members 520 are arranged between the filtering devices 50, so that the amount of dust deposited in the dust filtering and deposition layer increases uniformly and slowly with the increase of the pressure drop, while the amount of deposited dust can be greatly increased in the limited space of the dust filtering and deposition layer, but the pressure drop in the dust filtering and deposition layer is relatively low.

As shown in FIG. 25, the specific reaction process will be explained in an example of liquid-phase hydrogenation process of an oil product: hydrogen and raw oil are dissolved and mixed in the hydrogen-oil mixer 850 to form a gas-liquid mixture or a liquid phase material in which hydrogen is dissolved; the mixture is introduced as feed materials for upflow hydrogenation reaction into the upflow reactor 1 through the reaction material inlet, and then passes through the sliding support 410, the first catalyst bed layer 30, the linked dust filtering and deposition layer 12, the second catalyst bed layer 30, and the pressing device 10 sequentially, and then the materials leave the upflow reactor 1 as an effluent of upflow hydrogenation reaction through the reaction material outlet.

During normal operation, owing to the particularity of the reaction process, under the action of buoyancy, the first catalyst bed layer 30 and the second catalyst bed layer 30 are in an expanded state after material feeding, and float up and down with the fluctuations of material feeding. By providing a linked dust filtering and deposition layer and configuring the linked dust filtering and deposition layer to be linked and work with the sliding support 410 and the pressing device 10, the pressing plate 130*a* and the upper linkage 420 act simultaneously, i.e., the pressing plate 130*a* floats upward, while the upper linkage 420 float downward; when the second catalyst bed layer 30 contracts, the pressing plate 130*a* and the upper linkage 420 act simultaneously; specifically, the pressing plate 130*a* floats downward and the upper linkage 420 floats upward; when the first catalyst bed layer 30 expands or contracts, the sliding support 410 and the lower linkage 430 act simultaneously; specifically, the sliding support 410 floats upward or downward while the lower linkage 430 floats downward or upward, so that the catalyst in the bed layer floats uniformly in the axial direction, thus local resistance is reduced and the pressure drop in the catalyst bed layer is homogenized.

The specific compositions of the raw oil used in the embodiments 14 and 15 of the present invention are shown in Table 6. The catalyst used in the hydrogenation reactions in the embodiments 14 and 15 is FHDO-18 from Fushun Research Institute of Petrochemical Technology, and the protectant is FBN-03B01 from Fushun Research Institute of Petrochemical Technology.

Embodiment 14

The upflow reactor 1 in the present invention is employed. Raw oil and hydrogen are mixed in a conventional static mixer (model SV2.3/25-6.4-500), and then the mixture is introduced as feed materials into the upflow reactor 1 (the diameter of the upflow reactor 1 is 100 mm), which is filled with a sliding support 410 in 80 mm height, a first catalyst bed layer 30 in 400 mm height, a linked dust filtering and deposition layer in 260 mm height, a second catalyst bed layer 30 in 800 mm height, and a pressing device in 60 mm height sequentially in the material flow direction; the sliding support 410 comprises a first slideway 411 and a first grating plate 412, and the length of the first slideway 411 is 80 mm; the pressing device 10 comprises a third slideway 173 and a pressing plate 130a, and the length of the third slideway 173 is 60 mm; the linked dust filtering and deposition layer comprises an upper linkage 420, a filtering device 50 and a lower linkage 430; the upper linkage 420 comprises a first linking plate 421a, a second linking plate 422a and a plurality of first guiding members 423a, and the lower linkage 430 also comprises a first linking plate 421a, a second linking plate 422a and a plurality of first guiding members 423a, a filtering device 50 is arranged between the second linking plate 422a of the upper linkage 420 and the first linking plate 421a of the lower linkage 430, first dust removing members 510 are provided in the filtering device 50, and an isolating member 520 is provided between adjacent first dust removing members 510; the outer surface of the filtering device 50 is wrapped with a Johnson screen, and the filtering device 50 is filled with φ3~φ6 inert alumina ceramic balls, the first dust removing member 510 is in a cylindrical shape and in 120 mm height; the first linking plate 421a and the second linking plate 422a of the upper linkage 420 are in the same structural form, and are formed by jointed parallel metal grating bars in 40 mm width, with slits in 2 mm width between the grating bars; the first linking plate 421a and the second linking plate 422a of the lower linkage 430 are in the same structural form, and employ a Johnson screen with 2 mm mesh spacing; the isolating member 520 is formed by elastic spherical particles made of silicone rubber. The press cover is a supporting beam structure composed of I-beams. In the filling process, each bed layer is compacted and filled. The measurement results are shown in Table 8.

Embodiment 15

The upflow reactor 1 of the present invention is used, raw oil and hydrogen are mixed in an inorganic membrane tube disperser, and the hydrogen is dispersed into micro-bubbles in 50 nm size and then permeates out of the tube to form a mixture with the liquid introduced into the shell, then the mixture is introduced as feed materials into the upflow reactor 1 (the diameter of the upflow reactor 1 is 200 mm); the upflow reactor 1 is filled with a supporting plate 810, a protectant layer 830 in 200 mm height, a sliding support 410 in 100 mm height, a first catalyst bed layer 30 in 800 mm height, a linked dust filtering and deposition layer in 300 mm height, a second catalyst bed layer 30 in 600 mm height, a pressing device 10 in 80 mm height, and a press cover in 100 mm height sequentially in the material flow direction; the supporting plate 810 is formed by jointed parallel metal grating bars, and a 10-mesh stainless steel screen is laid on the top surfaces of the grating bars; the sliding support 410 comprises a first slideway 411 and a first grating plate 412, and the length of the first slideway 411 is 100 mm; the sliding support 410 comprises a third slideway 173 and a pressing plate 130a, and the length of the third slideway 173 is 80 mm; the linked dust filtering and deposition layer comprises an upper linkage 420, a filtering device 50 and a lower linkage 430; the upper linkage 420 comprises a first linking plate 421a, a second linking plate 422a and a plurality of first guiding members 423a, and the lower linkage 430 also comprises a first linking plate 421a, a second linking plate 422a and a plurality of first guiding members 423a, a filtering device 50 is arranged between the second linking plate 422a of the upper linkage 420 and the first linking plate 421a of the lower linkage 430, first dust removing members 510 are provided in the filtering device 50, and an isolating member 520 is provided between adjacent first dust removing members 510; the outer surface of the filtering device 50 is wrapped with a Johnson screen, and the filtering device 50 is filled with φ3~φ6 inert alumina ceramic balls; the filtering device 50 is in a cylindrical shape and in 120 mm height; the first linking plate 421a and the second linking plate 422a of the upper linkage 420 are in the same structural form, and are formed by jointed parallel metal grating bars in 40 mm width, with slits in 2 mm width between the grating bars; the first linking plate 421a and the second linking plate 422a of the lower linkage 430 are in the same structural form, and employ a Johnson screen with 2 mm mesh spacing; the isolating member 520 is an elastic strip element made of boron silicone rubber. The press cover is a supporting beam structure composed of I-beams. In the filling process, each bed layer is compacted and filled. The measurement results are shown in Table 8.

TABLE 8

| Measurement Results | | |
|---|---|---|
| | Embodiment 14 | Embodiment 15 |
| Apparent liquid flow velocity, m/s | 0.0233 | 0.0208 |
| | 0.0242 | 0.0206 |
| | 0.0237 | 0.0212 |
| Average, m/s | 0.0237 | 0.0209 |
| Operation time, min | 21370 | 25440 |
| Pressure drop in reactor, ΔP | 6.39 | 5.25 |
| Total amount of dust accumulated in linked dust filtering and deposition layer, g | 0.051 | 0.040 |

It can be seen from the increase rate of the pressure drop in the reactor in the embodiments 14 and 15: utilizing the upflow reactor 1 in the present invention, the increase rate of the pressure drop in the reactor is relatively low, which is to say, the increase rate of the pressure drop in the reactor is effectively controlled, thus the operation time of the device is greatly prolonged. The result indicates: by providing the linked dust filtering and deposition layer in the present invention, the abrasion of the catalyst particles during movement can be effectively reduced, the service life of the catalyst can be prolonged, the catalyst dust can be continuously removed in the reaction process, the reaction uniformity can be improved, the increase of pressure drop in the catalyst bed layer can be greatly alleviated, and long-time stable operation of the reactor can be maintained.

As shown in FIGS. 26-29, the present invention further provides an upflow reactor 1, which comprises a housing 20, in which a sliding support 410, a first catalyst bed layer 30, a linked dust filtering and deposition layer, a second catalyst bed layer 30 and a pressing device 10 are arranged in the material flow direction; the linked dust filtering and deposition layer is fixedly connected with a pressing device 10 and a sliding support 410 via an upper elastic member 441 and a lower elastic member 442, respectively, the bottom of the housing 20 is provided with a reaction material inlet, and the top of the housing 20 is provided with a reaction material outlet. The linked dust filtering and deposition layer comprises an upper linkage 420, a filtering device 50 and a lower linkage 430. The upper linkage 420 comprises a second slideway 421b, a linking plate 422b and a plastic elastomer of upper linkage layer, wherein the second slideway 421b of the upper linkage 420 is fixed on the inner wall of the upflow reactor 1 at a position in the axial position of the upflow reactor 1, the linking plate 422b is located on the plastic elastomer of upper linkage layer, and the linking plate 422b is overlapped on the second slideway 421b.

The lower linkage 430 comprises a second slideway 421b, a linking plate 422b and a plastic elastomer of lower linkage layer, wherein the second slideway 421b is fixed on the inner wall of the upflow reactor 1 at a position in the axial position of the upflow reactor 1, the plastic elastomer of lower linkage layer is located on the linking plate 422b, and the linking plate 422b is overlapped on the second slideway 421b. A filtering device 50 is arranged between the upper linkage 420 and the lower linkage 430, a plurality of first dust removing members 510 are arranged in the filtering device 50, a first membrane assembly 530 is arranged between adjacent first dust removing members 510, and the inlet of the first membrane assembly 530 is in communication with a hydrogen inlet pipe.

The height of the second catalyst bed layer 30 is greater than or equal to that of the first catalyst bed layer 30, and the height ratio of the second catalyst bed layer 30 to the first catalyst bed layer 30 is 1:1-50:1, preferably 2:1-8:1.

The sliding support 410 comprises a first slideway 411 and a first grating plate 412, wherein the first slideway 411 is fixed on the inner surface of the upflow reactor 1 at a position in the axial position of the upflow reactor 1, and the edge of the first grating plate 412 is movably overlapped on the first slideway 411 and sealed with the first slideway 411 by the sealing member. One end of the sealing member is fixed on the rim of the first grating plate 412, and the other end of the sealing member is movably overlapped on the surface of the first slideway 411.

The first slideway 411 is arranged along the entire circumference of the inner wall of the upflow reactor 1, and the length of the first slideway 411 is 10 mm~500 mm, preferably 30 mm~300 mm. If the length is too small, clogging may occur easily because the floating space is too small, resulting in a shortened operation period; if the length is too great, the floating space of the catalyst will be so large that the catalyst will be abraded seriously, causing problems such as excessive catalyst dust.

The pressing device 10 comprises a pressing plate 130a and a third slideway 173 that is fixed on the inner wall of the upflow reactor 1 in the axial position of the upflow reactor 1, the edge of the pressing plate 130a is movably overlapped on the third slideway 173, and is sealed with the third slideway 173 by means of a sealing member. One end of the sealing member is fixed on the rim of the pressing plate 130a, and the other end of the sealing member is movably overlapped on the surface of the third slideway 173.

The third slideway 173 is arranged along the entire circumference of the inner wall of the upflow reactor 1, and the length of the third slideway 173 is 10 mm~500 mm, preferably 30 mm~300 mm. If the length is too small, clogging may occur easily because the floating space is too small, resulting in a shortened operation period; if the length is too great, the floating space of the catalyst will be so large that the catalyst will be abraded seriously, causing problems such as excessive catalyst dust.

The second slideway 421b of the upper linkage 420 is fixed on the inner wall of the upflow reactor 1 along the entire circumference in the axial position of the upflow reactor 1, and is a steel structure. The second slideway 421b of the lower linkage 430 is fixed on the inner wall of the upflow reactor 1 along the entire circumference in the axial position of the upflow reactor 1, and is a steel structure.

The first membrane assembly 530 has a tube bundle structure and contains one or more membrane tubes, which are inorganic membrane tubes. Hydrogen permeates and diffuses through nano/micron-pores in the tube wall under the pressure difference between the inside and the outside of the membrane tube to form nano/micron bubbles. Usually, nano/micron hydrogen bubbles is in size of 0.5 nm~1,000 nm, preferably 50 nm~500 nm. After the hydrogen introduced from the hydrogen inlet pipe is dispersed by the first membrane assembly 530 into nano/micron hydrogen bubbles, the hydrogen permeates through the dust filtering and deposition layer and is mixed and dissolved with the reaction materials. In that process, on one hand, the reaction materials have a certain shearing effect with the nano/micron hydrogen bubbles under the action of buoyancy, thus the degree of dissolution and dispersion of the hydrogen and oil is greatly improved, thereby the hydrogenation reaction rate and reaction efficiency are improved; on the other hand, a large quantity of nano/micron hydrogen bubbles continuously wash the inner and outer surfaces of the first dust removing member 510 during the permeation and diffusion, thus the catalyst dust inside the first dust removing member 510 deposits more uniformly, which is beneficial for preventing the increase of local pressure drop in the dust filtering and deposition layer, controlling the increase rate of pressure drop in the dust filtering and deposition layer, and stabilizing the pressure drop during long-time operation.

The linking plate 422b of the upper linkage 420 and the linking plate 422b of the lower linkage 430 are in the same structural form or in different structural forms, and are formed by jointed parallel metal grating bars or a Johnson screen. In the case that parallel metal grating bars are employed, the width of the grating bars is usually 20 mm~60 mm, and the width of the slits between the grating bars may be determined according to the diameter of the catalyst particles and the inert material in the fixed interlayer. It is required that the width of the slits should be smaller than the diameter of the inert material in the fixed interlayer and the diameter of the catalyst particles in order to prevent the inert material from leaking out and prevent the catalyst from leaking in, and usually is 1 mm~30 mm; in the case that a Johnson screen is employed, the spacing between the mesh wires is usually 1 mm~10 mm, so as to prevent the catalyst particles from being stuck among the mesh wires.

The plastic elastomer of upper linkage layer and the plastic elastomer of lower linkage layer are granular elements made of an elastic material, in which the granules are in a shape that comprises one or more of spherical shape, strip shape, polygonal shape, toothed spherical shape, and block shape, and the elastic material is a high temperature-resistant rubber material, in particular one or more of silicone rubber, boron silicone rubber and fluorosilicone rubber. When the catalyst bed layer 30 expands/contracts, the plastic elastomer of upper linkage layer and the plastic elastomer of lower linkage layer can be elastically deformed and float simultaneously, so that the catalyst bed layer 30 can be recovered to its original volume as quickly as possible. The height of the plastic elastomer of upper linkage layer and the plastic elastomer of lower linkage layer is 10 mm~500 mm, preferably 50 mm~200 mm.

The surface of the first dust removing member 510 is wrapped with a stainless steel wire mesh or Johnson screen, and the second dust removing member 150 is filled with an inert filling material, which is one or more of inert alumina ceramic balls, porous ceramic particles and porous metal material, preferably inert alumina ceramic balls, further preferably φ3~φ30 inert alumina ceramic balls; the first dust removing member 510 is in a shape that is any of cylindrical shape, cubic shape, rhombic shape, cuboid shape, and polygonal shape, preferably in a cylindrical shape; the height of the first dust removing member 510 is 10 mm~1,000 mm, preferably 30 mm~200 mm.

A press cover is arranged above the pressing device 10, and the press cover is formed by a main beam composed of a plurality of I-beams and fixed at an upper position of the pressing device 10. The function of the press cover is to fix the components in the entire upflow reactor 1 by virtue of its weight, so as to prevent the deformation of the components and agent loss incurred by the expansion of the catalyst bed layer 30.

A supporting plate 810 and/or a protectant layer 830 are/is arranged on the lower part of the sliding support 410. In the case that both the supporting plate 810 and the protectant layer 830 are provided, the protectant layer 830 is located above the supporting plate 810. The supporting plate 810 is formed by jointed parallel metal grating bars, and is used for supporting the weight of the upper catalyst bed layer 30. The protectant layer 830 is filled with a protectant, which is mainly used for removing metal impurities and solid particles in the raw materials and appropriately hydrogenating the substances easy to coke in the raw materials at the same time, so as to alleviate poisoning and coking in the catalyst and prolong the service life of the main catalyst. The protectant may be a commercial product or may be prepared according to the existing methods.

When the upflow reactor 1 is used for liquid-phase hydrogenation of hydrocarbon oil, the specific process is as follows: (1) firstly, the hydrogen is divided into two streams: hydrogen I and hydrogen II, and the hydrogen I is mixed and dissolved with raw oil to obtain a stream containing hydrogen; (2) the stream formed in the step (1) is introduced as a feed material from the bottom of the upflow reactor 1; a hydrogenation reaction is carried out in the first catalyst bed layer 30; the hydrogen II is introduced from the linked dust filtering and deposition layer, dispersed into nano/micron hydrogen bubbles through the inorganic membrane tubes in the linked dust filtering and deposition layer, and then mixed and dissolved with the feed material; after a hydrogenation reaction is carried out in the second catalyst bed layer 30, the effluent leaves from the top of the upflow reactor 1.

To overcome the drawbacks in the prior art, the present invention provides an upflow reactor 1, in which an linked dust filtering and deposition layer is arranged, so as to effectively reduce abrasion of the catalyst particles during movement, prolong the service life of the catalyst, continuously remove the catalyst dust in the reaction process, improve the reaction uniformity, greatly alleviate the increase of pressure drop in the catalyst bed layer, and maintain stable long-time operation of the reactor.

The sliding support 410 is located at the lower part of the first catalyst bed layer 30, is connected with the linked dust filtering and deposition layer through via a lower elastic member 442, and floats up and down with the expansion/contraction of the first catalyst bed layer 30 during the reaction.

The upper part of the first catalyst bed layer 30 is adjacent to the linked dust filtering and deposition layer. When the first catalyst bed layer 30 expands, the sliding support 410, the lower elastic member 442 and the lower linkage 430 act simultaneously; specifically, the sliding support 410 floats downward, the lower elastic member 442 extends, and the lower linkage 430 floats upward; when the first catalyst bed layer 30 contracts, the sliding support 410 and the lower linkage 430 act simultaneously; specifically, the sliding support 410 floats upward, the lower elastic member 442 contracts, and the lower linkage 430 floats downward, so that the catalyst in the first catalyst bed layer 30 is quickly recovered to its original state, thus the abrasion of the particles in the first catalyst bed layer 30 and the catalyst dust are reduced, and the increase of pressure drop in the first catalyst bed layer 30 is alleviated. Thus, the catalyst in the first catalyst bed layer 30 floats uniformly in the axial direction, local resistance is reduced, and the pressure drop in the catalyst bed layer is homogenized.

The lower part of the second catalyst bed layer 30 is adjacent to the linked dust filtering and deposition layer. When the second catalyst bed layer 30 expands, the pressing device 10 and the upper linkage 420 move simultaneously; specifically, the pressing device 10 floats upward and the upper linkage 420 floats downward; when the first catalyst bed layer 30 contracts, the pressing device 10 and the upper linkage 420 act simultaneously; specifically, the pressing device 10 floats downward and the upper linkage 420 floats upward, so that the catalyst in the second catalyst bed layer 30 floats uniformly in the axial direction, thus local resistance is reduced and the pressure drop in the catalyst bed layer is homogenized.

Compared with the prior art, the upflow reactor 1 provided by the present invention has the following advantages:
1. By providing a linked dust filtering and deposition layer in the upflow reactor 1 in the present invention, the catalyst bed layer is divided into a first catalyst bed layer 30 and a second catalyst bed layer 30, and the upper linkage 420 and the lower linkage 430 in the linked dust filtering and deposition layer are connected with the pressing device 10 and the sliding support 410 respectively. With the feeding of the upflow reactor 1 and the expansion/contraction of the catalyst bed layer 30, the linked dust filtering and deposition layer moves together with the pressing device 10, the upper linkage 420, the upper elastic member 441, the lower elastic member 442, the lower linkage 430 and the sliding support 410 in an interlocked manner, so that the catalyst in the catalyst bed layer 30 can be quickly recovered to its original state, thus the abrasion of the particles in the catalyst bed layer 30 and the catalyst dust are reduced, and the increase of pressure drop in the catalyst bed layer is alleviated.
2. In the upflow reactor 1 in the present invention, the linked dust filtering and deposition layer is arranged between the catalyst bed layers 30. Thus, on one hand, the impact force of feed materials on the second catalyst bed layer 30 is buffered and thereby quickly reduced, and the abrasion of the catalyst particles in the second catalyst bed layer 30 and the amount of generated dust are greatly reduced, the pressure drop in the second catalyst bed layer 30 is controlled to a lower level; since a small amount of dust generated by the first catalyst bed layer 30 is filtered and deposit in the linked dust filtering and deposition layer, the pressure drop in the first catalyst bed layer can be effectively controlled.
3. A first dust removing member 510 is arranged in the linked dust filtering and deposition layer, and the first membrane assembly 530 is arranged around the first dust removing member 510. After the hydrogen is dispersed by the inorganic membrane tubes into nano/micron hydrogen bubbles, the hydrogen permeates into the dust filtering and deposition layer and is mixed and dissolved with the reaction materials. In that process, on one hand, the reaction materials have a certain shearing effect with the nano/micron hydrogen bubbles under the action of buoyancy, thus the degree of dissolution and dispersion of the gas and liquid materials (e.g., hydrogen and oil) can be greatly improved, thereby the reaction rate and efficiency can be improved; on the other hand, the catalyst dust inside the first dust removing member 510 can deposit more uniformly as a result of continuous washing of the inner and outer surfaces of the first dust removing member 510 by a large quantity of nano/micro hydrogen bubbles during permeation and diffusion, which is beneficial for preventing increase of local pressure drop in the dust filtering and deposition layer, controlling the increase rate of pressure drop in the dust filtering and deposition layer and stabilizing the pressure drop during long-time operation.

4. In the upflow reactor 1 in the present invention, the dust filtering and deposition layer is a fixed layer that does not float by itself, while the inert filling material filled in the dust filtering and deposition layer has an appropriate movement space and can move relatively, which is also helpful for preventing adhesion and local accumulation of the catalyst dust. Besides, the washing action of the hydrogen bubbles and the interlocked floating of the upper linkage 420 and the lower linkage 430 can improve the rolling rate of all filling material in the dust filtering and deposition layer, so that the dust deposition and accumulation in the dust filtering and deposition layer is more uniform.

The specific compositions of the raw oil used in the embodiments 16 and 17 of the present invention are shown in Table 6. The catalyst used in the hydrogenation reactions in the embodiments 16 and 17 is FHDO-18 from Fushun Research Institute of Petrochemical Technology, and the protectant is FBN-03B01 from Fushun Research Institute of Petrochemical Technology.

Embodiment 16

The upflow reactor 1 in the present invention is employed. Raw oil and hydrogen I are mixed in a conventional static mixer (model SV2.3/25-6.4-500), and then the mixture is introduced as feed materials into the upflow reactor 1 (the diameter of the upflow reactor 1 is 100 mm), and hydrogen II is introduced into the hydrogen inlet of the linked dust filtering and deposition layer, wherein the mass ratio of hydrogen I to hydrogen II is 5:1; the upflow reactor 1 is filled with a sliding support 410 in 100 mm height, a first catalyst bed layer 30 in 600 mm height, a linked dust filtering and deposition layer in 260 mm height, a second catalyst bed layer 30 in 800 mm height, and a pressing device 10 in 80 mm height sequentially in the material flow direction; the sliding support 410 comprises a first slideway 411 and a first grating plate 412, and the length of the first slideway 411 is 100 mm; the pressing device 10 comprises a third slideway 173 and a pressing plate 130*a*, and the length of the third slideway 173 is 80 mm; the linked dust filtering and deposition layer comprises an upper linkage 420, a linked dust filtering and deposition layer, and a lower linkage 430, the upper linkage 420 comprises a second slideway 421*b*, a linking plate 422*b* and an plastic elastomer of upper linkage layer; the lower linkage 430 comprises a second slideway 421*b*, a linking plate 422*b* and an plastic elastomer of lower linkage layer; the dust filtering and deposition layer is arranged between the upper linkage 420 and the lower linkage 430, and is provided with first dust removing members 510, a first membrane assembly 530 is arranged between adjacent first dust removing members 510, and the inlet of the first membrane assembly 530 is in communication with a hydrogen inlet pipe; the first membrane assembly 530 has a tube bundle structure, and contains 12 inorganic membrane tubes; the hydrogen permeates and diffuses through the nano/micron pores in the tube walls under the pressure difference between the inside and the outside of the membrane tubes to form 50 nm hydrogen bubbles, and then permeates into the dust filtering and deposition layer, and is mixed and dissolved with the reaction materials; the linking plate 422*b* of the upper linkage 420 and the linking plate 422*b* of the lower linkage 430 are in the same structural form, and both of them employ a Johnson screen with 2 mm mesh spacing; the plastic elastomer of upper linkage layer and the plastic elastomer of lower linkage layer are strip-shaped elements made of boron silicone rubber, the height of the plastic elastomer of upper linkage layer is 80 mm and the height of the plastic elastomer of lower linkage layer is 60 mm; the outer surface of the first dust removing member 510 is wrapped with a Johnson screen, and the first dust removing member 510 is filled with φ3~φ6 inert alumina ceramic balls. The first dust removing member 510 is in a cylindrical shape and in height of 120 mm. The press cover is a main beam composed of a plurality of I-beams and is fixed at an upper position of the pressing device 10; In the filling process, each bed layer is compacted and filled. The measurement results are shown in Table 9.

Embodiment 17

The upflow reactor 1 in the present invention is employed. Raw oil and hydrogen I are mixed in a conventional static mixer (model SV2.3/25-6.4-500), and then the mixture is introduced as feed materials into the upflow reactor 1 (the diameter of the upflow reactor 1 is 100 mm), and hydrogen II is introduced into the hydrogen inlet of the linked dust filtering and deposition layer, wherein the mass ratio of hydrogen I to hydrogen II is 3:1; the upflow reactor 1 is filled with a sliding support 410 in 100 mm height, a first catalyst bed layer 30 in 500 mm height, a linked dust filtering and deposition layer in 200 mm height, a second catalyst bed layer 30 in 600 mm height, and a pressing device 10 in 80 mm height, and a press cover in 100 mm height sequentially in the material flow direction; the sliding support 410 comprises a first slideway 411 and a first grating plate 412, and the length of the first slideway 411 is 100 mm; the pressing device 10 comprises a third slideway 173 and a pressing plate 130*a*, and the length of the third slideway 173 is 80 mm; the linked dust filtering and deposition layer comprises an upper linkage 420, a linked dust filtering and deposition layer, and a lower linkage 430, the upper linkage 420 comprises a second slideway 421*b*, a linking plate 422*b* and an plastic elastomer of upper linkage layer; the lower linkage 430 comprises a second slideway 421*b*, a linking plate 422*b* and an plastic elastomer of lower linkage layer; the dust filtering and deposition layer is arranged between the upper linkage 420 and the lower linkage 430, and is provided with first dust removing members 510, a first membrane assembly 530 is arranged between adjacent first dust removing members 510, and the inlet of the first membrane assembly 530 is in communication with a hydrogen inlet pipe; the first membrane assembly 530 has a tube bundle structure, and contains 12 inorganic membrane tubes; the hydrogen permeates and diffuses through the nano/micron pores in the tube walls under the pressure difference between the inside and the outside of the membrane tubes to form 50 nm hydrogen bubbles, and then permeates into the dust filtering and deposition layer, and is mixed and dissolved with the reaction materials;

the linking plate 422b of the upper linkage 420 and the linking plate 422b of the lower linkage 430 are in the same structural form, and both of them employ a Johnson screen with 2 mm mesh spacing; the plastic elastomer of upper linkage layer and the plastic elastomer of lower linkage layer are strip-shaped elements made of boron silicone rubber, the height of the plastic elastomer of upper linkage layer is 60 mm and the height of the plastic elastomer of lower linkage layer is 80 mm; the outer surface of the first dust removing member 510 is wrapped with a Johnson screen, and the first dust removing member 510 is filled with φ3~φ6 inert alumina ceramic balls. The first dust removing member 510 is in a cylindrical shape and in height of 60 mm. The press cover is a main beam composed of a plurality of I-beams and is fixed at an upper position of the pressing device 10; In the filling process, each bed layer is compacted and filled. The measurement results are shown in Table 9.

TABLE 9

Measurement Results

| | Embodiment 16 | Embodiment 17 |
|---|---|---|
| Apparent liquid flow velocity, m/s | 0.0223 | 0.0232 |
| | 0.0222 | 0.0227 |
| | 0.0227 | 0.0232 |
| Average, m/s | 0.0224 | 0.0230 |
| Operation time, min | 21550 | 24520 |
| Pressure drop in reactor, ΔP | 6.47 | 5.29 |
| Total amount of dust accumulated in linked dust filtering and deposition layer, g | 0.050 | 0.036 |

It can be seen from the increase rate of the pressure drop in the reactor in the embodiments 16 and 17: utilizing the upflow reactor 1 in the present invention, the increase rate of the pressure drop in the reactor is relatively low, which is to say, the increase rate of the pressure drop in the reactor is effectively controlled, thus the operation time of the device is greatly prolonged. The result indicates: by providing the linked dust filtering and deposition layer in the present invention, the abrasion of the catalyst particles during movement can be effectively reduced, the service life of the catalyst can be prolonged, the catalyst dust can be continuously removed in the reaction process, the reaction uniformity can be improved, the increase of pressure drop in the catalyst bed layer can be greatly alleviated, and long-time stable operation of the reactor can be maintained.

As shown in FIGS. 30-36, the present invention further provides an upflow reactor 1, which comprises a housing 20, in which a supporting plate 810, a lower catalyst bed layer 30, a sliding grating layer, an upper catalyst bed layer 30, and a press cover grating 770 are arranged in the material flow direction; the bottom of the housing 20 is provided with a reaction material inlet, and the top of the housing 20 is provided with a reaction material outlet. The sliding grating layer comprises a sliding support grating 780 and a pressing device 10; the pressing device 10 is located above the lower catalyst bed layer 30 and comprises a pressing plate 130a and a third slideway 173 that is fixed on the inner surface of the upflow reactor 1 in the axial position of the upflow reactor 1, the edge of the pressing plate 130a is movably overlapped on the third slideway 173, and is sealed with the third slideway 173 by means of a sealing member; one end of the sealing member is fixed on the rim of the pressing plate 130a, and the other end of the sealing member is movably overlapped on the surface of the third slideway 173.

In the reaction process, the pressing device 10 floats up and down with the expansion/contraction of the lower catalyst bed layer 30; the third slideway 173 may be a steel structure and is usually in length of 10 mm~500 mm, preferably 30 mm~300 mm. If the length is too small, the slideway may be clogged easily owing to the small floating space, resulting in a shortened operation period; if the length is too great, the floating space of the catalyst will be so large that the catalyst will be abraded seriously, causing problems such as excessive catalyst dust.

The sliding support grating 780 is located below the upper catalyst bed layer 30 and above the pressing device 10, and comprises an upper grating plate and an upper slideway that is fixed on the inner surface of the upflow reactor 1 at a position in the axial position of the upflow reactor 1. The edge of the upper grating plate is movably overlapped on the surface of the upper slideway, and is sealed with the upper slideway by means of a sealing member; one end of the sealing member is fixed at the outer edge of the upper grating plate and the other end of the sealing member is movably overlapped on the surface of the upper slideway. The upper slideway and the third slideway 173 are an integral slideway, or are separate slideways.

In the case that the upper slideway and the third slideway 173 are separate ones, the length of the upper slideway is smaller than that of the third slideway 173, in view that the impact force of the reaction materials is greatly reduced after the kinetic energy of the reaction materials is weakened in the lower catalyst bed layer 30 and thus the degree of floating of the upper catalyst bed layer 30 is greatly decreased.

In the reaction process, the sliding support grating 780 floats up and down with the expansion/contraction of the upper catalyst bed layer 30; the structure of the sliding support grating 780 may be the same as or different from that of the pressing device 10. The upper slideway of the sliding support grating 780 may be a steel structure and usually is in length of 5 mm~300 mm, preferably 10 mm~100 mm. If the length is too small, the slideway may be clogged easily owing to the small floating space, resulting in a shortened operation period; if the length is too great, the floating space of the catalyst will be so large that the catalyst will be abraded seriously, causing problems such as excessive catalyst dust.

The housing 20 comprises a second reaction material inlet and a third reaction material inlet, wherein the second reaction material inlet is arranged at the bottom of the lower catalyst bed layer 30 and the third reaction material inlet is arranged at the top of the lower catalyst bed layer 30.

The second reaction material inlet and the third reaction material inlet are connected with a feeding distributor 70, which is open downward opposite to the material flow direction in the upflow reactor 1, and is used to reduce the kinetic energy of the materials fed from the bottom of the upflow reactor 1, so as to offset and relieve the impact force of the feed materials and alleviate the floating of the lower catalyst bed layer 30. Based on the total liquid-phase feeding amount of the upflow reactor 1, the liquid-phase feed materials entering into the upflow reactor 1 through the reaction material inlet, the second reaction material inlet and the third reaction material inlet account for 40 wt %~70 wt %, 5 wt %~40 wt % and 5 wt %~40 wt % of the total liquid-phase feeding amount respectively.

The upflow reactor 1 comprises a first circulated material inlet and a second circulated material inlet, wherein the first circulated material inlet is arranged at the bottom of the upper catalyst bed layer 30 and the second circulated material inlet is arranged at the top of the upper catalyst bed layer 30. The first circulated material inlet is connected with an upper circulated material distributor 740, and the second circulated material inlet is connected with a lower circulated material distributor 750. The upper circulated material distributor 740 and the lower circulated material distributor 750 are open downward opposite to the material flow direction of the upflow reactor 1, and are used for reducing the kinetic energy of the materials fed into the upflow reactor 1, thereby offsetting and relieving the impact force of the feed materials and alleviating the floating of the upper catalyst bed layer 30. Based on the total amount of the reaction effluent from the upflow reactor 1, the reaction effluents flowing out through the reaction material outlet and the reaction effluents circulated back to the reactor through the first circulated material inlet and the second circulated material inlet account for 50 wt %~90 wt %, 1 wt %~30 wt % and 1 wt %~30 wt % of the total amount of the reaction effluent respectively.

A dust removing device 60 is provided on the upper part of the press cover grating 770. The dust removing device 60 comprises an upper plate 630a, a middle plate 620a, a lower plate 610a and a third dust removing member 640a, wherein a primary filtering layer is formed between the lower plate 610a and the middle plate 620a, and a secondary filtering layer is formed between the upper plate 630a and the middle plate 620a; third dust removing members 640a are uniformly arranged in the primary filtering layer, and fourth dust removing members 650a are uniformly arranged in the secondary filtering layer. The third dust removing members 640a of the primary filtering layer and the fourth dust removing members 650a of the secondary filtering layer are arranged in a staggered manner. The surfaces of the upper plate 630a, the middle plate 620a and the lower plate 610a are blocked in a staggered manner, so that the materials pass through the catalyst dust filtering layer in a Z-shaped movement trajectory, which is beneficial for interception and deposition of dust.

The surfaces of the third dust removing members 640a and the fourth dust removing members 650a are wrapped by a stainless steel wire mesh or Johnson screen respectively, and the third dust removing members 640a and the fourth dust removing members 650a are filled with an inert porous material. The third dust removing members 640a and the fourth dust removing members 650a are in a shape that is any of cylindrical shape, cubic shape, rhombic shape, cuboid shape and polygonal shape, and the unit height of the third dust removing members 640a and the fourth dust removing members 650a is 10 mm~1,000 mm, preferably 50 mm~200 mm. A press cover is provided on the upper part of the dust removing device 60. The third dust removing members 640a in the primary filtering layer are preferably filled with $\varphi10$~$\varphi30$ inert alumina ceramic balls for intercepting and collecting large-particle catalyst dust; the fourth dust removing members 650a in the secondary filtering layer are preferably filled with $\varphi3$~$\varphi13$ inert alumina ceramic balls for intercepting and collecting small-particle catalyst dust.

In the application according to claim 15, when the upflow reactor 1 is used for liquid-phase hydrogenation of hydrocarbon oil, the specific process is as follows:
(1) Firstly, the raw oil is divided into first raw oil, second raw oil and third raw oil, wherein the first raw oil is to be mixed and dissolved with hydrogen to obtain a stream containing hydrogen, which is used as a reaction material fed from the bottom of the a hydrogenation reactor;
(2) The stream formed in the step (1) is used as a reaction material and introduced into the upflow reactor 1 from the bottom of the upflow reactor 1, a hydrogenation reaction is carried out on the lower catalyst bed layer 30, and, at the same time, the second raw oil and the third raw oil are introduced into the upflow reactor 1 through a second reaction material inlet and a third reaction material inlet respectively;
(3) The hydrogenation effluent obtained in the step (2) is divided into a first stream, a second stream and a third stream, wherein the first stream exits the upflow reactor 1 as a reaction product, and the second stream and the third stream are respectively circulated back to the upflow reactor 1 through a first circulated material inlet and a second circulated material inlet.

To overcome the drawbacks in the prior art, the present invention provides the upflow reactor 1, which can effectively control the degree of expansion/contraction of the catalyst bed layer 30, prevent abrasion of the particles of the catalyst in the floating process so as to protect the catalyst and reduce dust.

Compared with the prior art, the upflow reactor 1 provided by the present invention has the following advantages:
1. In the upflow reactor 1 in the present invention, the sliding grating layer is arranged adjacent to the catalyst bed layers 30 between the upper catalyst bed layer 30 and the lower catalyst bed layer 30, and the pressing device 10 floats up and down with the material feeding into the upflow reactor 1 and the expansion/contraction of the lower catalyst bed layer 30. Thus, on one hand, the throughput of the lower catalyst bed layer 30 is ensured and clogging is prevented; on the other hand, the lower catalyst bed layer 30 can be recovered to its original volume as quickly as possible, and the abrasion of the catalyst particles and the amount of generated dust can be reduced. The sliding support grating 780 is configured to float up and down with the expansion/contraction of the upper catalyst bed layer 30, so as to ensure the throughput of the lower catalyst bed layer 30 and prevents clogging on one hand, and allow the lower catalyst bed layer 30 to recover to its original volume as quickly as possible, and reduce the abrasion of the catalyst particles and the amount of generated dust on the other hand.
2. In the upflow reactor 1 in the present invention, second feed oil and third feed oil are introduced from the bottom and top of the lower catalyst bed layer 30 respectively, and the material feeding direction is opposite to the material flow direction in the upflow reactor 1, so as to reduce the kinetic energy of the material fed from the bottom of the upflow reactor 1, thereby offset and relieve the impact force of the feed material and alleviate the floating of the lower catalyst bed layer 30; at the upper catalyst bed layer 30, the first circulated reaction product and the second circulated reaction product are circulated respectively at the bottom and top of the upper catalyst bed layer 30, and the material feeding direction is opposite to the material flow direction in the upflow reactor 1, so as to reduce the kinetic energy of the material fed into the upflow reactor 1, thereby offset and relieve the impact force of the feed material and alleviated the floating of the upper catalyst bed layer 30.
3. In the upflow reactor 1 in the present invention, a dust removing device 60 is provided above the upper catalyst bed layer 30, in view that a small amount of dust is produced owing to buoyancy and production fluctuations during the use of the catalyst. By providing the dust removing device 60, the catalyst dust carried in the materials can be filtered and removed, and the dust can be prevented from entering into other parts (e.g., the top outlet pipe) and causing clogging. A press cover is further provided above the dust removing device 60 in the upflow reactor 1 so as to fix the components of the dust removing device 60 and prevent deformation of the components and agent loss resulted from the expansion of the catalyst bed layer 30.

4. The upflow reactor 1 in the present invention can effectively control the degree of expansion/contraction of the catalyst bed layer 30, reduce the abrasion of catalyst particles and the amount of generated catalyst dust, prolong the service life of the catalyst, and greatly alleviate the increase of pressure drop in the catalyst bed layer and maintain long-time stable operation of the hydrogenation reactor.

As shown in FIG. 36, the specific reaction process will be explained in an example of liquid-phase hydrogenation process of an oil product: Firstly, the raw oil is divided into first raw oil, second raw oil and third raw oil, wherein the first raw oil is mixed and dissolved with hydrogen in a hydrogen-oil mixer 850 to obtain a stream containing hydrogen, which is introduced as a bottom feed material into the upflow reactor 1 through a reaction material inlet; a hydrogenation reaction is carried out in the lower catalyst bed layer 30; at the same time, the second raw oil and the third raw oil are respectively introduced into the upflow reactor 1 through a second reaction material inlet and a third reaction material inlet; in the upflow reactor 1, the materials sequentially pass through the supporting plate 810, the lower catalyst bed layer 30, the sliding grating layer, the upper catalyst bed layer 30, the press cover grating 770, the dust removing device 60 and the press cover to obtain a hydrogenation reaction effluent, which is divided into a first stream, a second stream and a third stream, wherein the first stream flows out of the upflow reactor 1 as a reaction product, the second stream and the third stream are circulated back to the upflow reactor through the first circulated material inlet and the second circulated material inlet respectively.

During normal operation, owing to the particularity of the reaction process, under the action of buoyancy, the lower catalyst bed layer 30 and the upper catalyst bed layer 30 are in an expanded state after material feeding and float up and down with the fluctuations of the material feeding. Therefore, a sliding grating layer is arranged between the upper catalyst bed layer 30 and the lower catalyst bed layer 30 in the present invention. The sliding support grating 780 and the pressing device 10 float up and down with the material feeding into the upflow reactor 1 and the expansion/contraction of the upper catalyst bed layer 30 and the lower catalyst bed layer 30. Thus, on one hand, the throughput of the catalyst bed layer 30 is ensured and clogging is prevented; on the other hand, the catalyst bed layer 30 can be recovered to its original volume as quickly as possible, and the abrasion of catalyst particles and the amount of generated dust can be reduced. In addition, at the lower catalyst bed layer 30, the second raw oil and the third raw oil are introduced into the reactor at the bottom and top of the lower catalyst bed layer 30 respectively, and the corresponding pipelines are configured to be open downward opposite to the material direction in the upflow reactor 1, so as to reduce the kinetic energy of the bottom feed material in the upflow reactor 1, thereby offset and relieve the impact force of the feed material and alleviate the floating of the lower catalyst bed layer 30. At the upper catalyst bed layer 30, the first circulated reaction product and the second circulated reaction product are circulated respectively at the bottom and top of the upper catalyst bed layer 30, and the corresponding pipelines are also configured to be open downward opposite to the material flow direction in the upflow reactor 1, so as to reduce the kinetic energy of the material fed into the upflow reactor 1, thereby offset and relieve the impact force of the feed material and alleviated the floating of the upper catalyst bed layer 30. The material coming from the upper catalyst bed layer and the press cover grating 770 enters into the dust removing device 60, and passes through the lower plate 610a, the primary filtering layer, the middle plate 620a, the secondary filtering layer and the upper plate 630a sequentially, so as to filter off, intercept and collect the dust entrained in the material in a staged manner. The specific compositions of the raw oil used in the embodiments 18 and 19 of the present invention are shown in Table 6. The catalyst used in the hydrogenation reactions in the embodiments 18 and 19 is FHDO-18 from Fushun Research Institute of Petrochemical Technology, and the protectant is FBN-03B01 from Fushun Research Institute of Petrochemical Technology.

Embodiment 18

The upflow reactor 1 in the present invention is employed. A part of the raw oil and hydrogen are mixed in a conventional static mixer (model SV2.3/25-6.4-500), and then the mixture is introduced as feed materials from the bottom into the upflow reactor 1 (the diameter of the upflow reactor 1 is 100 mm), and a second reaction material and a third reaction material are introduced through the bottom and top material inlets of the lower catalyst bed layer 30; a first circulated material and a second circulated material enter into the reactor through bottom and top material inlets of the upper catalyst bed layer 30 respectively; the upflow reactor 1 is filled with a supporting plate 810, a first catalyst bed layer 30 in 600 mm height, a sliding grating layer in 200 mm height, a second catalyst bed layer 30 in 600 mm height, and a dust removing device 60 in 200 mm height sequentially in the material flow direction; wherein the liquid-phase feed materials entering into the upflow reactor 1 through the reaction material inlet, the second reaction material inlet and the third reaction material inlet account for 66 wt %, 17 wt % and 17 wt % of the total amount of the liquid-phase feed material respectively; the reaction effluent and the liquid-phase feed materials introduced through the first circulated material inlet and the second circulated material account for 84 wt %, 8 wt % and 8 wt % of the total amount of the liquid-phase feed material respectively. the supporting plate 810 is of a slat type, with a 10-mesh screen laid on the top surface of the supporting plate 810; the outer surfaces of the third dust removing member 640a and the fourth dust removing member 650a in the dust removing member 60 are wrapped with a Johnson screen, and the third dust removing member 640a and the fourth dust removing member 650a are filled with an inert porous material; the third dust removing member 640a in the primary filtering layer is filled with φ16 inert alumina ceramic balls, and the fourth dust removing member 650a in the secondary filtering layer is filled with φ6 inert alumina ceramic balls; the third dust removing member 640a and the fourth dust removing member 650a are in a cylindrical shape, and the unit height of them is 80 mm. In the filling process, each bed layer is compacted and filled. The measurement results are shown in Table 10.

Embodiment 19

The upflow reactor 1 in the present invention is employed. Raw oil and hydrogen are mixed in a conventional static mixer (model SV2.3/25-6.4-500), and then the mixture is introduced as feed materials from the bottom into the upflow reactor 1 (the diameter of the upflow reactor 1 is 100 mm), and a second reaction material and a third reaction material are introduced through the bottom and top material inlets of the lower catalyst bed layer 30; a first circulated material and a second circulated material enter into the reactor through bottom and top material inlets of the upper catalyst bed layer 30 respectively; the upflow reactor 1 is filled with a supporting plate 810, a first catalyst bed layer 30 in 800 mm height, a sliding grating layer in 200 mm height, a second catalyst bed layer 30 in 800 mm height, a dust removing device 60 in 200 mm height, and a press cover in 100 mm height sequentially in the material flow direction; wherein the liquid-phase feed materials entering into the upflow reactor 1 through the reaction material inlet, the second reaction material inlet and the third reaction material inlet account for 72 wt %, 18 wt % and 18 wt % of the total amount of the liquid-phase feed material respectively; the reaction effluent and the liquid-phase feed materials introduced through the first circulated material inlet and the second circulated material account for 80 wt %, 10 wt % and 10 wt % of the total amount of the liquid-phase feed material respectively. the supporting plate 810 is of a slat type, with a 10-mesh screen laid on the top surface of the supporting plate 810; the outer surfaces of the third dust removing member 640*a* and the fourth dust removing member 650*a* in the dust removing member 60 are wrapped with a Johnson screen, and the third dust removing member 640*a* and the fourth dust removing member 650*a* are filled with an inert porous material; the third dust removing member 640*a* in the primary filtering layer is filled with φ10 inert alumina ceramic balls, and the fourth dust removing member 650*a* in the secondary filtering layer is filled with φ3 inert alumina ceramic balls; the third dust removing member 640*a* and the fourth dust removing member 650*a* are in a cylindrical shape, and the unit height of them is 80 mm. In the filling process, each bed layer is compacted and filled. The measurement results are shown in Table 10.

TABLE 10

Measurement Results

|  | Embodiment 18 | Embodiment 19 |
|---|---|---|
| Apparent liquid flow velocity, m/s | 0.0232 | 0.0228 |
|  | 0.0238 | 0.0225 |
|  | 0.0239 | 0.0226 |
| Average, m/s | 0.0236 | 0.0226 |
| Operation time, min | 21450 | 24360 |
| Pressure drop in reactor, ΔP | 6.42 | 5.22 |
| Total amount of dust deposited in catalyst dust deposition layer, g | 0.052 | 0.038 |

It can be seen from the increase rate of the pressure drop in the reactor in the embodiments 18 and 19: utilizing the upflow reactor 1 in the present invention, the increase rate of the pressure drop in the reactor is relatively low, which is to say, the increase rate of the pressure drop in the reactor is effectively controlled, thus the operation time of the upflow reactor 1 is greatly prolonged. The result indicates: by providing the sliding grating layer in the present invention, the abrasion of the catalyst particles during movement can be effectively reduced, the service life of the catalyst can be prolonged, the increase of pressure drop in the catalyst bed layer can be greatly alleviated, and long-time stable operation of the upflow reactor 1 can be maintained. In addition, it can be seen from the low increase rate of the pressure drop in the upflow reactor 1 of the present invention that the dust removing device 60 (primary filtering layer and secondary filtering layer) can intercept almost all dust. Thus, on one hand, clogging of the follow-up pipelines can be prevented; on the other hand, the circulated materials (first circulated material and second circulated material) can be filtered and purified, thereby the dust entrained in the circulated materials can be reduced, the increase of pressure drop in the catalyst bed layer can be alleviated.

In the description of the present invention, it should be understood that the orientation or position relations indicated by terms "center", "longitudinal", "transverse", "length", "width", "thickness", "above", "below", "left", "right", "vertical", "horizontal", "top", "bottom", "inside", "outside", "clockwise", "counter-clockwise", "axial", "radial", or "circumferential", etc., are based on the orientation or position relations indicated in the accompanying drawings. They are used only to ease and simplify the description of the present invention, rather than indicating or implying that the involved device or component must have a specific orientation or must be constructed and operated in a specific orientation. Therefore, the use of these terms shall not be deemed as constituting any limitation to the present invention. In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature. In the description of the present invention, "a plurality of" or "multiple" means at least two, such as two or more, etc., unless otherwise specified explicitly.

In the present invention, unless otherwise specified and defined explicitly, the terms "install", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present invention in their context. In the present invention, unless otherwise specified and defined explicitly, a first feature "above" or "below" a second feature may represent that the first feature and the second feature directly contact with each other or the first feature and the second feature contact with each other indirectly via an intermediate medium. In addition, a first feature "above" or "over" a second feature may represent that the first feature is right above or diagonally above the second feature, or may only represent that the elevation of the first feature is higher than that of the second feature. A first feature being "below" or "under" a second feature may represent that the first feature is right below or diagonally below the second feature, or may only represent that the elevation of the first feature is lower than that of the second feature.

In the description of the present invention, the expressions of reference terms "an embodiment", "some embodiments", "an example", "specific example", or "some examples" mean that the specific features, structures, materials or characteristics described layer in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no conflict among them. While the present invention is illustrated and described above in embodiments, it should be understood that the embodiments are exemplary only and shall not be deemed as constituting any limitation to the present invention. Those skilled in the art can made variations, modifications, and replacements to the embodiments within the scope of the present invention.

The invention claimed is:

1. An upflow reactor, comprising:
a housing having a reaction chamber therein, and having a reaction material inlet and a reaction material outlet thereon, which are in communication with the reaction chamber;
a catalyst bed layer arranged in the reaction chamber; and
a pressing device arranged in the reaction chamber and located above the catalyst bed layer, wherein at least a part of the pressing device is configured to be movable up and down, so that the at least a part of the pressing device is able to be pressed against the catalyst bed layer.

2. The upflow reactor of claim 1, wherein the upflow reactor comprises a plurality of catalyst bed layers and a plurality of pressing devices, the plurality of catalyst bed layers and the plurality of pressing devices are disposed alternately in a vertical direction, and each of the plurality of pressing devices is able to be pressed against one of the plurality of catalyst bed layers; optionally, the plurality of catalyst bed layers are in height incremented in a direction that reaction material is fed.

3. The upflow reactor of claim 1, wherein the catalyst bed layer comprises an upper catalyst section and a lower catalyst section, wherein the upper catalyst section is positioned above the lower catalyst section, and the pressing device is configured to be pressed against the upper catalyst section, the upflow reactor further comprises:
a sliding support arranged in the reaction chamber to be movable up and down, the lower catalyst section is configured to be supported on the sliding support, and the sliding support is provided with a material channel;
an upper linkage and a lower linkage that are arranged in the reaction chamber to be movable up and down, each of the upper linkage and the lower linkage is provided with a material channel, the upper linkage is located above the lower linkage, wherein the upper linkage and the lower linkage are located between the upper catalyst section and the lower catalyst section in the vertical direction, the upper catalyst section is configured to be supported on the upper linkage, and the lower linkage is configured to be pressed against the lower catalyst section; and
an upper elastic member and a lower elastic member, wherein a top end of the upper elastic member is connected with the pressing device, a bottom end of the upper elastic member is connected with the upper linkage, a bottom end of the lower elastic member is connected with the sliding support, and a top end of the lower elastic member is connected with the lower linkage;
optionally, the sliding support comprises a first slideway and a first grating plate, wherein the first slideway is arranged on a circumferential wall face of the reaction chamber, the first grating plate is arranged on the first slideway to be movable up and down, and the lower catalyst section is configured to be supported on the first grating plate,
optionally, a first slideway is provided with a lower limiting boss and an upper limiting boss, wherein a first grating plate is located between the lower limiting boss and the upper limiting boss in the vertical direction, the lower limiting boss is configured to work with the first grating plate to limit the downward movement distance of the first grating plate, and the upper limiting boss is configured to work with the first grating plate to limit the upward movement distance of the first grating plate,
optionally, each of the upper linkage and the lower linkage comprises a first linking plate, a second linking plate, and a plurality of first guiding member, each of the first linking plate and the second linking plate is configured to be movable up and down and has a material channel, each first guiding member passes through each of the first linking plate and the second linking plate in the vertical direction, each of the first linking plate and the second linking plate is configured to be movable up and down with respect to each first guiding member, wherein the upper catalyst section is configured to be supported on the first linking plate of the upper linkage, and the second linking plate of the lower linkage is configured to be pressed against the lower catalyst section,
optionally, a seal ring is provided between at least one of a first linking plate and a second linking plate and the circumferential wall face of the reaction chamber,
optionally, the top end of the upper elastic member is connected with the pressing plate, the bottom end of the upper elastic member is connected with the first linking plate, the bottom end of the lower elastic member is connected with the first grating plate, and the top end of the lower elastic member is connected with the second linking plate.

4. The upflow reactor of claim 3, further comprising: a filtering device arranged in the reaction chamber and located between the upper linkage and the lower linkage in the vertical direction,
optionally, the filtering device comprises:
a plurality of first dust removing members, each of which comprises a deformable shell that is provided with a first accommodating cavity filled with an inert filling material; optionally, a bottom end of each first guiding member of the upper linkage extends into an inert filling material in the first accommodating cavity, and a top end of each first guiding member of the lower linkage extends into the inert filling material in the first accommodating cavity; and
a plurality of isolating members, each of which is located between adjacent two shells in the horizontal direction or the vertical direction and is made of an elastic material; optionally, each isolating member is made of an elastic plastic material,
optionally, the filtering device comprises:
a plurality of first dust removing members, each of which has a first accommodating cavity filled with an inert filling material; and
a plurality of first membrane assemblies, each of which is located between two adjacent first dust removing members in the horizontal direction and has a first gas inlet;
optionally, each first membrane assembly is arranged vertically, a bottom end of the first membrane assembly is open so as to form the first gas inlet, and a top end of the first membrane assembly is closed, optionally, each of the upper linkage and the lower linkage comprises:
a second slideway arranged on a circumferential wall face of the reaction chamber; and
a linking plate that is arranged on the second slideway to be movable up and down and has a material channel, an elastic material is filled between the linking plate and the filtering device, the upper catalyst section is configured to be supported on the linking plate of the upper linkage, and the linking plate of the lower linkage is configured to be pressed against the lower catalyst section,
optionally, a seal ring is provided between the linking plate and the second slideway; optionally, a granular elastic material is filled between the linking plate and the filtering device; optionally, an elastic plastic material is filled between the linking plate and the filtering device.

5. The upflow reactor of claim 1, wherein the pressing device comprises a pressing plate, optionally, comprising an upper pressing plate and a lower pressing plate, arranged on a circumferential wall face of the reaction chamber to be movable up and down so that the pressing plate is configured to be pressed against the catalyst bed layer, and the pressing plate has a material channel,
optionally, the pressing device comprises a third slideway and a pressing plate, wherein the third slideway is arranged on the circumferential wall face of the reaction chamber, the pressing plate is arranged on the third slideway to be movable up and down so that the pressing plate is configured to be pressed against the catalyst bed layer, and the pressing plate has a material channel; optionally, a seal ring is provided between the third slideway and the pressing plate,
optionally, the third slideway is provided with a lower limiting boss and a upper limiting boss, the pressing plate is located between the lower limiting boss and the upper limiting boss in the vertical direction, the lower limiting boss is configured to work with the pressing plate to limit the downward movement distance of the pressing plate, and the upper limiting boss is configured to work with the pressing plate to limit the upward movement distance of the pressing plate,
optionally, the pressing device comprises an upper pressing plate and a lower pressing plate, wherein the upper pressing plate is located above the lower pressing plate, each of the upper pressing plate and the lower pressing plate is arranged on the circumferential wall face of the reaction chamber to be movable up and down, so that the lower pressing plate is configured to be pressed against the catalyst bed layer, the upper pressing plate is provided with an upper material channel, and the lower pressing plate is provided with a lower material channel, wherein an inert filling material is provided between the upper pressing plate and the lower pressing plate;
optionally, the pressing device further comprises a third slideway arranged on the circumferential wall face of the reaction chamber, and each of the upper pressing plate and the lower pressing plate is arranged on the third slideway to be movable up and down,
optionally, the third slideway is provided with a lower limiting boss and an upper limiting boss, the upper pressing plate and the lower pressing plate are located between the lower limiting boss and the upper limiting boss in the vertical direction, the lower limiting boss is configured to work with the lower pressing plate to limit the downward movement distance of the lower pressing plate, and the upper limiting boss is configured to work with the upper pressing plate to limit the upward movement distance of the upper pressing plate,
optionally, an upper seal ring is provided between the third slideway and the upper pressing plate, a lower seal ring is provided between the third slideway and the lower pressing plate; optionally, the pressing device further comprises a plurality of second guiding members, each of which passes through each of the upper pressing plate and the lower pressing plate in the vertical direction, each of the upper pressing plate and the lower pressing plate is configured to be movable up and down with respect to each second guiding member; optionally, the pressing device further comprises a connecting member, the top end of the connecting member is connected with the upper pressing plate, and the bottom end of the connecting member is connected with the lower pressing plate, optionally, the distances between the upper pressing plates and the lower pressing plates of the plurality of pressing devices in the vertical direction are decremented in the material feeding direction.

6. The upflow reactor of claim 4, wherein the pressing device comprises a plurality of second dust removing members, each of which is arranged between the upper pressing plate and the lower pressing plate and has a second accommodating cavity filled with the inert filling material, wherein the upper pressing plate has a plurality of upper material channels, the lower pressing plate has a plurality of lower material channels, the plurality of second dust removing members are opposite to the plurality of lower material channels in one-to-one correspondence in the vertical direction, a first material circulation cavity is defined between adjacent two second dust removing members, and the first material circulation cavity is opposite to the upper material channel in the vertical direction,
optionally, a bottom end of the second dust removing member contacts with the lower pressing plate, and the top end of the second dust removing member contacts with the upper pressing plate,
optionally, a first separating member is provided at a first side of each first material circulation cavity, a second separating member is provided at a second side of each first material circulation cavity, the first side is opposite to the second side in the horizontal direction, the first separating member comprises a first oblique plate and a first supporting member arranged on the upper pressing plate, and the second separating member comprises a second oblique plate and a second supporting member arranged on the upper pressing plate, wherein a bottom end of the first oblique plate is connected with the first supporting member, the first oblique plate extends from the first supporting member to the second side, the top end of the second oblique plate is connected with the second supporting member, the second oblique plate extends from the second supporting member to the first side, at least a part of the first oblique plate and at least a part of the second oblique plate are located right above the first material circulation cavity, the at least a part of the first oblique plate is located below the at least a part of the second oblique plate, and a material channel is defined between the at least a part of the first oblique plate and the at least a part of the second oblique plate,
optionally, the first supporting member comprises a first rod portion and a first plate portion, the first rod portion is arranged on the upper pressing plate, the first plate portion is arranged on the first rod portion horizontally, and the bottom end of the first oblique plate is connected with the first plate portion.

7. The upflow reactor of claim 6, further comprising a dust removing device, which is arranged in the reaction chamber and located above the pressing device and comprises:
   a lower plate, a middle plate, and an upper plate, the middle plate is located between the lower plate and the upper plate in the vertical direction, wherein the lower plate is provided with a plurality of first material channels, the middle plate is provided with a plurality of second material channels, and the upper plate is provided with a plurality of third material channels;
   a plurality of third dust removing members arranged between the lower plate and the middle plate in the vertical direction, each third dust removing member is opposite to a portion of the lower plate without the first material channel in the vertical direction, and the plurality of third dust removing members are opposite to the plurality of second material channels in one-to-one correspondence in the vertical direction; and
   a plurality of fourth dust removing members arranged between the middle plate and the upper plate in the vertical direction, each fourth dust removing member is opposite to a portion of the middle plate without the second material channel in the vertical direction, and the plurality of fourth dust removing members are opposite to the plurality of third material channels in one-to-one correspondence in the vertical direction,
   optionally, the bottom end of the third dust removing member contacts with the lower plate, and the top end of the third dust removing member contacts with the middle plate,
   optionally, the bottom end of the fourth dust removing member contacts with the middle plate, and the top end of the fourth dust removing member contacts with the upper plate,
   a second material circulation cavity is defined by adjacent two third dust removing members, and the second material circulation cavity is opposite to the first material channel in the vertical direction,
   a third material circulation cavity is defined between adjacent two fourth dust removing members, and the third material circulation cavity is opposite to the second material channel in the vertical direction,
   optionally, each third dust removing member has a third accommodating cavity filled with an inert filling material,
   optionally, each fourth dust removing member has a fourth accommodating cavity filled with an inert filling material.

8. The upflow reactor of claim 1, further comprising a dust removing device, which is arranged in the reaction chamber and located above the pressing device and comprises:
   a dust deposition plate provided with a plurality of fourth material channels;
   a plurality of separating cylinders arranged on the dust deposition plate, a bottom end of each of the plurality of separating cylinders is open to form a material inlet, a top end of each of the plurality of separating cylinder is open to form a material outlet, and the material inlets of the plurality of separating cylinders are connected with the plurality of fourth material channels in one-to-one correspondence; and
   a plurality of separating caps arranged above the plurality of separating cylinders in one-to-one correspondence and spaced apart from the corresponding separating cylinders; optionally, each separating cap is configured to be movable up and down; optionally, a rim of the projection of the separating cap on a horizontal plane is at an outer side of a rim of the projection of corresponding separating cylinder on the horizontal plane; optionally, the separating cap is horn-shaped,
   optionally, the dust removing device further comprises:
   a top plate, wherein optionally the dust deposition plate is arranged on a circumferential wall face of the reaction chamber, and the top plate is arranged on the circumferential wall face of the reaction chamber; and
   a plurality of outer cylinders, wherein the bottom end of each outer cylinder is connected with the dust deposition plate, the top end of each outer cylinder is connected with the top plate, the plurality of separating cylinders are arranged in the plurality of outer cylinders in one-to-one correspondence, the plurality of separating caps are arranged in the plurality of outer cylinders in one-to-one correspondence, wherein an inner circumferential face of the outer cylinder forms a slideway face, the separating cap is overlapped on the inner circumferential face of the corresponding outer cylinder to be movable up and down; optionally each separating cylinder is provided with a connecting plate that is movable up and down, and the separating cap is connected with the corresponding connecting plate.

9. The upflow reactor of claim 5, further comprising a dust removing device, which is arranged in the reaction chamber and located above the pressing device and comprises:
   a lower plate, a middle plate, and an upper plate, the middle plate is located between the lower plate and the upper plate in the vertical direction, wherein the lower plate is provided with a plurality of first material channels, the upper plate is provided with a plurality of third material channels, and an inert filling material is provided between the upper plate and the middle plate,
   a plurality of separating cylinders arranged on the lower plate, wherein a bottom end of each separating cylinder is open to form a material inlet, a top end of each separating cylinder is open to form a material outlet, and the material inlets of the plurality of separating cylinders are connected with the plurality of first material channels in one-to-one correspondence;
   a plurality of separating caps arranged above the plurality of separating cylinders in one-to-one correspondence and spaced apart from the corresponding separating cylinders; optionally, each of the plurality of separating caps is configured to be movable up and down; optionally, a rim of the projection of the separating cap on a horizontal plane is at the outer side of a rim of the projection of corresponding separating cylinder on the horizontal plane; optionally, the separating cap is horn-shaped; and
   a plurality of filtering cylinders arranged on the lower plate, wherein a first portion of each filtering cylinder is located between the lower plate and the middle plate in the vertical direction, a second portion of each filtering cylinder is located between the middle plate and the upper plate in the vertical direction, wherein the first portion of each filtering cylinder is provided with a material inlet, and the second portion of each filtering cylinder is provided with a material outlet, and the filtering cylinder is filled with an inert filling material,
   optionally, the middle plate is provided with a plurality of second material channels, optionally, the lower plate is fixedly arranged on a circumferential wall face of the reaction chamber, and each of the middle plate and the upper plate are arranged on the circumferential wall face of the reaction chamber to be movable up and down; optionally, the dust removing device further comprises a fourth slideway arranged on the circumferential wall face of the reaction chamber, the lower plate is fixedly arranged on the fourth slideway, and each of the middle plate and the upper plate is arranged on the fourth slideway to be movable up and down; optionally, a seal ring is provided between the fourth slideway and the upper plate, and a seal ring is provided between the fourth slideway and the middle plate, optionally, the fourth slideway is provided with a supporting boss and an upper limiting boss, the lower plate is supported on the supporting boss, the upper plate is located below the upper limiting boss, and the upper limiting boss is configured to work with the upper plate to limit the upward movement distance of the upper plate, optionally, each separating cylinder is surrounded by a plurality of filtering cylinders, and each filtering cylinder is surrounded by a plurality of separating cylinders.

10. The upflow reactor of claim 6, further comprising a dust removing device, which is arranged in the reaction chamber and located above the pressing device and comprises:

a lower plate, a middle plate, and an upper plate, the middle plate is located between the lower plate and the upper plate in the vertical direction, wherein the lower plate is provided with a plurality of first material channels, the middle plate is provided with a plurality of second material channels, the upper plate is provided with a plurality of third material channels, and an inert porous material is provided between the upper plate and the middle plate, and a plurality of membrane filtering assemblies, wherein a material inlet of each membrane filtering assembly is connected with the first material channel, and material outlets of the plurality of membrane filtering assemblies extend into the inert porous material provided between the upper plate and the middle plate, optionally, an inert filling material is provided between the lower plate and the middle plate, and some of the plurality of first material channels are connected with the material inlets of the membrane filtering assemblies, optionally, the dust removing device comprises a plurality of third dust removing members, each of which is arranged between the upper plate and the middle plate and has a third accommodating cavity filled with the inert porous material, wherein the material outlets of the plurality of membrane filtering assemblies extend into the inert porous material in the plurality of third accommodating cavities in one-to-one correspondence; optionally, a second material circulation cavity is defined between adjacent two third dust removing members, the second material circulation cavity is opposite to the second material channel in the vertical direction, and the second material circulation cavity is opposite to the third material channel in the vertical direction.

11. The upflow reactor of claim 4, wherein the pressing device comprises:

an upper pressing plate and a lower pressing plate, wherein the upper pressing plate is located above the lower pressing plate, each of the upper pressing plate and the lower pressing plate is arranged on a circumferential wall face of the reaction chamber to be movable up and down, so that the lower pressing plate is configured to be pressed against the catalyst bed layer, the upper pressing plate is provided with an upper material channel, the lower pressing plate is provided with a lower material channel, and an inert filling material is configured to be provided between the upper pressing plate and the lower pressing plate; and a second membrane assembly that is arranged between the upper pressing plate and the lower pressing plate and has a second gas inlet; optionally, the second gas inlet of the second membrane assembly is configured to be in communication with a hydrogen supply pipeline; optionally, the pressing device comprises a plurality of second membrane assemblies spaced apart from each other; optionally, each second membrane assembly is arranged vertically; optionally, a bottom end of each second membrane assembly is open to form the second gas inlet; optionally, the pressing device further comprises a gas intake pipe having a plurality of gas outlets, and the second gas inlets of the plurality of second membrane assemblies are connected with the plurality of gas outlets of the gas intake pipe in one-to-one correspondence; optionally, a top end of each second membrane assembly is closed; optionally, the pressing device further comprises a closing pipe having a plurality of communication holes, and the top ends of the plurality of second membrane assemblies are connected with the plurality of communication holes in one-to-one correspondence, optionally, the pressing device further comprises a connecting pipe, wherein a first end of the connecting pipe is connected with the gas intake pipe, a second end of the connecting pipe is configured to be in communication with the hydrogen supply pipeline.

12. The upflow reactor of claim 1, wherein the pressing device comprises an upper elastomer bed layer that is configured to be pressed against the catalyst bed layer; optionally, the upper elastomer bed layer is in a compressed state so as to normally press the catalyst bed layer; optionally, the upper elastomer bed layer is filled with elastic particles.

13. The upflow reactor of claim 12, further comprising a lower elastomer bed layer arranged in the reaction chamber and located below the catalyst bed layer, wherein the lower elastomer bed layer is configured to abut against the catalyst bed layer so as to press the catalyst bed layer; optionally, the lower elastomer bed layer is in a compressed state so as to normally press the catalyst bed layer; optionally, the lower elastomer bed layer is filled with elastic particles;

optionally, the upflow reactor further comprises:

an upper bearing layer that is arranged in the reaction chamber and located above the upper elastomer bed layer, and contacts with the upper elastomer bed layer so as to support the upper elastomer bed layer; and a lower bearing layer that is arranged in the reaction chamber and located below the lower elastomer bed layer, and contacts with the lower elastomer bed layer so as to support the lower elastomer bed layer.

14. The upflow reactor of claim 1, further comprising:

a feeding distributor that is arranged in the reaction chamber and has a material inlet and a plurality of material outlets that are open downward; and a feeding pipe connected with the material inlet of the feeding distributor, optionally, the feeding distributor comprises a lower feeding distributor that is arranged below the catalyst bed layer and has a lower material inlet and a plurality of lower material outlets that are open downward, and the lower material inlet is connected with the feeding pipe, optionally, the feeding distributor further comprises an upper feeding distributor that is arranged above the catalyst bed layer and has an upper material inlet and a plurality of upper material outlets that are open downward, and the upper material inlet is connected with the feeding pipe, optionally, the upflow reactor comprises a plurality of feeding distributors and a plurality of catalyst bed layers arranged in the vertical direction, wherein, each catalyst bed layer is provided with an upper feeding distributor above it and the lower feeding distributor below it, except the topmost catalyst bed layer, optionally, the upflow reactor further comprises:

an upper circulated material distributor that is arranged in the reaction chamber and located above the topmost catalyst bed layer, and has an upper circulated material inlet and a plurality of upper circulated material outlets that are open downward;

a lower circulated material distributor that is arranged in the reaction chamber and located below the topmost catalyst bed layer but above the rest catalyst bed layers, and has a lower circulated material inlet and a plurality of lower circulated material outlets that are open downward; and a circulated material pipe, with a first end in communication with the reaction material outlet and a second end in communication with each of the upper circulated material inlet and the lower circulated material inlet.

15. The upflow reactor of claim 1, further comprising a sliding support arranged in the reaction chamber to be movable up and down, wherein the catalyst bed layer is configured to be supported on the sliding support, and the sliding support has a material channel so that the reaction materials is configured to pass through the sliding support, optionally, the sliding support comprises a first slideway and a first grating plate, wherein the first slideway is arranged on the circumferential wall face of the reaction chamber, the first grating plate is arranged on the first slideway to be movable up and down, and the catalyst bed layer is configured to be supported on the first grating plate, optionally, a first slideway is provided with a lower limiting boss and an upper limiting boss, wherein the first grating plate is located between the lower limiting boss and the upper limiting boss in the vertical direction, the lower limiting boss is configured to work with the first grating plate to limit the downward movement distance of the first grating plate, and the upper limiting boss is configured to work with the first grating plate to limit the upward movement distance of the first grating plate.

16. The upflow reactor of claim 1, further comprising a protectant layer located below the catalyst bed layer in the reaction chamber.

* * * * *